(12) United States Patent
Liberato et al.

(10) Patent No.: US 12,518,122 B1
(45) Date of Patent: Jan. 6, 2026

(54) ACTIVATABLE RF TAGS WITH VARIABLE READ RANGE

(71) Applicant: Temptime Corporation, Morris Plains, NJ (US)

(72) Inventors: Eric W. Liberato, Pequannock, NJ (US); Mohannad Abdo, Clifton, NJ (US)

(73) Assignee: ZEBRA TECHNOLOGIES CORPORATION, Lincolnshire, IL (US)

( * ) Notice: Subject to any disclaimer, the term of this patent is extended or adjusted under 35 U.S.C. 154(b) by 0 days.

(21) Appl. No.: 18/927,373

(22) Filed: Oct. 25, 2024

(51) Int. Cl.
  *G06K 19/07* (2006.01)
  *G06K 7/10* (2006.01)
  *G06K 19/077* (2006.01)

(52) U.S. Cl.
  CPC ..... *G06K 19/0717* (2013.01); *G06K 7/10148* (2013.01); *G06K 19/07726* (2013.01)

(58) Field of Classification Search
  None
  See application file for complete search history.

(56) References Cited

U.S. PATENT DOCUMENTS

| | | | |
|---|---|---|---|
| 8,228,172 B2 * | 7/2012 | Collins | H01Q 1/2225 343/745 |
| 9,011,794 B2 * | 4/2015 | Haarer | G01K 3/04 422/426 |
| 10,628,726 B2 * | 4/2020 | Bhatia | G06K 19/07766 |
| 2014/0044609 A1 | 2/2014 | Prusik et al. | |
| 2020/0221972 A1 * | 7/2020 | Karchin | H01Q 1/2216 |
| 2022/0151266 A1 | 5/2022 | Bushman | |
| 2025/0093214 A1 * | 3/2025 | Huffman | G01K 3/04 |

* cited by examiner

*Primary Examiner* — Thien M Le
*Assistant Examiner* — April A Taylor
(74) *Attorney, Agent, or Firm* — K&L Gates LLP

(57) ABSTRACT

Activatable RF tags with variable read range are disclosed herein. An example activatable RF tag with variable read range includes an RF tag, including an integrated circuit, an antenna, having a first antenna portion and a second antenna portion, the first antenna portion electrically connected in a closed circuit with the integrated circuit, and an activatable environmental exposure indicator having a conductive state and a nonconductive state, the second antenna portion in the closed circuit with the integrated circuit when the activatable environmental exposure indicator is in the conductive state and second antenna portion in an open circuit when the activatable environmental exposure indicator is in the nonconductive state.

28 Claims, 22 Drawing Sheets

ACTIVATABLE RF TAGS WITH VARIABLE READ RANGE

BACKGROUND

Environmental indicators may be configured to indicate the occurrence of an environmental exposure to a host product. Prior to the association between the host product and the indicator, the same level of care must often be paid to the indicator to prevent an exposure to the environmental condition which the indicator is configured to indicate, so that the indicator is not triggered prematurely and rendered unusable for use with the host product. For example, high temperature exposure indicators may need to be kept in deep freeze or refrigerated conditions, complicating the component supply chains for the products they are used with.

Radio Frequency ID (RFID) tags are commonly used to track products throughout their lifecycle. Combinations of environmental indicators with RF tags have been previously proposed.

SUMMARY

In a first embodiment, the technology of the present disclosure is provided by an RF tag, including an integrated circuit, an antenna, having a first antenna portion and a second antenna portion, the first antenna portion electrically connected in a closed circuit with the integrated circuit, and an activatable environmental exposure indicator having a conductive state and a nonconductive state, the second antenna portion in the closed circuit with the integrated circuit when the activatable environmental exposure indicator is in the conductive state and second antenna portion in an open circuit when the activatable environmental exposure indicator is in the nonconductive state. The activatable environmental exposure indicator includes a plurality of microcapsules, each microcapsule having a nonconductive frangible shell containing a payload including a conductive material and a liquefiable material. The liquefiable material is configured to liquefy responsive to a predetermined environmental exposure. Each frangible shell is configured to continue to contain a respective payload when the liquefiable material is liquefied. Each frangible shell is configured to rupture in response to an application of an activation action exceeding a predetermined activation threshold, releasing the respective payload. After the frangible shells are ruptured responsive to the activation action, and responsive to the liquefiable material being liquified, the activatable environmental exposure indicator transitions to the conductive state, thus establishing the closed circuit between the second antenna portion and the integrated circuit.

In a second embodiment, the technology of the present disclosure is provided by an RF tag, including an integrated circuit, an antenna, having a plurality of antenna portions, wherein a first antenna portion of the plurality of antenna portions is electrically connected in a closed circuit with the integrated circuit, and a first activatable environmental exposure indicator and a second activatable environmental exposure indicator, each having a conductive state and a nonconductive state. When the first activatable environmental exposure indicator is in the conductive state, a second antenna portion of the plurality of antenna portions is in the closed circuit with the first antenna portion and the integrated circuit and, when the first activatable environmental exposure indicator is in the nonconductive state, the second antenna portion is in an open circuit. When the first activatable environmental exposure indicator is in the conductive state and the second activatable environmental exposure indicator is in the conductive state, a third antenna portion of the plurality of antenna portions is in the closed circuit with the first antenna portion, the second antenna portion and the integrated circuit and, when at least one of the first activatable environmental exposure indicator and the second activatable environmental exposure indicator are in the nonconductive state, the third antenna portion is in an open circuit. The first activatable environmental exposure indicator includes a first plurality of microcapsules, each microcapsule including a frangible shell containing a first payload, the first payload including a first conductive material and a first liquefiable material. The first liquefiable material is configured to liquefy responsive to a first predetermined environmental exposure. The frangible shells of the first plurality of microcapsules are configured to contain the first payload when the first liquefiable material is liquefied. The second activatable environmental exposure indicator includes a second plurality of microcapsules, each microcapsule including a frangible shell containing a second payload, the second payload including a second conductive material and a second liquefiable material. The second liquefiable material is configured to liquefy responsive to a second predetermined environmental exposure. The frangible shells of the second plurality of microcapsules are configured to contain the second payload when the second liquefiable material is liquefied. The frangible shells of the first plurality of microcapsules and the frangible shells of the second plurality of microcapsules are configured to rupture in response to an application of an activation action exceeding a predetermined activation threshold, releasing the first payload and the second payload respectively. After the frangible shells of the first plurality of microcapsules are ruptured, responsive to the activation action, and responsive to the first liquefiable material being liquefied, the first activatable environmental exposure indicator transitions to conductive state, thus establishing a closed circuit between the integrated circuit and the second antenna portion. After the frangible shells in the second plurality of microcapsules are ruptured responsive to the activation action, and responsive to the second liquefiable material being liquefied, the second activatable environmental exposure indicator transitions to the conductive state, thus establishing a closed circuit between the second antenna portion and the third antenna portion.

In a third embodiment, the technology of the present disclosure is provided by an RF tag, including an integrated circuit, an antenna, having a first antenna portion, a second antenna portion and a third antenna portion, wherein the first antenna portion is electrically connected in a closed circuit with the integrated circuit, an activation indicator component, having a component conductive state and a component nonconductive state, and an activatable environmental exposure indicator, having an indicator conductive state and an indicator nonconductive state. The second antenna portion is in the closed circuit with the integrated circuit and the first antenna portion when the activation indicator component is in the component conductive state, and in an open circuit when the activation indicator component is in the component nonconductive state. When the activatable environmental exposure indicator is in the indicator conductive state and the activation indicator component is in the component conductive state, the third antenna portion is in a closed circuit the integrated circuit, and when at least one of the activatable environmental exposure indicator is in the indicator nonconductive state and the activation indicator component is in the component nonconductive state, the third antenna portion is in an open circuit an open circuit. The activation indicator component includes a first plurality of microcapsules, each having a nonconductive frangible shell containing a conductive material. The activatable environmental exposure indicator includes a second plurality of microcapsules, each having a nonconductive frangible shell containing a liquefiable material. The liquefiable material is configured to liquefy responsive to a predetermined environmental exposure. The frangible shells of the first plurality of microcapsules and the frangible shells of the second plurality of microcapsules are configured to rupture in response to an application of an activation action exceeding a predetermined activation threshold, releasing the conductive material and the liquefiable material respectively. When the conductive material is released from the frangible shells of the first plurality of microcapsules, the conductive material forms a first electrical connection across the activation indicator component, transitioning the activation indicator component to the component conductive state. When the liquefiable material liquefies responsive to the predetermined environmental exposure after the liquefiable material is released from the frangible shells of the second plurality of microcapsules, the liquefiable material forms a second electrical connection across the activatable environmental exposure indicator, transitioning the activatable environmental exposure indicator to the indicator conductive state.

In a fourth embodiment, the technology of the present disclosure is provided by an RF tag, including an integrated circuit, an antenna, having an operational antenna length, electrically connected to the antenna, and an activatable environmental exposure indicator included in the antenna, having a first state and a second state. The activatable environmental exposure indicator is configured to transition from the first state to the second state responsive to a predetermined environmental exposure occurring after an application of an activation action. The activatable environmental exposure indicator does not transition to from the first state to the second state prior to the application of the activation action, even when exposed to the predetermined environmental exposure. The operational antenna length is configured to change based on whether the activatable environmental exposure indicator is in the first state or the second state. The integrated circuit is configured to cause the antenna to emit a response signal responsive to an interrogation signal from an RFID reader having a specified frequency range and a specified power range which is received by the antenna, the response signal having a) a first read range for the RFID reader when the activatable environmental exposure indicator is in the first state and b) a second read range for the RFID reader when the activatable environmental exposure indicator is in the second state.

In an optional aspect of the first, second, third or fourth embodiment, the integrated circuit is configured to cause the antenna to emit a response signal responsive to an interrogation signal from an RFID reader having a specified frequency range and a specified power range which is received by the antenna, the response signal having a) a first read range for the RFID reader when the activatable environmental exposure indicator is in the nonconductive state and b) a second read range for the RFID reader when the activatable environmental exposure indicator is in the conductive state, the second read range being greater than the first read range.

In an example aspect of the first, second, third or fourth embodiment, responsive to the RFID reader interrogating the RF tag when the RFID reader is spaced away from the RF tag by a distance that is greater than the first read range and less than the second read range, the RF tag appears unresponsive to the RFID reader when the activatable environmental exposure indicator is in the nonconductive state and appears responsive RFID reader when the activatable environmental exposure indicator is in the conductive state.

In an example aspect of the first, second, third or fourth embodiment, responsive to the RFID reader interrogating the RF tag when the RFID reader is spaced away from the RF tag by a distance less than the first read range, the RF tag appears responsive when the activatable environmental exposure indicator is in the nonconductive state and when the activatable environmental exposure indicator is in the conductive state.

In an example aspect of the first, second, third or fourth embodiment, the RF tag is a passive RF tag, and the antenna is configured to harvest power from the interrogation signal, such that the interrogation signal powers the integrated circuit to output the response signal via the antenna.

In an example aspect of the first, second, third or fourth embodiment, the integrated circuit is configured, responsive to the RF tag being interrogated by an interrogation signal in a predetermined radiofrequency range which is received by the antenna, to cause the antenna to emit a first distinct radiofrequency response when the second antenna portion is in the closed circuit, and a second distinct radiofrequency response when the second antenna portion is in the open circuit.

In an example aspect of the first, second, third or fourth embodiment, the first distinct radiofrequency response and second distinct radiofrequency response are emitted on distinct radiofrequency bands.

In an example aspect of the first, second, third or fourth embodiment, the integrated circuit includes a memory storing a data, and at least one of the first distinct radiofrequency response and the second distinct radiofrequency response transmit the data.

In an example aspect of the first, second, third or fourth embodiment, an operating antenna length of the RF tag is a sum of a length of each antenna portion in the closed circuit with the integrated circuit, such that when the activatable environmental exposure indicator is in the nonconductive state, the operating antenna length is a length of the first antenna portion, and when the activatable environmental exposure indicator is in the conductive state, the operating antenna length is a sum of the length of the first antenna portion and a length of the second antenna portion.

In an example aspect of the first, second, third or fourth embodiment, the RF tag further includes a battery, wherein the integrated circuit is electrically connected to the battery and powered by the battery.

In an example aspect of the first, second, third or fourth embodiment, the activation action is thermal stress above a predetermined activation threshold, the predetermined threshold in a range selected from a group consisting of: a temperature exceeding 35 degrees Celsius (C), a temperature exceeding 40 degrees C., a temperature exceeding 45 degrees C., a temperature exceeding 50 degrees C., a temperature exceeding 55 degrees C., a temperature exceeding 60 degrees C., a temperature exceeding 65 degrees C., a temperature exceeding 70 degrees C., a temperature exceeding 75 degrees C., a temperature exceeding 80 degrees C., a temperature exceeding 85 degrees C., a temperature exceeding 90 degrees C., a temperature exceeding 95 degrees C., and a temperature exceeding 100 degrees C.

In an example aspect of the first, second, third or fourth embodiment, the activation action is a compression stress above a predetermined stress threshold, the predetermined stress threshold in a range selected from a group consisting of a stress exceeding 0.1 pounds per square inch (psi) a stress exceeding 0.5 psi, a stress exceeding 1 psi, a stress exceeding 2 psi, a stress exceeding 5 psi, a stress exceeding 10 psi, and a stress exceeding 15 psi.

In an example aspect of the first embodiment, the activation action is a shear stress above a predetermined shear threshold, the predetermined shear threshold in a range selected from a group consisting of a stress exceeding 0.1 psi a stress exceeding 0.5 psi, a stress exceeding 1 psi, a stress exceeding 2 psi, a stress exceeding 5 psi, a stress exceeding 10 psi, and a stress exceeding 15 psi.

In an example aspect of the first, second, third or fourth embodiment, the predetermined environmental exposure is selected from a group consisting of: a temperature excursion above a predetermined temperature, a temperature excursion above a predetermined temperature threshold for at least a predetermined amount of time, a temperature excursion below a predetermined temperature, a temperature excursion below a predetermined temperature for at least a predetermined amount of time, cumulative exposure to temperature over a time period above a predetermined threshold for at least a predetermined amount of time, an exposure to a particular chemical, an oxygen exposure, an ammonia exposure, an exposure to a particular chemical above a threshold concentration, an exposure to a particular chemical above the threshold concentration for at least a predetermined amount of time, an exposure to at least a predetermined amount of radiation of a particular type, an predetermined electromagnetic exposure, a humidity exposure, an exposure to a humidity level above a predetermined threshold, and an exposure to a humidity level above a predetermined threshold for at least a predetermined amount of time.

In an example aspect of the first, second, third or fourth embodiment, the conductive material is selected from a group consisting of: particles containing copper, particles containing silver, particles containing graphite, particles containing graphene, particles containing graphene oxide, particles containing other functionalized graphenes, particles containing conductive metals, particles containing conductive non-metal materials, and combinations thereof.

In an example aspect of the first, second, third or fourth embodiment, the frangible shells comprise a material selected from a group consisting of a protein, a gel, a polyurea formaldehyde, polymelamine formaldehyde, a wax material, an emulsion, other polymeric materials, and combinations thereof.

In an example aspect of the first, second, third or fourth embodiment, the liquefiable material includes a material selected from a group consisting of a side-chain crystallizable polymer, an alkane, a wax, an alkane wax, esters, and combinations thereof.

In an example aspect of the first, second, third or fourth embodiment, when the liquefiable material is not liquefied, the conductive material is embedded in a solid matrix formed by the liquefiable material, and the conductive material is thus blocked from forming an electrical connection, and when the liquefiable material is liquefied, the conductive material is released from the solid matrix and is not blocked from forming an electrical connection.

In an example aspect of the first, second, third or fourth embodiment, the payload includes one material which is electrically nonconductive when not liquefied, and is electrically conductive when liquefied, such that an electrical connection is formed through the liquefiable material when liquefied.

In an example aspect of the first, second, third or fourth embodiment, the activation action is applied by a thermal printhead.

In an example aspect of the first, second, third or fourth embodiment, the first predetermined environmental exposure is an environmental exposure of a first type exceeding a first exposure threshold and the second predetermined environmental exposure is another environmental exposure of the first type exceeding a second exposure threshold, the second exposure threshold being greater than the first exposure threshold.

In an example aspect of the first, second, third or fourth embodiment, the first predetermined environmental exposure is an environmental exposure of a first type, and the second predetermined environmental exposure is an environmental exposure of a second type, distinct from the first type.

In an example aspect of the first, second, third or fourth embodiment, the integrated circuit is configured to cause the antenna to emit a response signal responsive to an interrogation signal from an RFID reader having a specified frequency range and a specified power range which is received by the antenna, the response signal having a) a first read range by the RFID reader when the first activatable environmental exposure indicator is in the nonconductive state, b) a second read range by the RFID reader when the first activatable environmental exposure indicator is in the conductive state, the second read range being greater than the first read range, and c) a third read range by the RFID reader when the first activatable environmental exposure indicator is in the conductive state and the second activatable environmental exposure indicator is in the conductive state, the third read range being greater than the second read range.

In an example aspect of the first, second, third or fourth embodiment, the first state is a nonconductive state, and the second state is a conductive state.

In an example aspect of the first, second, third or fourth embodiment, the activatable environmental exposure indicator is connectively disposed between a first antenna portion of the antenna and a second antenna portion of the antenna, such that when the activatable environmental exposure indicator transitions from the first state to the second state, the activatable environmental exposure indicator establishes a closed circuit between the first antenna portion and the second antenna portion, thus increasing the operational antenna length.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed technology and explain various principles and advantages of those embodiments.

Figure 1:
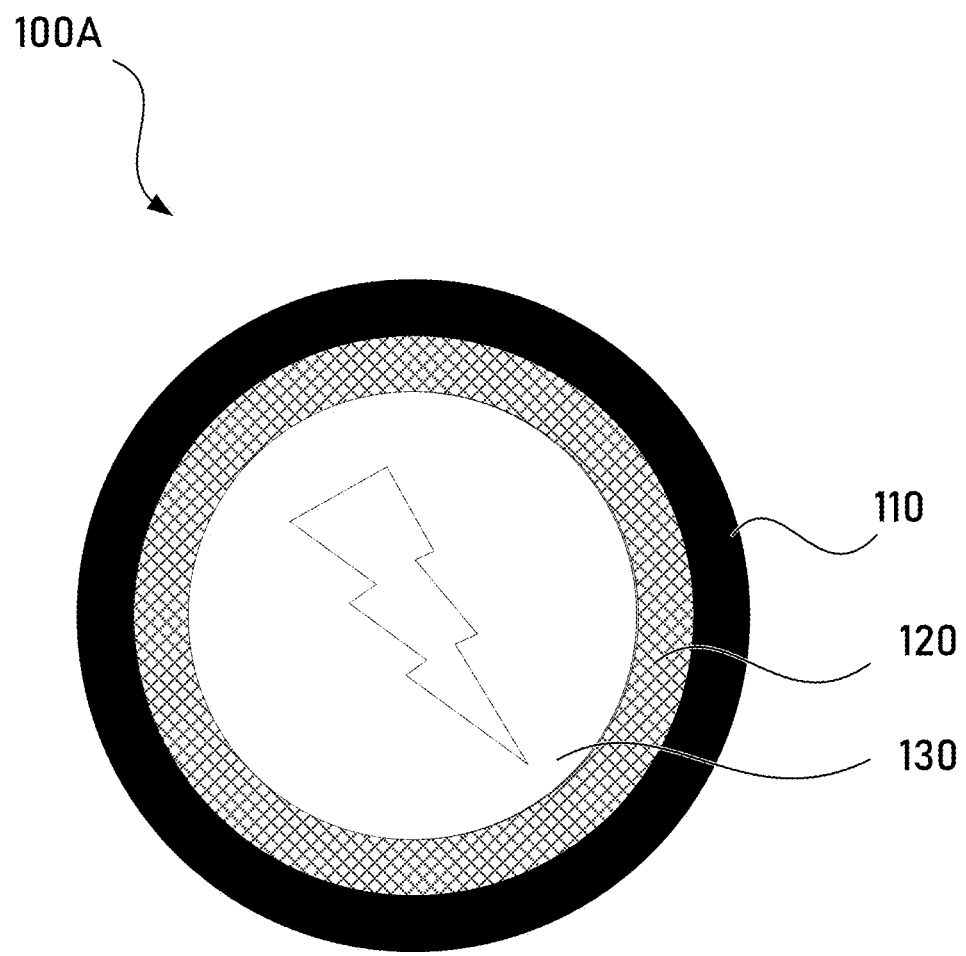
FIG. 1 illustrates a first embodiment of a microcapsule, according to embodiments of the present disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present technology.

The apparatus and method components have been represented where appropriate by conventional symbols in the drawings, showing only those specific details that are pertinent to understanding the embodiments of the present technology so as not to obscure the disclosure with details that will be readily apparent to those of ordinary skill in the art having the benefit of the description herein.

DETAILED DESCRIPTION

The technology of the present disclosure is related to an activatable indicator platform using microencapsulation technology combined with a radiofrequency (RF) tag (e.g., a radiofrequency identification or RFID tag, or a near-field communication or NFC tag). Environmental indicators (e.g., indicators incorporating an indicator material that liquifies in response to a predetermined environmental exposure) may be configured to indicate the occurrence of such a predetermined environmental exposure to a host product, (e.g., by changing appearance or by changing an electrical property of the indicator which may be detected by an appropriate circuit or computer). The change in electrical property may allow an indicator included in an RF tag to indicate exposure either by extending a read range of the RF tag, causing an alteration in a signal transmitted by the RF tag, or simply by allowing a previously inactive RF tag to transmit when interrogated, or alternatively by preventing a normally responsive RF tag from responding when interrogated. Prior to the association between the host product and the indicator, the same level of care must be paid to the indicator to prevent an exposure to the environmental condition of which the indicator is configured to indicate, such that the indicator is not spent prematurely and rendered unusable with the host product. Said differently, if a thermal indicator is to be installed on a host product, the indicator may need to be held below the temperature at which the thermal indicator is configured to indicate prior to installation of the indicator on or with a monitored host product. If a sufficient thermal exposure were to occur prior to pairing with the host product, the indicator would transition to an indicative state prior to installation, and, provided the indicator is an irreversible indicator, the indicator would be expended prior to use. For example, indicators configured for use with refrigerated items, (e.g., indicators showing when host products have warmed above a refrigerator temperature), the indicators generally need to be refrigerated prior to being paired with a host product, which results in an additional cost and more complicated inventory management and manufacturing process for the user. Using an indicator that requires an activation before it becomes sensitive to environmental exposure may help avoid these problems.

In some instances, it may be desirable to determine not only whether an activatable indicator on an RF tag has been exposed to the environmental condition, but whether the activatable indicator has actually been activated, (e.g., by an interrogation of the RF tag). This may be used, for example, to improve quality control in a manufacturing process that includes pairing activable indicators with host products and then activating them prior to their distribution. The technology of the present disclosure employs separate activation indicator components which have the same activation conditions as the activatable environmental exposure indicator of a given RF tag, but that do not change their state responsive to the environmental conditions which would trigger the associated environmental indicator. The activation indicators are associated with or incorporated with a RF tag and are configured to change the response behavior of the RF tag, such that a state of activation of the activatable environmental exposure indicator may be determined by interrogating the RF tag. For example, the RF tag may have a first read range corresponding to a state prior to activation (e.g., unactivated state), a second read range corresponding to a second state prior to the environmental exposure, but subsequent to activation (e.g., activated and unexposed state), and a third read range corresponding to a third state subsequent to both activation and the environmental exposure (e.g., activated and exposed state).

The discussion contained in the following detailed description has been organized as follows:

Section I: Some Relevant Materials and Notable Properties Thereof.

Section II: Embodiments of Activatable Environmental Exposure Indicators.

Section III: Embodiments of Activation Indicator Components.

Section IV: Embodiments of Activatable Environmentally Sensitive RF tags.

Section V: Methods of Confirming Activation of RF tags.

Section I: Some Relevant Materials and Notable Properties Thereof

Liquefiable Materials

Various embodiments of activatable environmental exposure indicators discussed herein utilize a liquefiable material that can be configured to react to an environmental exposure temperature above a predetermined threshold relatively quickly. This is because the liquefiable material of some embodiments is configured or selected to have a sharp melting point, such that liquefaction happens very quickly over a small temperature range. Thus, exposure to a predetermined environmental exposure, (e.g., a peak temperature exceeding the melting point of the liquefiable material), causes a quick state change. However, notwithstanding a relatively quick response by the liquefiable material to heat, some indicators discussed herein exhibit a time-dependent response that halts when conditions return below the environmental exposure temperature threshold and resumes again in an additive manner. Again, in some embodiments, this is due to the liquefiable material having a sharp transition between a liquid phase and a solid phase.

In other words, where an indicator is configured to signal a response after an exposure of about 30 minutes at and/or above the environmental exposure temperature threshold, a 20-minute exposure will not trigger a response, but if the indicator is again exposed to a temperature at and/or above the environmental exposure temperature threshold, only about ten more minutes of exposure will yield a response. In some embodiments as noted above, this behavior is achieved because the liquefiable solid (such as a side-chain crystalline polymer) readily solidifies within a narrow temperature range. Once the environmental exposure temperature has been exceeded, a drop in temperature below the environmental exposure will cause almost immediate cessation of the time-dependent response. The response will resume once the environmental exposure temperature threshold is again exceeded.

As used herein, the terms "predetermined environmental exposure" and "environmental exposure temperature threshold" have an understood meaning in the art and include a temperature, usually a temperature above 0° C. (though temperatures below 0° C. are also contemplated), that can cause damage or harm to a product, such as a food or a vaccine that may require refrigeration to avoid spoilage or maintain efficacy for extended periods. The term "environmental exposure temperature threshold," then, can include any predetermined temperature that is above a desired storage temperature of a perishable product, though in some cases exposure for short periods of time may not damage or harm a particular product. Thus, some embodiments disclosed herein are configured to provide signal of exposure to temperatures at and/or above an environmental exposure temperature threshold only after a specified amount of time even if exposure occurs at different times.

In some embodiments, the liquefiable material has a "sharp" liquefaction point, meaning that the transition from solid to liquid happens very quickly over a very small temperature range. In some embodiments, liquefaction temperature and solidification temperature of the liquefiable solid are identical. In some embodiments, the liquefaction and solidification temperatures are within about 0.1° C., within about 0.5° C., within about 1.0° C., within about 1.5° C., within about 2° C., within about 2.5° C., within about 3.0° C., within about 3.5° C., within about 4.0° C., within about 4.5° C., within about 5° C., or within about 10° C. of each other.

As used herein, the term "solid phase" may refer to a material in a non-liquid state such that the material is incapable of fluid flow. In some examples "solid phase" may refer to a gelled state, a highly viscous state, a true solid state, and the like. Similarly, the terms "solidification" and "solidify" are used to describe the transition in which a material not in the solid phase enters the solid phase. The terms "solidification point" and "solidification temperature" are used to describe a temperature, or temperature range, at or in which a material may undergo solidification.

As used herein, the term "liquid phase" is used to describe a state of a material in which the material is capable of fluid flow. Similarly, the terms "liquefaction" and "liquefy" are used to describe the transition in which a material not in the liquid phase enters the liquid phase. The terms "liquefaction point" and "liquefaction temperature" are used to describe a temperature, or temperature range, at or in which a material may undergo liquefaction.

Suitable liquefiable materials include synthetic polymeric materials that are solid below the threshold temperature and are, or can become, a flowing amorphous solid or a viscous liquid when at and/or above a threshold temperature. Such synthetic polymeric materials are liquefiable. Useful synthetic polymers can also be hydrophobic, if desired. Suitable liquefiable materials include side-chain crystallizable polymers (e.g., various methacrylates, such as poly(hexadecylmethacrylate); a polymer or a copolymer having at least one crystallizable side chain selected from the group consisting of a C4-30 aliphatic group; a C6-30 aromatic group; a linear aliphatic group having at least 10 carbon atoms; a combination of at least one aliphatic group and at least one aromatic group, the combination having from 7 carbon atoms to about 30 carbon atoms; a C10-C22 acrylate; a C10-C22 methacrylate; an acrylamide; a methacrylamide; a vinyl ether; a vinyl ester; a fluorinated aliphatic group having at least 6 carbon atoms; and a p-alkyl styrene group wherein the alkyl group has from about 8 carbon atoms to about 24 carbon atoms.).

As used herein, the term "polymer", and its linguistic variations, refers to copolymers, and higher order polymers, as well as homopolymers, unless the context indicates otherwise, for example, by describing or referencing one or more specific homopolymers.

When solid, the synthetic polymeric material can be crystalline or partially crystalline. Crystalline or partially crystalline synthetic polymeric materials can have desirably sharp transitions from a solid state to a liquid state.

Side chain (liquid) crystalline polymers (abbreviated as SCC hereafter) are particularly suitable liquefiable materials, though other suitable materials such as waxes could readily be used. SCC polymers have a conventional polymer backbone and side chains that can co-crystallize. Typically, they are chains that have six or more carbons with a crystallization temperature that is, therefore, adjustable. In some embodiments, the side chains "melt" independently of the main polymer chain so that the phenomenon can be used to release other materials that have been encapsulated within the overall polymer structure. Another advantage of SCC polymers is that their molecular weight and degree of crosslinking can be adjusted to control their physical properties including their permeability and in turn provide an approach to tailor the time delay.

Some examples of SCC polymers include poly(dodecylacrylate), poly(tetradecylacrylate), poly(hexadecylacrylate), poly(octadecylacrylate), copolymer of hexylacrylate and dodecylacrylate, copolymer of hexylacrylate and docosylacrylate, copolymer of decylacrylate and tetradecylacrylate, copolymer of decylacrylate and octadecylacrylate, copolymer of decylacrylate and octadecylacrylate, copolymer of decylacrylate and octadecylacrylate, copolymer of dodecylacrylate and docosylacrylate, copolymer of dodecylacrylate and docosylacrylate, copolymer of dodecylacrylate and docosylacrylate, copolymer oftetradecylacrylate and octadecylacrylate, copolymer oftetradecylacrylate and octadecylacrylate, copolymer oftetradecylacrylate and octadecylacrylate, poly(dodecylmethacrylate), poly(tetradecylmethacrylate), poly(hexadecylmethacrylate), poly(octadecylmethacrylate), copolymer of tetradecylmethacrylate and methyl methacrylate, copolymer of octadecylmethacrylate and methyl methacrylate.

For example, the liquefiable material may be a side-chain crystallizable polymer combined with an alkane wax. Some side-chain crystallizable (SCC) polymers useful in the practice of the present disclosure, alone or in combination, and methods that can be employed for preparing them, are described in O'Leary et al. "Copolymers of poly(n-alkyl acrylates): synthesis, characterization, and monomer reactivity ratios" in Polymer 2004 45 pp 6575-6585 ("O'Leary et al." herein), and in Greenberg et al. "Side Chain Crystallization of n-Alkyl Polymethacrylates and Polyacrylates" J. Am. Chem. Soc., 1954, 76 (24), pp. 6280-6285 ("Greenberg et al." herein). The disclosure of each of O'Leary et al. and Greenberg et al. is incorporated by reference herein for all purposes.

Side-chain crystallizable polymers, sometimes called "comb-like" polymers, are well-known and available commercially. These polymers are reviewed in J. Polymer Sci. Macromol. Rev. 8:117-253 (1974), the disclosure of which is hereby incorporated by reference. In general, these polymers contain monomer units X of the formula:

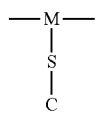

where M is a backbone atom, S is a spacer unit and C is a crystallizable group. These polymers have a heat of fusion ($\Delta H_f$) of at least about 20 Joules/g, preferably at least about 40 Joules/g. The polymers will contain about 50 to 100 percent monomer units represented by "X". If the polymer contains less than 100 percent X, in addition contain monomer units which may be represented by "Y" or "Z", or both, wherein Y is any polar or nonpolar monomer or mixture of polar or nonpolar monomers capable of polymerizing with X and/or Z, and wherein Z is a polar monomer or mixture of polar monomers. Polar groups, (e.g., polyoxyalkylenes, acrylates including hydroxyethylacrylate, acrylamides including methacrylamide) will typically increase adhesion to most substrates. If the polar species "Z" is acrylic acid, it is preferred that it comprise about 1-10 wt. percent of the polymer.

The backbone of the polymer (defined by "M") may be any organic structure (aliphatic or aromatic hydrocarbon, ester, ether, amide, etc.) or an inorganic structure (sulfide, phosphazine, silicone, etc.), and may include spacer linkages which can be any suitable organic or inorganic unit, for example ester, amide, hydrocarbon, phenyl, ether, or ionic salt (e.g., a carboxyl-alkyl ammonium or sulphonium or phosphonium ion pair or other known ionic salt pair).

The side-chain (defined by 'S' and 'C') may be aliphatic or aromatic or a combination of aliphatic and aromatic, but must be capable of entering into a crystal line state. Common examples are linear aliphatic side chains of at least 10 carbon atoms, (e.g., $C_4$-$C_{22}$ acrylates or methacrylates, acrylamides or methacrylamides, vinyl ethers or esters, siloxanes or alpha olefins; fluorinated aliphatic side-chains of at least 6 carbons; and p-alkyl styrene side-chains wherein the alkyl is of 8 to 24 carbon atoms).

The length of the side-chain moiety is usually greater than 5 times the distance between side-chains in the case of acrylates, methacrylates, vinyl esters, acrylamides, methacrylamides, vinyl ethers and alpha olefins. In the extreme case of a fluoroacrylate alternate copolymer with butadiene, the side-chain can be as little as two times the length as the distance between the branches.

In any case, the side-chain units should make up greater than 50 percent of the volume of the polymer, preferably greater than 65 percent of the volume. Specific examples of side-chain crystallizable monomers are the acrylate, fluoroacrylate, methacrylate and vinyl ester polymers described in J. Poly. Sci 10:3347 (1972); J. Poly. Sci 10:1657 (1972); J. Poly. Sci 9:3367 (1971); J. Poly. Sci 9:3349 (1971); J. Poly. Sci. 9:1835 (1971); J.A.C.S. 76:6280 (1954); J. Poly, Sci 7:3053 (1969); Polymer J. 17:991 (1985), corresponding acryl amides, substituted acrylamide and maleimide polymers (J. Poly. Sci: Poly. Physics Ed. 18:2197 (1980); polyalphaolefin polymers such as those described in J. Poly. 5,156,911 7 Sci. Macromol. Rey, 8:117-253 (1974) and Macromolecules 13:12 (1980), polyalkylvinylethers, polyalkylethylene oxides such as those described in Macromolecules 13:15 (1980), alkylphosphazene polymers, polyamino acids such as those described in Poly. Sci. USSR 21:241, Macromolecules 18:2141, polyisocyanates such as those described in Macromolecules 12:94 (1979), polyurethanes made by reacting amine- or alcohol-containing monomers with long-chain alkyl isocyanates, polyesters and polyethers, polysiloxanes and polysilanes such as those described in Macromolecules 19:611 (1986), and p-alkyl-styrene polymers such as those described in J.A.C.S. 75:3326 (1953) and J. Poly. Sci 60:19 (1962). Of specific utility are polymers which are both relatively polar and capable of crystallization, but wherein the crystallizing portion is not affected by moisture. For example, incorporation of polyoxyethylene, polyoxy propylene, polyoxybutylene or copolyoxyalkylene units in the polymer will make the polymer more polar.

In a particularly preferred embodiment herein, in the above structure, —C is selected from the group consisting of —(CH$_2$)—CH$_3$ and —(CF$_2$)$_n$—CF$_2$H, where n is an integer in the range of 8 to 20 inclusive, —S— is selected from the group consisting of —O—, —CH$_2$—, —(CO)—, —O(CO)— and —NR— where R is hydrogen or lower alkyl (1-6C), and -M- is —[(CH$_2$)$_m$—CH]— where m is 0 to 2.

Typical "Y" units include linear or branched alkyl or aryl acrylates or methacrylates, alpha olefins, linear or branched alkyl vinyl ether or vinyl esters, maleicesters or itaconic acid esters, acrylamides, styrenes or substituted styrenes, acrylic acid, methacrylic acid and hydrophilic monomers as detailed in WO84/0387, cited supra.

Some useful side-chain crystallizable polymers, and monomers for preparing side-chain crystallizable polymers, are also available from commercial suppliers, for example, Scientific Polymer Products, Inc., Ontario, N.Y., Sigma-Aldrich, Saint Louis, Mo., TCI America, Portland Oreg., Monomer-Polymer & Dajac Labs, Inc., Trevose, Pa., San Esters Corp., New York, N.Y., Sartomer USA, LLC, Exton Pa., and Polysciences, Inc. Other materials may be SCCs alone, without SCCs, or alkane waxes blended without SCCs.

Microcapsules

Various embodiments of activatable environmental exposure indicators and activation indicator components discussed herein utilize microcapsules having frangible shells, which are employed to microencapsulate a payload of other materials (e.g., liquefiable materials and conductive particles), forming a microcapsule. The frangible shells are rupturable, such that the frangible shells rupture and release the payload when subjected to an activation action.

The microcapsules may be any size, but in one such embodiment, has an outer diameter length between 50 to 750 µm. The frangible shell may be any size smaller than or equal to the outer diameter of the microcapsule. In some embodiments, the shell has a thickness of between 5 to 25 micrometers (µm). The payload ratio, or the ratio of the total weight of the payload within the microcapsule to the entire weight of the microcapsule including the contents contained within the microcapsule, can range from 50 percent to 90 percent. A variety of microcapsule frangible shell materials may be chosen, depending on the application, the mode of rupture, and the nature of the contents of the microcapsule. In general, the microcapsules should resist the passage, whether by flow, diffusion, or migration, of the contents of the microcapsule prior to rupturing.

For example, the frangible shell may be formed in whole or in part by a wax, (e.g., an alkane wax), or other acid resistant compound having a relatively high melting point, (e.g., fatty acid amide, an ester or Elvax EVA resin). For example, the melting point may be in a range of about 50 degrees Celsius (C) to about 300 degrees C., from about 100 degrees C. to about 300 degrees C., from about 150 degrees C. to about 300 degrees C., from about 200 degrees C. to about 300 degrees C., from about 250 degrees C. to about 300 degrees C. Generally, the shell should have a higher melting point than the maximum temperature the microcapsule is expected to be exposed to in normal use, to prevent it from rupturing or melting prematurely.

In another example, the frangible shell may be formed in whole or in part by a polymer coating having a high glass transition temperature ($T_g$) (e.g. Polysulfone). For example, the glass transition temperature may be in a range of about 50 degrees C. to about 300 degrees C., from about 100 degrees C. to about 300 degrees C., from about 150 degrees C. to about 300 degrees C., from about 200 degrees C. to about 300 degrees C., from about 250 degrees C. to about 300 degrees C. For example, Polysulfone, with a $T_g$ of about 190 C may be used. In additional examples, the microcapsules 100 may be one of Styrene Maleic Anhydride (SMA), Polyphenylene Ether (PPE), Cellulose Acetate, Cellulose Diacetate, Polyacrylate, Polyamide, Polycarbonate, polyether ether ketone, Polyether Sulfone, PET, PFA, polymethyl methacrylate (PMMA) or Polyimide.

In another example, the frangible shell may be formed in whole or in part by a low molecular weight polymer gel having a high melting point, (e.g., fatty acid amide, an ester or Elvax EVA resin). For example, the melting point may be in a range of about 100 degrees C. to about 300 degrees C., from about 150 degrees C. to about 300 degrees C., from about 200 degrees C. to about 300 degrees C., from about 250 degrees C. to about 300 degrees C. Additionally, in some examples, the polymer gel has a molecular weight in a range from about 1 grams per mole (g/mol) to 100,000 g/mol, from about 3,500 g/mol to 6,000 g/mol and from about 200 g/mol to 2,000 g/mol.

Alternatively, the frangible shell may be formed in whole or in part by a gel, gelatin, protein, polyurea formaldehyde, polymelamine formaldehyde, wax material, melamine, or an emulsion. The microcapsules may be available in wet and dry formulations. Polymelamine and polyurea formaldehyde can both be used for encapsulations via interfacial polymerization, which uses two immiscible phases. Once separated in the same vessel, a reaction is initiated at the interface of the two immiscible phases in the presence of an initiator and the material to be encapsulated. As polymerization occurs, microcapsules form around the core material. The microcapsule releases the contents of the microcapsule upon rupturing.

The microcapsule is initially in an unruptured form, capable of being configured to transition to a ruptured form when ruptured by exposure to an activation action, (e.g., the application of heat, pressure, and/or a combination of heat and pressure exceeding a predetermined threshold). In the unruptured form, the frangible shell of the microcapsule maintains separation between the contents of the microcapsule and any external environmental stimuli and/or contains a phase change of the contents of the microcapsule in response to any external environmental stimuli.

The frangible shell may be ruptured by applying an activation action to the microcapsule exceeding a predetermined activation threshold. The activation action may cause the frangible shell to fracture, melt, break, dissolve, sublime, become porous, or otherwise disengage, allowing the release of the contents of the frangible shell, generally referred to herein as "rupturing".

According to some embodiments, the activation action may be an application of at least one of an activation heat and an activation pressure. In some examples, the temperature threshold for activation may be in a range selected from about 0 degrees C. to 300 degrees C., from about 90 degrees C. to 110 degrees C., from about 100 degrees C. to 200 degrees C., from about 100 degrees C. to 300 degrees C., and from about 200 degrees C. to 300 degrees C.

In some examples, rupturing the microcapsule may be achieved by applying a high temperature for a very short interval, (e.g., a few milliseconds). For example, the mass or heat of fusion of the indicator may be much greater than the mass or heat of fusion of a barrier that needs to be removed, allowing a short exposure to high temperature to remove or alter the microcapsule without significantly affecting the contents of the microcapsule.

In some cases, pressure may also contribute to rupturing the microcapsule, either alone or in combination with elevated temperature. In such embodiments, the activation action is a compressive stress, or a shearing stress, where the predetermined activation threshold is a stress exceeding about 0.1 pounds per square inch (psi), a stress exceeding about 0.5 psi, a stress exceeding about 1 psi, a stress exceeding about 2 psi, a stress exceeding about 5 psi, a stress exceeding about 10 psi, or a stress exceeding about 15 psi.

The activation action may include the application of heat to reach an activation temperature, the application of an activation pressure, or a combination thereof As a non-limiting example, media including the microcapsules can be processed by a thermal printer, where a thermal printhead of the thermal printer can provide the activation action, (e.g., the activation temperature, the activation pressure, or combination thereof). In some examples, the temperature threshold for activation may be from about −40° C. to 100° C., from about 5° C. to 35° C., from about 0° C. to 300° C., from about 90° C. to 110° C., from about 100° C. to 200° C., from about 100° C. to 300° C., and from about 200° C. to 300° C. Rupture of the microcapsules may be achieved by applying a high temperature for a very short interval, (e.g., a few milliseconds). In this manner, even if the temperature needed to activate the device exceeds the temperature that a temperature exposure indicator is configured to indicate, the exposure may be so short that the indicator itself is not affected. For example, the mass or heat of fusion of the indicator may be much greater than the mass or heat of fusion of a barrier that needs to be removed, allowing a short exposure to high temperature to remove or alter the microcapsule without significantly affecting the contents of the microcapsule. Typical thermal printheads have temperatures in the range from about 100° C. to 300° C., which may be tuned downward for select applications to from about 100° C. to 200° C. They are typically exposed to thermal printheads for a brief period of time, for example a few milliseconds. The microcapsule itself responds when it reaches a temperature of in a range from about −40° C. to 100° C., from about 5° C. to 35° C., from about 0° C. to 300° C., from about 90° C. to 110° C., from about 100° C. to 200° C., from about 100° C. to 300° C., and from about 200° C. to 300° C. The activation temperature ranges given are purely exemplary and other ranges may be sufficient to rupture the microcapsules, where such pressure ranges may vary based on a composition of the frangible shell, a thickness of the frangible shell, a ratio between the shell thickness or weight to volume or weight of the indicator material, a diameter of the microcapsules, a temperature applied to the shells, etc. In some cases, pressure may also contribute to the rupturing the microcapsules, either alone like an impact printer, or in combination with elevated temperature. In some examples, the activation pressure required to rupture the microcapsules may be from about 1.5 to 8 pounds per square inch or from about 4 to 15 pounds per square inch. The activation pressure ranges given are purely exemplary and other ranges may be sufficient to rupture the microcapsules, where such pressure ranges may vary based on a composition of the frangible shell, a thickness of the frangible shell, a ratio between the shell thickness or weight to volume or weight of the indicator material, a diameter of the microcapsules, a temperature applied to the shells, etc.

In some examples, the microcapsules may be ruptured or weakened by a source of internal pressure, where the activation action is configured to trigger expansion of a material within the frangible shell (e.g., a thermally expansive material, thermally expandable microsphere) which increases the internal pressure of the microcapsule, which ruptures or weakens the frangible shell.

According to some embodiments, the frangible shell is electrically nonconductive, insulative, resistive, or otherwise resists, and may substantially prevent the conduction of electricity through the microcapsule.

According to some embodiments, the microcapsules may be configured to rupture in response to thermal and pressure stresses applied by a thermal printer.

Section II: Embodiments of Activatable Environmental Exposure Indicators

Section II discusses various embodiments of activatable environmental exposure indicators (e.g., activatable environmental exposure indicators 200), which may employ one or more embodiments of rupturable microcapsules (e.g., microcapsules 100) in one or more mechanisms to indicate an exposure of the activatable environmental exposure indicator to a predetermined environmental exposure which occurs after the application of an activation action to the activatable environmental exposure indicator. Of particular importance in the present disclosure are activatable environmental exposure indicators which change electrical properties, such as going from nonconductive to conductive, or vice versa, changing resistance, capacitance, or other detectable electrical property. These sorts of indicators are suitable for incorporation in electrical circuits, (e.g., those in an RF tag), in order to cause a change in electrical behavior of such circuits responsive to the change of electrical property of indicator.

According to some embodiments, each activatable environmental exposure indicator has an unactivated state, prior to the application of the activation action. In the unactivated state, the frangible shells of the microcapsules block the payload of the microcapsules from flowing, diffusion or migrating outside of the microcapsules, preventing the activatable environmental exposure indicator from transitioning from one state to another, regardless of the occurrence or non-occurrence of a predetermined environmental exposure.

After the application of the activation action, each activatable environmental exposure indicator has a respective unexposed state and a respective exposed state, such that the transition from the unexposed state to the exposed state indicates that the activatable environmental exposure indicator has been exposed to the predetermined environmental exposure, after the indicator has been activated.

According to some embodiments, the unexposed state maybe an indicator conductive state, in which the activatable environmental exposure indicator 200 facilitates an electrical connection, or a flow of electrical current, through the activatable environmental exposure indicator.

According to some embodiments, the unexposed state may be an indicator nonconductive state, in which the indicator blocks, resists, impedes, or otherwise prevents the flow of electrical current through the activatable environmental exposure indicator.

According to some embodiments, the unexposed state may be a state in which the activatable environmental exposure indicator has a first distinct electrical property, such as a first capacitance, a first resistance, a first impedance, a first inductance, a first conductivity, or a first value of a similar property.

According to some embodiments, the exposed state may be an indicator conductive state, in which the activatable environmental exposure indicator 200 facilitates an electrical connection, or a flow of electrical current, through the activatable environmental exposure indicator 200.

According to some embodiments, the exposed state may be an indicator nonconductive state, in which the indicator blocks, resists, impedes, or otherwise prevents the flow of electrical current through the activatable environmental exposure indicator 200.

According to some embodiments, the exposed state may be a state in which the activatable environmental exposure indicator 200 has a second distinct electrical property, such as a second capacitance, a second resistance, a second impedance, a second inductance, a second conductivity, or a second value of the similar property.

Microcapsule: First Embodiment

Figure 2A:
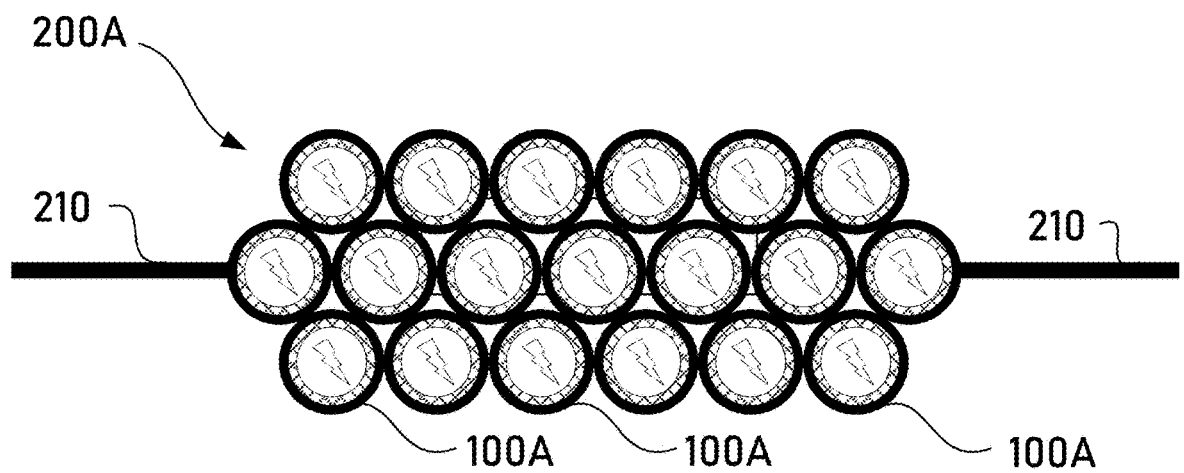
FIGS. 2A-2C illustrate various stages of a first embodiment of an activatable environmental exposure indicator employing the microcapsule of FIG. 1, according to embodiments of the present disclosure.
Figure 2B:
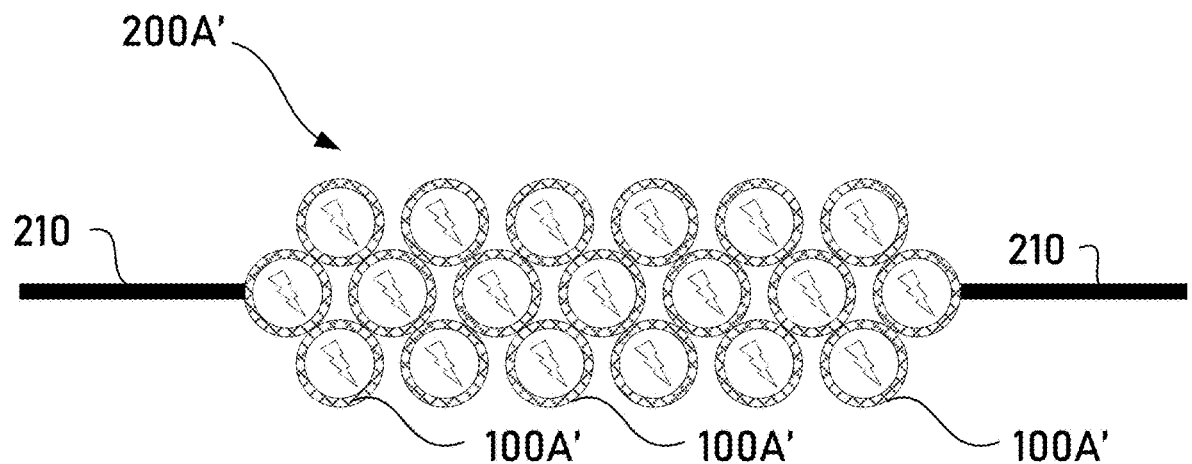
Figure 2C:
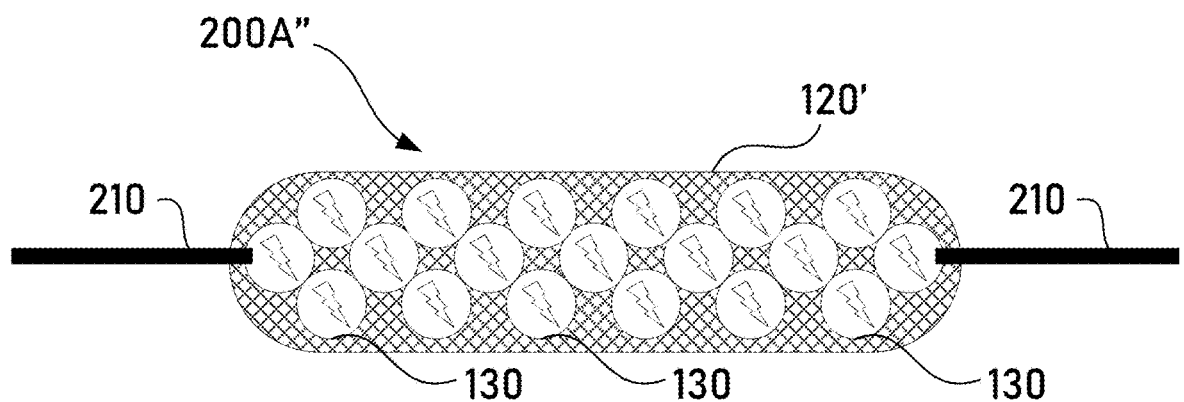
Figure 3A:
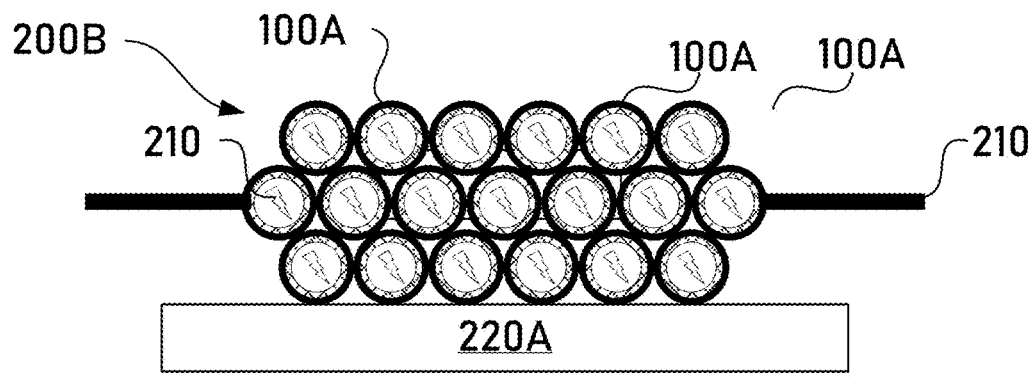
FIGS. 3A-3D illustrate various stages of a second embodiment of an activatable environmental exposure indicator employing the microcapsule of FIG. 1, according to embodiments of the present disclosure.
Figure 3B:
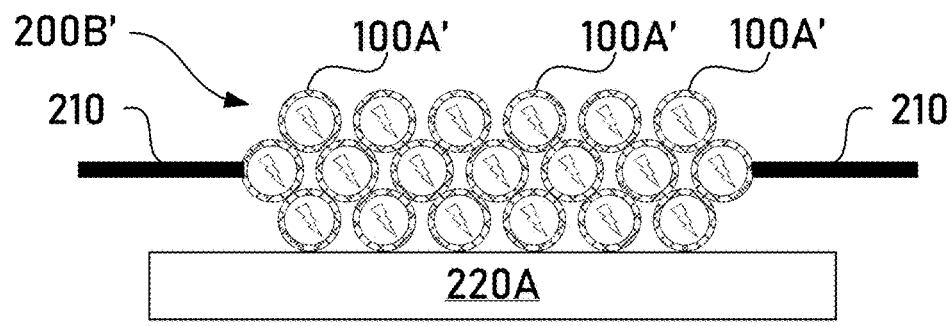
Figure 3C:
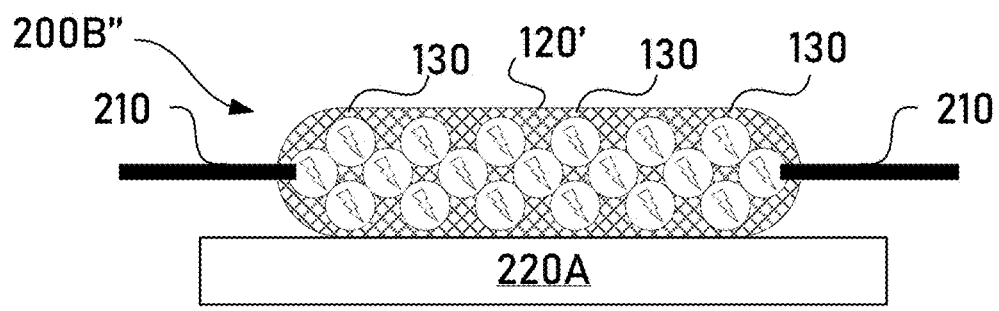

FIG. 1 illustrates a cross-sectional view of a first embodiment of a microcapsule 100A, according to embodiments of the present disclosure. The microcapsule 100A may be a component employed in various embodiments of the activatable environmental exposure indicators of the present disclosure, including, for example, the first embodiment of the activatable environmental exposure indicator 200A (e.g., as shown in FIGS. 2A-C) and the second embodiment of the activatable environmental exposure indicator 200B (e.g., as shown in FIGS. 3A-C), according to embodiments of the present disclosure. According to some embodiments the microcapsule 100A (e.g. microsphere) includes a conductive particle 130 embedded in a liquefiable material 120. The conductive particle 130 and liquefiable material 120 are collectively microencapsulated in a shell 110. The shell 110 of the microcapsule 100A may include any of the features and properties of the frangible shells discussed above in Section I.

The conductive particle 130 is smaller in relation to the microcapsule 100A, and multiple conductive particles 130 may be embedded in the liquefiable material 120 in a single microcapsule 100A, either as a single integrated piece, or each with their own separate portion of the liquefiable material 120.

The microcapsule 100A may be any size, but in one such embodiment, has an outer diameter length between 50 to 750 µm. The shell 110 may be any size smaller than or equal to the outer diameter of the microcapsule 100A. In some embodiments, the shell 110 has a thickness of between 5 to 25 micrometers (µm). The payload, or the ratio of the total weight of the contents (e.g. conductive particle 130, liquefiable material 120) within the microcapsule 100A to the entire weight of the microcapsule 100A including the contents contained within the microcapsule 100A, can range from 50 percent to 90 percent. A variety of microcapsule shell 110 materials may be chosen, depending on the application, the mode of rupture, and the nature of the contents of the microcapsule 100A. In general, the shells 110 should resist the passage, whether by flow, diffusion, or migration, of the contents of the microcapsule 100A, prior to rupturing.

The microcapsule 100A is initially in an unruptured form, capable of being configured to transition to a ruptured form when ruptured through exposure to an activation action, (e.g., the application of heat, pressure, and/or heat and pressure exceeding a predetermined threshold). In the unruptured form, the shell 110 of the microcapsule 100A maintains separation between the payload and any external environmental stimuli and/or contains a phase change of the payload of the microcapsule 100A in response to any external environmental stimuli.

According to some embodiments, the microcapsule 100A is configured to rupture responsive to an activation action. The activation action may be one, or a combination of one or more activation actions as described above in Section I.

The microcapsule 100A includes a liquefiable material 120, according to embodiments of the present disclosure. The liquefiable material 120 may be any such material capable liquefying from a substantially solid phase (e.g., solid, semi-solid, highly viscous, and/or gelled state) to a liquid phase (e.g., fluid, relatively less viscous state) upon the occurrence of a predetermined environmental exposure. In some examples, the liquefiable material 120 may include any of the features and properties of the liquefiable materials described above in Section I.

The liquefiable material 120 is configured to liquefy responsive to a predetermined environmental exposure. The shell 110 of the microcapsule 100A may be utilized in order to prevent wicking or migration of the liquefiable material 120 prior to subjection to an activation action even when the liquefiable material 120 encapsulated in the microcapsules is exposed to the predetermined environmental exposure. Alternatively, the microcapsule 100A may insulate the payload from the predetermined environmental exposure.

According to some embodiments, the predetermined environmental exposure may be one of a temperature excursion above a predetermined temperature, a temperature excursion above a predetermined temperature threshold for at least a predetermined amount of time, a temperature excursion below a predetermined temperature, a temperature excursion below a predetermined temperature for at least a predetermined amount of time, cumulative exposure to temperature over a time period above a predetermined threshold for at least a predetermined amount of time, an exposure to a particular chemical, an oxygen exposure, an ammonia exposure, an exposure to a particular chemical above a threshold concentration, an exposure to a particular chemical above the threshold concentration for at least a predetermined amount of time, an exposure to at least a predetermined amount of radiation of a particular type, an predetermined electromagnetic exposure, a humidity exposure, an exposure to a humidity level above a predetermined threshold, and an exposure to a humidity level above a predetermined threshold for at least a predetermined amount of time, combinations thereof, and the like.

In one embodiment, the liquefiable material 120 is a meltable solid configured to melt in response to a temperature above a predetermined threshold, forming a liquid. In another embodiment, the liquefiable material 120 is a gel configured to, in response to a predetermined environmental exposure above a predetermined threshold, change viscosity such that the gel is substantially liquefied and is capable of fluid flow.

According to some embodiments, the liquefiable material 120 is electrically nonconductive, insulative, resistive, or otherwise resists or substantially prevents the conduction of electricity through the liquefiable material 120. In some examples, the liquefiable material 120 is electrically conductive, and facilitates the conduction of electricity through the liquefiable material 120. In some examples, the liquefiable material 120 is electrically nonconductive when in one of the liquid phase and the solid phase, and is electrically conductive when in the other of the liquid phase and the solid phase. In some examples the carrier material has a first electrical conductivity when in one of the solid phase, the liquid phase, and a first viscous state, and has a second electrical conductivity in another of the solid phase, the liquid phase, and a second viscous state.

According to some embodiments, the microcapsule 100A includes a conductive particle 130. In some examples the microcapsule 100A includes a plurality of conductive particles 130. Conductive particles 130 may include particles of conductive metals, such as copper, silver, gold, aluminum, zinc, tin, similar metals, and alloys thereof. The conductive particles 130 may also or alternatively include particles of graphene, graphite, carbon black, graphene oxides, and other functionalized graphenes, and/or particles containing other conductive non-metals. The conductive particles 130 may be formed in whole or in part by any electrically conductive substance or material operable to be partialized to a sufficient size to fit within the shell 110 of the microcapsule 100A.

FIGS. 2A-3D illustrate several embodiments of activatable environmental exposure indicators 200 which employ the first embodiment of the activatable microcapsule 100, microcapsule 100A, as discussed in reference to FIG. 1.

Activatable Environmental Exposure Indicator: First Embodiment

FIGS. 2A-2C illustrate a first embodiment of the activatable environmental exposure indicator 200A, according to embodiments of the present disclosure. The activatable environmental exposure indicator 200A is configured to transition from a nonconductive state a conductive state, responsive to a predetermined environmental exposure occurring subsequent to the application of an activation action.

As illustrated in FIG. 2A, the first embodiment of the activatable environmental exposure indicator 200A, among other embodiments of the activatable environmental exposure indicator 200 may include a plurality of microcapsules 100A, each microcapsule 100A including a conductive particle 130 contained (e.g., suspended, embedded in a solid matrix) within a liquefiable material 120, microencapsulated in a shell 110. The activatable environmental exposure indicator 200A forms a portion of (e.g., physically couples two sections of) a wire/trace 210. The unexposed state of the activatable environmental exposure indicator 200A is a nonconductive state (e.g., indicator nonconductive state), and the exposed state of the activatable environmental exposure indicator 200A is a conductive state (e.g., indicator conductive state). When the activatable environmental exposure indicator 200A is in the indicator nonconductive state, the activatable environmental exposure indicator 200A does not conduct electricity through the wire/trace 210. According to some embodiments, when in the indicator nonconductive state, the activatable environmental exposure indicator 200A blocks, impedes, resists or otherwise prevents the conduction of electricity and electrical signals through the wire/trace 210. When the activatable environmental exposure indicator 200A is in the indicator conductive state, the activatable environmental exposure indicator 200A forms an electrical connection across the wire/trace 210, and electricity flows through the activatable environmental exposure indicator 200A and through the wire/trace 210. Said differently, the activatable environmental exposure indicator 200A is an electrical switch that is operable to be opened or closed in response to exposure to a predetermined environmental condition after an activation action. When the activatable environmental exposure indicator 200A is in the indicator conductive state, the switch is closed, and when the activatable environmental exposure indicator 200A is in the indicator nonconductive state, the switch is open.

FIG. 2A illustrates the first embodiment of the activatable environmental exposure indicator 200A is in a first stage, prior to the application of the activation action and prior to the predetermined environmental exposure. In the first stage, the shells 110 of the microcapsules 100A are intact, and the liquefiable material 120 and conductive particles 130 are contained. In the first stage, the activatable environmental exposure indicator 200A is in the nonconductive state (e.g., the switch is open). Furthermore, the liquefiable material 120 and the conductive particles 130 are isolated from the environment, so environmental sensing cannot yet occur.

FIG. 2B illustrates the first embodiment of the activatable environmental exposure indicator 200A' in a second stage, after the application of the activation action, and prior to the predetermined environmental exposure, according to embodiments of the present disclosure. As illustrated in FIG. 2B, the microcapsules 100A' have been ruptured responsive to the application of the activation action, and the liquefiable material 120 is now released from the microcapsules into the environment (e.g., within the physical confines of the activatable environmental exposure indicator, but generally exposable to the environmental condition to which the activatable environmental exposure indicator is configured to monitor). The activatable environmental exposure indicator 200A' remains in the nonconductive state, as the conductive particles 130 remain embedded in a solid matrix of the liquefiable material 120 and are thus blocked from contact with one another. In some examples, the liquefiable material 120 may be non-conductive in the solid phase, and electrical connection across the wire/trace 210 and through the activatable environmental exposure indicator 200 is still substantially prevented by the liquefiable material 120. Because the liquefiable material 120 is released into the environment, the activatable environmental exposure indicator 200A is activated, and primed to transition to the conductive state responsive to the predetermined environmental exposure. When the activatable environmental exposure indicator 200A' is activated, environmental sensing begins.

FIG. 2C illustrates the first embodiment of the activatable environmental exposure indicator 200A" in a third stage, after the application of the activation action and after the predetermined environmental exposure, according to embodiments of the present disclosure. In the third stage, the liquefiable material 120 liquefies, and releases the conductive particles 130, such that the conductive particles 130 are no longer blocked from migration. Once released, the conductive particles 130 form an electrical connection (e.g., first electrical connection, second electrical connection). In some examples, the conductive particles 130 may be drawn together, by magnetic, mechanical, chemical, and/or electrical forces, to form the electrical connection across the wire/trace 210, transitioning the activatable environmental exposure indicator 200A" to the conductive state. In this manner, the activatable environmental exposure indicator 200A" may be employed to indicate the occurrence of the predetermined environmental exposure following activation.

Activatable Environmental Exposure Indicator: Second Embodiment

FIGS. 3A-3D illustrate a second embodiment of the activatable environmental exposure indicator 200B, according to embodiments of the present disclosure. The activatable environmental exposure indicator 200B is configured to transition from a nonconductive state to a conductive state, responsive to a predetermined environmental exposure occurring subsequent to the application of an activation action.

As illustrated in FIGS. 3A-3D, the second embodiment of the activatable environmental exposure indicator 200B, among other embodiments of the activatable environmental exposure indicator 200 may include a plurality of microcapsules 100A, each microcapsule 100A including a conductive particle 130 contained (e.g., suspended, embedded in a solid matrix) within a liquefiable material 120, microencapsulated in a shell 110. The activatable environmental exposure indicator 200B further includes a first type of wick 220A. The activatable environmental exposure indicator 200B forms a portion of (e.g., physically couples two sections of) a wire/trace 210. The unexposed state of the activatable environmental exposure indicator 200D is a nonconductive state (e.g., indicator nonconductive state) and the exposed state of the activatable environmental exposure indicator 200B is a conductive state (e.g., indicator conductive state). When the activatable environmental exposure indicator 200B is in the nonconductive state, the activatable environmental exposure indicator 200B does not conduct electricity through the wire/trace 210. According to some embodiments, when in the nonconductive state, the activatable environmental exposure indicator 200B blocks, impedes, resists, or otherwise prevents the conduction of electricity and electrical signals through the wire/trace 210. When the activatable environmental exposure indicator 200B is in the conductive state, the activatable environmental exposure indicator 200B forms an electrical connection across the wire/trace 210, and electricity flows through the activatable environmental exposure indicator 200B and through the wire/trace 210. Said differently, the activatable environmental exposure indicator 200B is an electrical switch that is operable to be opened or closed in response to exposure to a predetermined environmental condition after an activation action. When the activatable environmental exposure indicator 200B is in the conductive state, the switch is closed, and when the activatable environmental exposure indicator 200B is in the nonconductive state, the switch is open. The wick 220A may disposed proximately, (e.g., adjacent) to both the wire/trace 210 and the microcapsules 100A. According to some embodiments, the wick 220A is permeable with respect to the liquefiable material 120 when liquefied, and not permeable with respect to the conductive particles 130.

FIG. 3A illustrates the second embodiment of the activatable environmental exposure indicator 200B in a first stage, prior to the application of the activation action and prior to the predetermined environmental exposure. Prior to the activation action, the shells 110 of the microcapsules 100A are intact, and the liquefiable material 120 and conductive particles 130 are contained. Prior to the application of the activation action, the activatable environmental exposure indicator 200B is in the nonconductive state (e.g., the switch is open). Furthermore, the liquefiable material 120 and the conductive particles 130 are isolated from the environment, so environmental sensing cannot yet occur.

FIG. 3B illustrates the first embodiment of the activatable environmental exposure indicator 200B' in a second stage, after the application of the activation action, and prior to the predetermined environmental exposure, according to embodiments of the present disclosure. As illustrated in FIG. 3B, the microcapsules 100A' have been ruptured responsive to the application of the activation action, and the liquefiable material 120 is now released from the microcapsules into the environment. The activatable environmental exposure indicator 200B' remains in the nonconductive state, as the conductive particles 130 remain embedded in a solid matrix of the liquefiable material 120 and are thus blocked from contact with one another. In some examples, the liquefiable material 120 may be non-conductive in the solid phase, and electrical connection across the wire/trace 210 and through the activatable environmental exposure indicator 200 is still substantially prevented by the liquefiable material 120. Because the liquefiable material 120 is released from the microcapsules into the environment, the activatable environmental exposure indicator 200A is activated, and primed to transition to the conductive state responsive to the predetermined environmental exposure. When the activatable environmental exposure indicator 200A' is activated, environmental sensing begins.

FIG. 3C illustrates the first embodiment of the activatable environmental exposure indicator 200A" in a third stage, after the application of the activation action and immediately after the predetermined environmental exposure, according to embodiments of the present disclosure. After the predetermined environmental exposure, the liquefiable material 120 liquefies to liquefied liquefiable material 120', and releases the conductive particles 130, such that the conductive particles 130 are no longer blocked from migration. Once released, the conductive particles 130 begin to form an electrical connection (e.g., first electrical connection, second electrical connection). In some examples, the conductive particles 130 may be drawn together, by magnetic, mechanical, chemical, and/or electrical forces, to begin to form the electrical connection across the wire/trace 210 and begin to transition the activatable environmental exposure indicator 200A" to the conductive state.

Figure 3D:
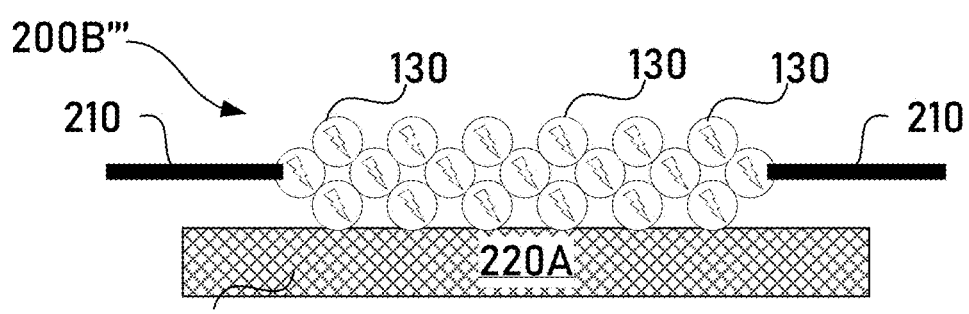

FIG. 3D illustrates the first embodiment of the activatable environmental exposure indicator 200A" in a fourth stage after the application of the activation action and a predetermined period of time after the predetermined environmental exposure, according to embodiments of the present disclosure. The wick 220A draws the liquefied liquefiable material 120' into the wick, leaving the conductive particles 130 on the exterior of the wick 220A, as the wick 220 is impermeable with respect to the conductive particles 130. In some embodiments, the wick 220A may improve the conductive quality of the electrical connection formed by the conductive particles 130. Even after liquefaction, the liquefied liquefiable material 120' may hinder or otherwise obstruct the formation of the electrical connection by the conductive particles 130. The wick 220A draws the liquefied liquefiable material 120' away from the conductive particles 130 into the wick 220A, such that the conductive particles 130 are unhindered in the formation of the electrical connection. By drawing the liquefied liquefiable material 120' into the wick 220A, the transition to the conductive state is made irreversible.

According to some embodiments, the wick 220A may be configured to draw the liquefied liquefiable material 120' into the wick 220A at a predetermined rate, such the second embodiment of the activatable environmental exposure indicator 200B may be employed as a time-sensitive indicator, and the activatable environmental exposure indicator 200B" does not fully transition from the third stage to the fourth stage until a predetermined period of time has passed while the liquefiable material 120 has been liquefied.

Microcapsule: Second Embodiment

Figure 4:
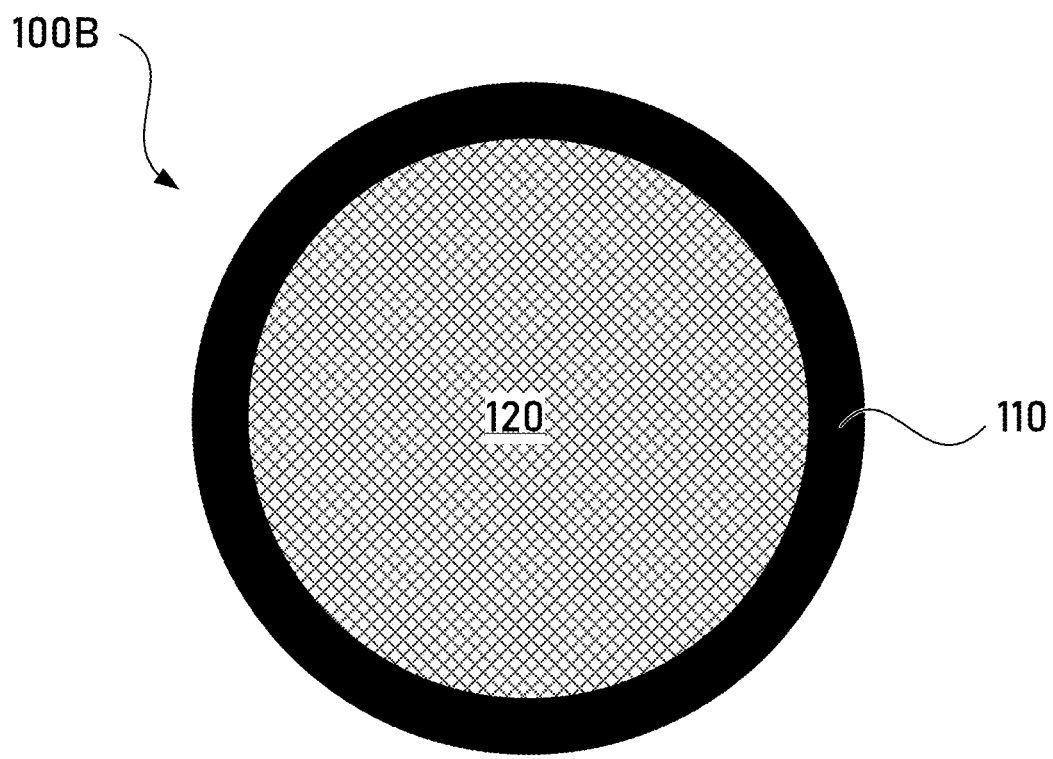
FIG. 4 illustrates a second embodiment of a microcapsule, and a conductive particle, according to embodiments of the present disclosure.

FIG. 4 illustrates a cross-sectional view of a microcapsule 100B, where the microcapsule 100B is a second embodiment of a microcapsule 100, according to embodiments of the present disclosure. As shown in FIG. 4, the microcapsule can be devoid of conductive particles (e.g., conductive particles 130). The microcapsule 100B may be a component employed in various embodiments of the activatable environmental exposure indicator 200, including the fourth embodiment of the activatable environmental exposure indicator 200D, according to embodiments of the present disclosure. According to some embodiments, the microcapsule 100B (e.g. microsphere) contains the liquefiable material 120. The liquefiable material 120 can be electrically nonconductive. The liquefiable material 120 is microencapsulated in a shell 110. The shell 110 of the microcapsule 100B may include any of the features and properties of the frangible shells discussed above in Section I.

FIGS. 5A-D illustrate an example embodiment of activatable an environmental exposure indicator 200 which employs the second embodiment of the activatable microcapsule 100, microcapsule 100B, as discussed in reference to FIG. 4.

Activatable Environmental Exposure Indicator: Third Embodiment

FIGS. 5A-5D illustrate various stages of a third embodiment of the activatable environmental exposure indicator 200C, according to embodiments of the present disclosure. The activatable environmental exposure indicator 200C is configured to transition from a conductive state a nonconductive state, responsive to a predetermined environmental exposure occurring subsequent to the application of an activation action.

Figure 5A:
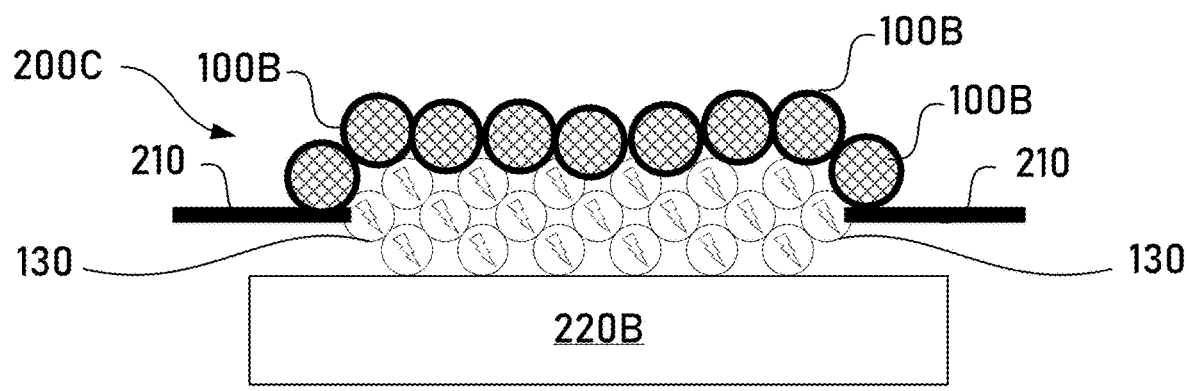
FIGS. 5A-5D illustrate various stages of a third embodiment of an activatable environmental exposure indicator employing the microcapsule and conductive particle of FIG. 4.

The third embodiment of the activatable environmental exposure indicator 200C among other embodiments of the activatable environmental exposure indicator 200 may include a plurality of microcapsules 100B, each microcapsule 100B including a liquefiable material 120 microencapsulated in a shell 110. The activatable environmental exposure indicator 200C further includes a plurality of conductive particles 130, and a second type of wick 220B. As shown in FIG. 5A, the conductive particles 130 are separate from the microcapsules 100B. The conductive particles 130 may include particles of conductive metals, such as copper, silver, gold, aluminum, zinc, tin, similar metals, and alloys thereof The conductive particles 130 may also include particles of graphene, graphite, graphene oxides, and other functionalized graphenes, carbon black, and/or particles containing other conductive non-metals. The conductive particles 130 may be formed in whole or in part by any electrically conductive substance or material operable to be partialized. The activatable environmental exposure indicator 200C forms a portion of (e.g., physically couples two sections of) a wire/trace 210. The unexposed state of the activatable environmental exposure indicator 200C is a conductive state (e.g., indicator conductive state), and the exposed state of the activatable environmental exposure indicator 200C is a nonconductive state (e.g., indicator nonconductive state). When the activatable environmental exposure indicator 200C is in the indicator nonconductive state, the activatable environmental exposure indicator 200C does not conduct electricity through the wire/trace 210. According to some embodiments, when in the indicator nonconductive state, the activatable environmental exposure indicator 200C blocks, impedes, resists, or otherwise prevents the conduction of electricity and electrical signals through the wire/trace 210. When the activatable environmental exposure indicator 200C is in the indicator conductive state, the activatable environmental exposure indicator 200C forms an electrical connection across the wire/trace 210, and electricity flows through the activatable environmental exposure indicator 200C and through the wire/trace 210. Said differently, the activatable environmental exposure indicator 200C is an electrical switch that is operable to be opened or closed in response to exposure to a predetermined environmental condition after an activation action. When the activatable environmental exposure indicator 200C is in the indicator conductive state, the switch is closed, and when the activatable environmental exposure indicator 200C is in the indicator nonconductive state, the switch is open.

According to some embodiments, the second type of wick 220B is permeable with respect to both the liquefied liquefiable material 120' and conductive particles 130.

FIG. 5A illustrates the third embodiment of the activatable environmental exposure indicator 200C in a first stage, prior to the application of the activation action and prior to the predetermined environmental exposure, according to embodiments of the present disclosure. In the first stage, the activatable environmental exposure indicator 200C is in the unexposed state, and thus in the indicator conductive state. The plurality of conductive particles 130 form an electrical connection through the activatable environmental exposure indicator 200C, such that the electrical switch is closed. The conductive particles 130 are disposed relative to the wire/trace 210 such that the electrical connection therethrough is supported. The plurality of microcapsules 100B are disposed proximately to the plurality of conductive particles 130. The wick 220B is disposed proximately to the plurality of conductive particles 130. According to some embodiments, the plurality of conductive particles 130 is sandwiched between the plurality of microcapsules 100B and the wick 220B. In the first stage, the shells 110 of the microcapsules 100B are intact, and the liquefiable material 120 is isolated from the environment, so environmental sensing cannot yet occur.

Figure 5B:
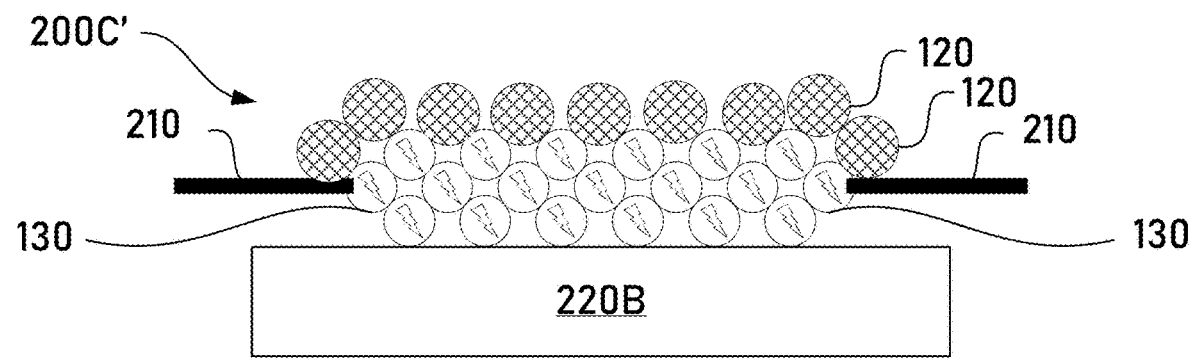

FIG. 5B illustrates the third embodiment of the activatable environmental exposure indicator 200B' in a second stage, after the application of the activation action, and prior to the predetermined environmental exposure, according to embodiments of the present disclosure. In the second stage, the microcapsules 100B have been ruptured responsive to the application of the activation action, and the liquefiable material 120 is now released from the microcapsules into the environment. In the second stage, the activatable environmental exposure indicator 200C' remains in the indicator conductive state, as the conductive particles 130 remain in contact with one another, supporting the electrical connection across the activatable environmental exposure indicator 200C. Because the liquefiable material 120 is released from the microcapsules into the environment, the activatable environmental exposure indicator 200C' is activated, and primed to transition to the indicator nonconductive state responsive to the predetermined environmental exposure. When the activatable environmental exposure indicator 200C' is activated, environmental sensing begins.

Figure 5C:
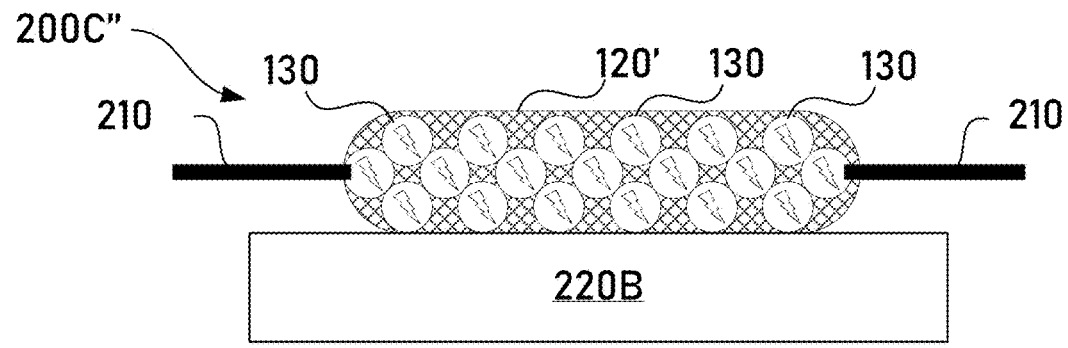

FIG. 5C illustrates the third embodiment of the activatable environmental exposure indicator 200C" in a third stage, after the application of the activation action and immediately after the predetermined environmental exposure, according to embodiments of the present disclosure. The liquefiable material 120 liquefies to liquefied liquefiable material 120' and is drawn into the wick 220B and through the plurality conductive particles 130. As the liquefied liquefiable material 120' is drawn into the wick 220B, and the liquefied liquefiable material 120' begins to disrupt electrical conduction formed through the plurality of conductive particles 130. In some examples, the viscosity of the liquefied liquefiable material 120' is sufficient to move the conductive particles 130 and contract the conductive particles 130 into the flow of liquefied liquefiable material 120'. The third stage is when the activatable environmental exposure indicator 200C''' begins to transition from the unexposed state to the exposed state. The liquefied liquefiable material 120' may begin to disrupt the electrical connection formed by the conductive particles 130 in the third stage but does not yet disengage the electrical connection entirely or does not displace the conductive particles from their position relative to the wire/trace.

Figure 5D:
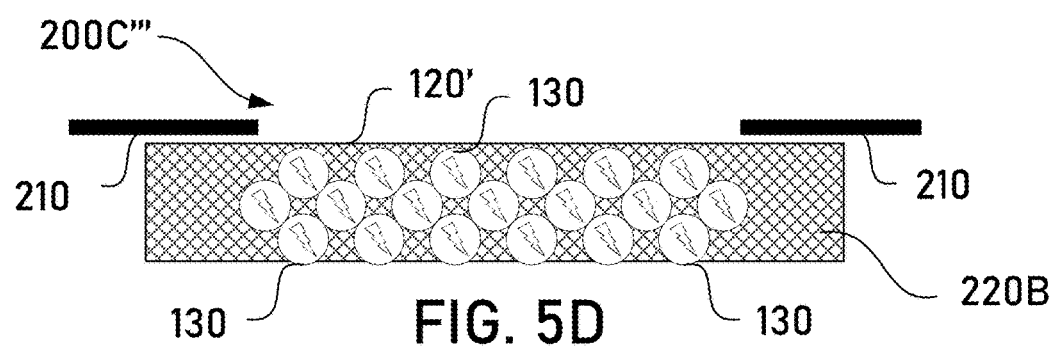

FIG. 5D illustrates the third embodiment of the activatable environmental exposure indicator 200C''' in a fourth stage, according to embodiments of the present disclosure. In the fourth stage, the activatable environmental exposure indicator 200C''' fully transitions to the exposed state, where the activatable environmental exposure indicator 200C'' is in the indicator nonconductive state. The wick 220B, which is permeable with respect to both the liquefied liquefiable material 120' and the conductive particles 130, draws the liquefied liquefiable material 120' into the wick 220B, and also draws the conductive particles 130 into the wick 220B, as the conductive particles 130 are contracted into the flow of liquefied liquefiable material 120'. When the conductive particles 130 are drawn into the wick 220B by the liquefied liquefiable material 120', the electrical connection through the activatable environmental exposure indicator 200C is disengaged, and the activatable environmental exposure indicator 200C''' is in the indicator nonconductive state.

According to some embodiments, the wick 220B may be configured to draw the liquefied liquefiable material 120' into the wick 220B at a predetermined rate, such the third embodiment of the activatable environmental exposure indicator 200C may be employed as a time-sensitive indicator, and the activatable environmental exposure indicator 200C'' does not fully transition from the third stage to the fourth stage until a predetermined period of time has passed while the liquefiable material 120 has been liquefied.

Microcapsule: Third Embodiment

Figure 6:
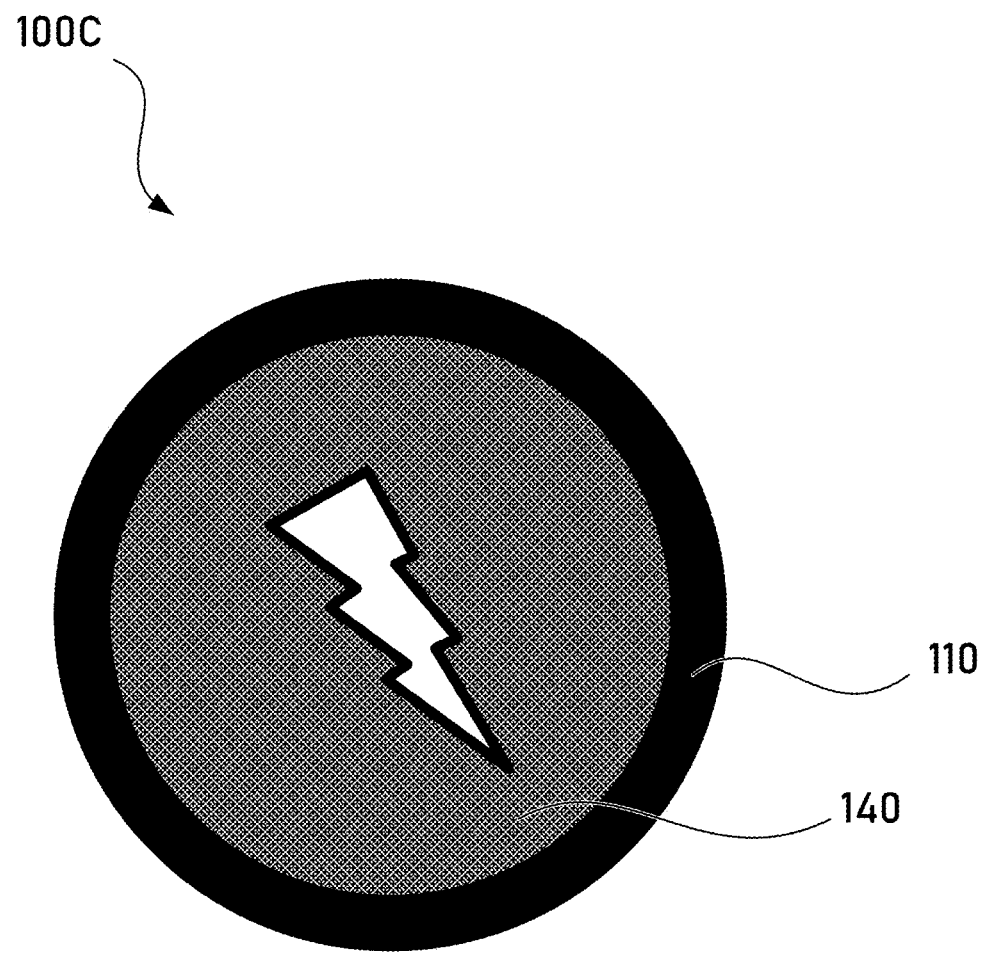
FIG. 6 illustrates a third embodiment of a microcapsule, according to embodiments of the present disclosure.

FIG. 6 illustrates a cross-sectional view of a microcapsule 100C, where the microcapsule 100C is a third embodiment of a microcapsule 100, according to embodiments of the present disclosure. The microcapsule 100C may be a component employed in various embodiments of the activatable environmental exposure indicator 200, including the fourth embodiment of the activatable environmental exposure indicator 200D, according to embodiments of the present disclosure. The microcapsule 100C contains a conductive adhesive 140 microencapsulated in a shell 110. The shell 110 of the microcapsule 100B may include any of the features and properties of the frangible shells discussed above in Section I.

The microcapsule 100C includes a conductive adhesive 140, according to embodiments of the present disclosure. The conductive adhesive 140 may be any such material capable of liquefying from a substantially solid phase (e.g., solid, semi-solid, highly viscous, and/or gelled state) to a liquid phase (e.g., fluid, relatively less viscous state) upon the occurrence of a predetermined environmental exposure. The conductive adhesive can have conductive properties in both the liquid phase and the solid phase. In some examples, the conductive adhesive 140 includes a liquefiable material 120 blended with conductive materials to form a liquefiable conductive substance. In some examples, the conductive adhesive 140 may include any of the features and properties of the liquefiable materials described above in Section I. Furthermore, the conductive adhesive 140, when transitioned from the liquid phase to the solid phase, may exhibit adhesive properties. In some examples, liquefied conductive adhesive 140' may cure, e.g., permanently transitioning to a solid phase.

The conductive adhesive 140 is configured to liquefy responsive to a predetermined environmental exposure. The shell 110 of the microcapsule 100C may be utilized in order to prevent wicking, or migration, of the conductive adhesive 140 prior to subjection to an activation action even when the conductive adhesive 140 encapsulated in the microcapsules is exposed to the predetermined environmental exposure. Alternatively, the shell 110 may insulate the conductive adhesive 140 from the predetermined environmental exposure.

According to some embodiments, the predetermined environmental exposure may be one of a temperature excursion above a predetermined temperature, a temperature excursion above a predetermined temperature threshold for at least a predetermined amount of time, a temperature excursion below a predetermined temperature, a temperature excursion below a predetermined temperature for at least a predetermined amount of time, cumulative exposure to temperature over a time period above a predetermined threshold for at least a predetermined amount of time, an exposure to a particular chemical, an oxygen exposure, an ammonia exposure, an exposure to a particular chemical above a threshold concentration, an exposure to a particular chemical above the threshold concentration for at least a predetermined amount of time, an exposure to at least a predetermined amount of radiation of a particular type, an predetermined electromagnetic exposure, a humidity exposure, an exposure to a humidity level above a predetermined threshold, and an exposure to a humidity level above a predetermined threshold for at least a predetermined amount of time, combinations thereof, and the like.

In one embodiment, the conductive adhesive 140 is a meltable solid configured to melt in response to a temperature above a predetermined threshold, forming a liquid. In another embodiment, the conductive adhesive 140 is a gel configured to, in response to a predetermined environmental exposure above a predetermined threshold, change viscosity such that the gel is substantially liquefied and is capable of fluid flow.

FIGS. 7A-7D illustrate an example embodiment of an activatable environmental exposure indicator 200 which employ the third embodiment of the microcapsule 100, microcapsule 100C, as discussed in reference to FIG. 6.

Activatable Environmental Exposure Indicator: Fourth Embodiment

FIGS. 7A-7D illustrate various stages of a fourth embodiment of an activatable environmental exposure indicator 200D, according to embodiments of the present disclosure. The activatable environmental exposure indicator 200D is configured to transition from a nonconductive state a conductive state, responsive to a predetermined environmental exposure occurring subsequent to the application of an activation action.

The fourth embodiment of the activatable environmental exposure indicator 200D, among other embodiments of the activatable environmental exposure indicator 200, may include a plurality of microcapsules 100C, each microcapsule 100C including a conductive adhesive 140 microencapsulated in a shell 110. The activatable environmental exposure indicator 200D further includes a third type of wick 220C. The activatable environmental exposure indicator 200D forms a portion of (e.g., physically couples two sections of) a wire/trace 210. The unexposed state of the activatable environmental exposure indicator 200D is a nonconductive state (e.g., indicator nonconductive state), and the exposed state of the activatable environmental exposure indicator 200D is a conductive state, (e.g., indicator conductive state). When the activatable environmental exposure indicator 200D is in the indicator nonconductive state, the activatable environmental exposure indicator 200D does not conduct electricity through the wire/trace 210. According to some embodiments, when in the indicator nonconductive state, the activatable environmental exposure indicator 200D blocks, impedes, resists, or otherwise prevents the conduction of electricity and electrical signals through the wire/trace 210. When the activatable environmental exposure indicator 200D is in the indicator conductive state, the activatable environmental exposure indicator 200D forms an electrical connection across the wire/trace 210, and electricity flows through the activatable environmental exposure indicator 200D and through the wire/trace 210. Said differently, the activatable environmental exposure indicator 200D is an electrical switch that is operable to be opened or closed in response to exposure to a predetermined environmental condition after an activation action. When the activatable environmental exposure indicator 200D is in the indicator conductive state, the switch is closed, and when the activatable environmental exposure indicator 200D is in the indicator nonconductive state, the switch is open.

According to some embodiments, the third type of wick 220C is permeable with respect to the liquefied conductive adhesive 140'. The wick 220C is disposed adjacent to the wire/trace 210, such that the wick 220C bridges the gap between two sections of the wire/trace 210. The microcapsules 100D are disposed adjacent to the wick 220C, opposite from the wire.

Figure 7A:
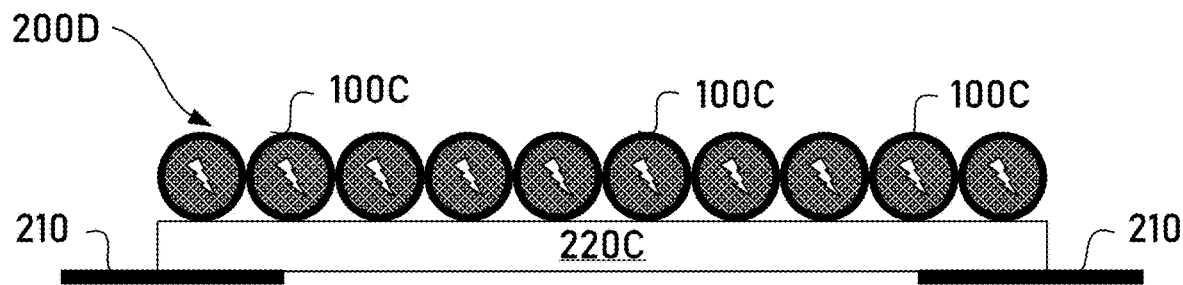
FIGS. 7A-7D illustrate various stages of a fourth embodiment of an activatable environmental exposure indicator, according to embodiments of the present disclosure.

FIG. 7A illustrates the fourth embodiment of the activatable environmental exposure indicator 200D in a first stage, prior to the application of the activation action and prior to the predetermined environmental exposure, according to embodiments of the present disclosure. In the first stage, the shells 110 of the microcapsules 100C are intact, and the conductive adhesive 140 is contained. In the first stage, the activatable environmental exposure indicator 200D is in the indicator nonconductive state (e.g., the switch is open). Furthermore, the conductive adhesive 140 is isolated from the environment, so environmental sensing cannot yet occur.

Figure 7B:
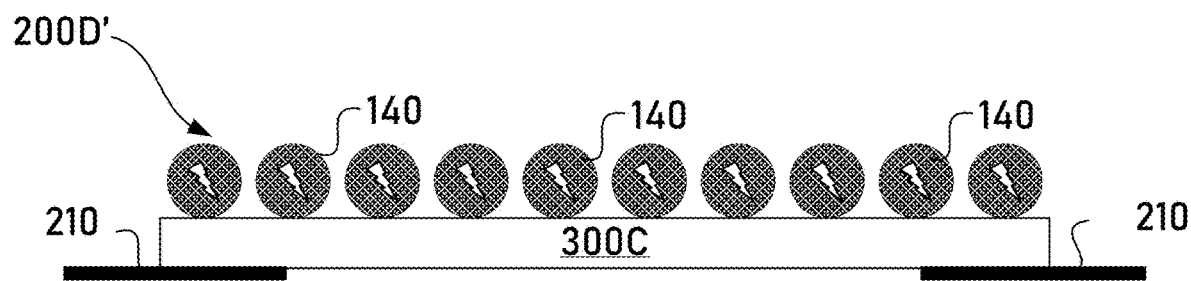

FIG. 7B illustrates the fourth embodiment of the activatable environmental exposure indicator 200D' in a second stage, after the application of the activation action and prior to the predetermined environmental exposure, according to embodiments of the present disclosure. In the second state, the microcapsules 100C have been ruptured responsive to the application of the activation action, and the conductive adhesive 140 is now released from the microcapsules into the environment. The activatable environmental exposure indicator 200D' remains in the indicator nonconductive state, as the conductive adhesive does not contact the wire/trace 210 in the second state. Because the conductive adhesive 140 is released from the microcapsules into the environment, the activatable environmental exposure indicator 200D' is activated, and primed to transition to the conductive state responsive to the predetermined environmental exposure. When the activatable environmental exposure indicator 200D' is activated, environmental sensing begins.

Figure 7C:
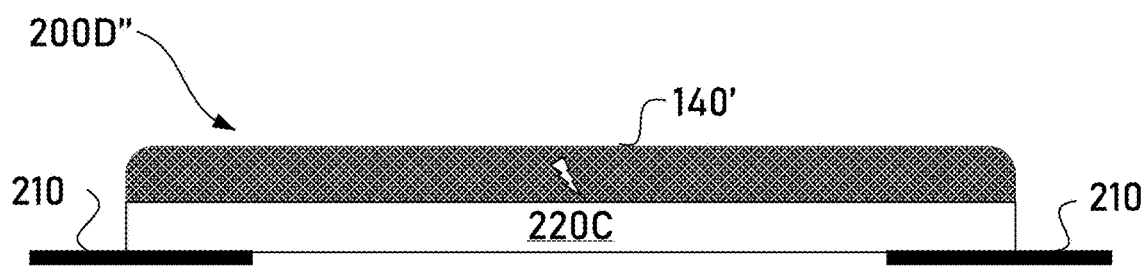

FIG. 7C illustrates the fourth embodiment of the activatable environmental exposure indicator 200D" in a third stage, after the application of the activation action and immediately after the predetermined environmental exposure, according to embodiments of the present disclosure. [0001] After the predetermined environmental exposure, the conductive adhesive 140 liquefies into liquefied conductive adhesive 140'. The liquefied conductive adhesive 140' is drawn into the wick 220C, where the liquefied conductive adhesive begins to permeate the wick 220C. The conductive adhesive 140 may begin to form an electrical connection through the wick 220C and begin to transition the activatable environmental exposure indicator 200D" to the exposed state.

Figure 7D:
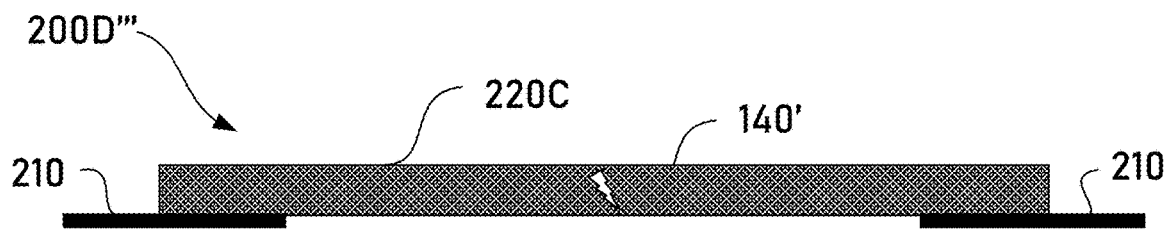

FIG. 7D illustrates the fourth embodiment of the activatable environmental exposure indicator 200D'" in a fourth stage, after the application of the activation action, and at least a predetermined period of time after the exposure to the predetermined environmental exposure, according to embodiments of the present disclosure. In the fourth stage, when the wick 220C is saturated with liquefied conductive adhesive 140', the wick 220C becomes conductive, such that the wick 220C conducts electricity across the wire/trace 210 via the conductive adhesive 140 contained in the wick 220C. When the wick 220C becomes conductive, the activatable environmental exposure indicator 200D'" completes the transition to the exposed state, and the indicator transitions to the indicator conductive state.

According to some embodiments, the wick 220C may be configured to draw the liquefied conductive adhesive 140' into the wick 220C at a predetermined rate, such the fourth embodiment of the activatable environmental exposure indicator 200D may be employed as a time-sensitive indicator, and the activatable environmental exposure indicator 200B" does not fully transition from the third stage to the fourth stage until a predetermined period of time has passed while the conductive adhesive 140 has been liquefied.

In some embodiments, after a predetermined period of time, or after the cessation of the predetermined environmental exposure, the conductive adhesive 140' may cure, such that the wick 220C is secured to the wire/trace 210 by the conductive adhesive 140, and the transition to the indicator conductive state is made substantially permanent.

Section III: Embodiments of Activation Indicator Components

Section III discusses various embodiments of activation indicator components 300, which may employ one or more embodiments of microcapsules 100 in one or more mechanisms to indicate an application of an application action to the activation indicator component 300.

Each embodiment of the activation indicator component 300 has a respective unactivated state corresponding to when the activation action has not been applied to the activation indicator component 300, a respective activated state corresponding to when the activation action has been applied to the activation indicator component 300.

According to some embodiments, each activation indicator component 300 has a respective unactivated state and a respective activated state, such that the transition from the unactivated state to the activated state indicates that the activation action has been applied to the activation indicator component 300.

According to some embodiments, the unactivated state may be a component conductive state, in which the activation indicator component 300 facilitates an electrical connection, or a flow of electrical current, through the activation indicator component 300.

According to some embodiments, the unactivated state may be a component nonconductive state, in which the indicator blocks, resists, impedes, or otherwise prevents the flow of electrical current through the activation indicator component 300.

According to some embodiments, the unactivated state may be a state in which the activation indicator component 300 has a first distinct electrical property, such as a first measured capacitance, a first measured resistance, a first measured impedance, a first measured inductance, a first measured conductivity, or a similar property.

According to some embodiments, the activated state may be an component conductive state, in which the activation indicator component 300 facilitates an electrical connection, or a flow of electrical current, through the activation indicator component 300.

According to some embodiments, the activated state may be a component nonconductive state, in which the indicator blocks, resists, impedes, or otherwise prevents the flow of electrical current through the activation indicator component 300.

According to some embodiments, the activated state may be a state in which the activation indicator component 300 has a second distinct electrical property, such as a second measured capacitance, a second measured resistance, a second measured impedance, a second measured inductance, a second measured conductivity, or a similar property.

Microcapsule: Fourth Embodiment

Figure 8:
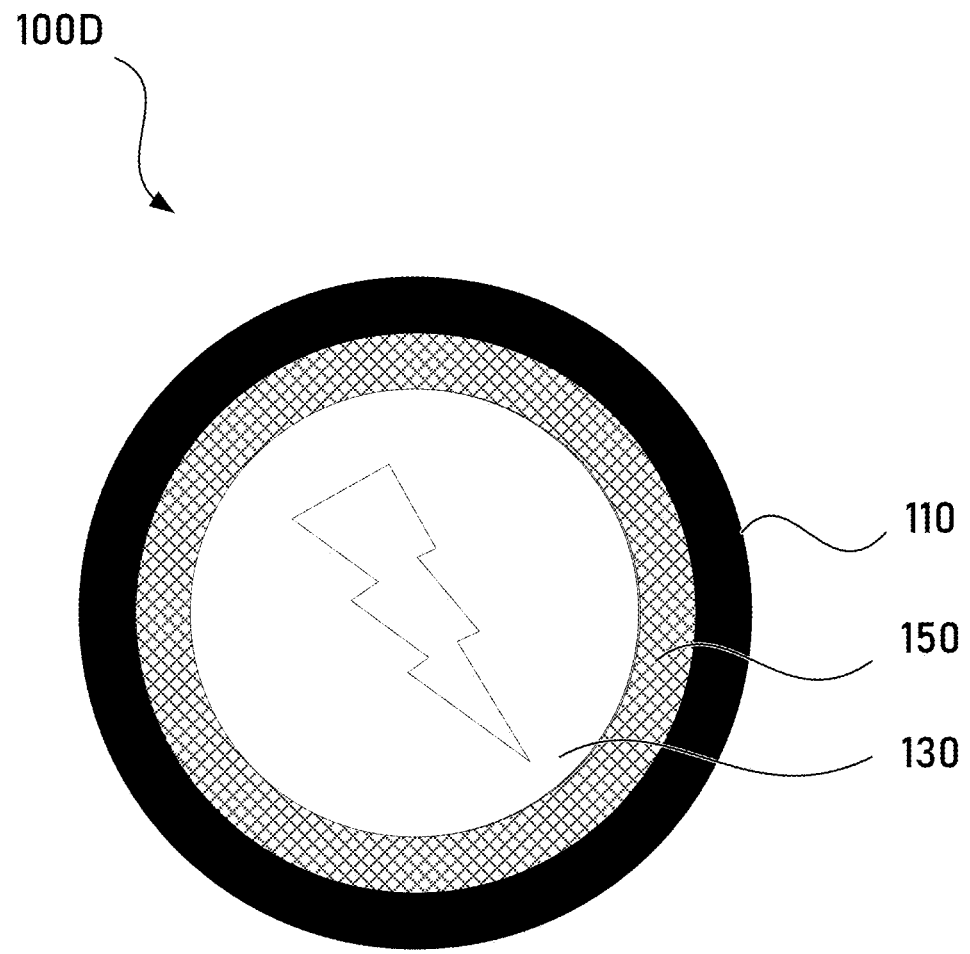
FIG. 8 illustrates a fourth embodiment of a microcapsule, according to embodiments of the present disclosure.

FIG. 8 illustrates a cross-sectional view of a microcapsule 100D, where the microcapsule 100D is a fourth embodiment of a microcapsule 100, according to embodiments of the present disclosure. The microcapsule 100D may be a component employed in various embodiments of the activation indicator component 300, including the first embodiment of the activation indicator component 300A, and the second embodiment of the activation indicator component 300B, according to embodiments of the present disclosure. According to some embodiments the microcapsule 100D (e.g. microsphere) includes a conductive particle 130 suspended in a fluid 150. The conductive particle 130 and fluid 150 are collectively microencapsulated in a shell 110. The shell 110 of the microcapsule 100D may include any of the features and properties of the frangible shells discussed above in Section I.

The microcapsule 100D includes a fluid 150, according to embodiments of the present disclosure. The fluid 150 may be any such fluid of sufficiently low viscosity as to facilitate the movement of the conductive particles 130 therethrough.

In some examples, the fluid 150 may be a liquefiable material, such as the liquefiable materials discussed in Section I, where the liquefiable material is configured to be in a liquid phase throughout the expected range of temperatures of operation of the activation indicator component 300.

According to some embodiments, the fluid 150 is electrically nonconductive, insulative, resistive, or otherwise resists or substantially prevents the conduction of electricity through the fluid 150. In some examples, the fluid 150 is electrically conductive, and facilitates the conduction of electricity through the fluid 150. The shell 110 of the microcapsule 100D may be utilized in order to prevent wicking, or migration, of the fluid 150 prior to the application of the activation action.

According to some embodiments, the microcapsule 100D includes a conductive particle 130.

FIGS. 9A-10B illustrate several embodiments of activation indicator components 300 which employ the fourth embodiment of the microcapsule 100, microcapsule 100D, as discussed in reference to FIG. 8.

Activation Indicator Component: First Embodiment

Figure 9A:
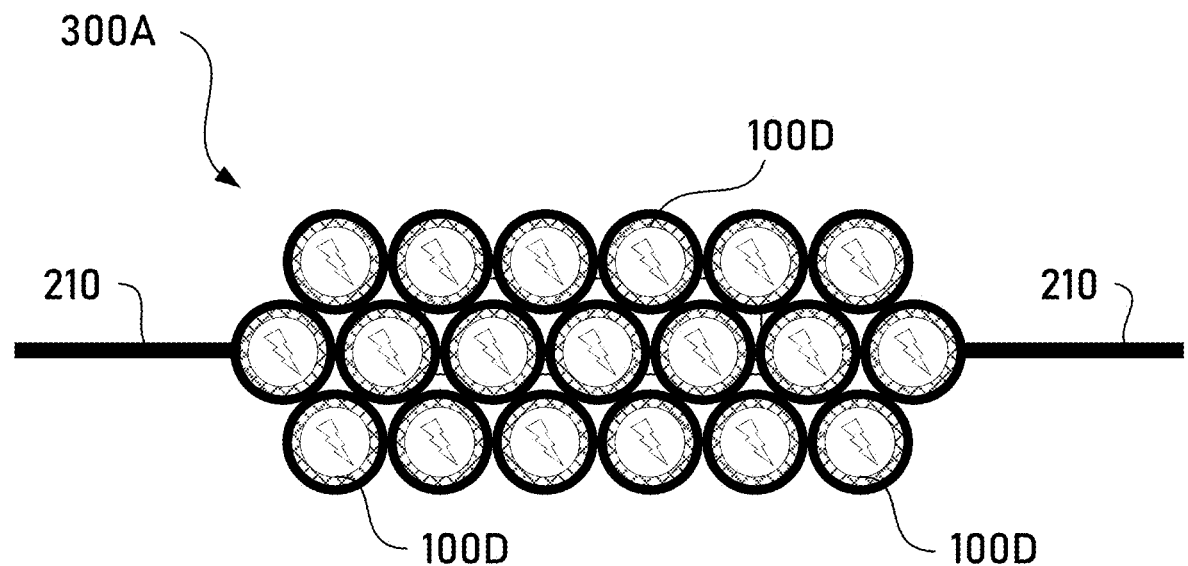
FIGS. 9A-9B illustrate various stages of a first embodiment of an activation indicator component employing the microcapsule of FIG. 8, according to embodiments of the present disclosure.
Figure 9B:
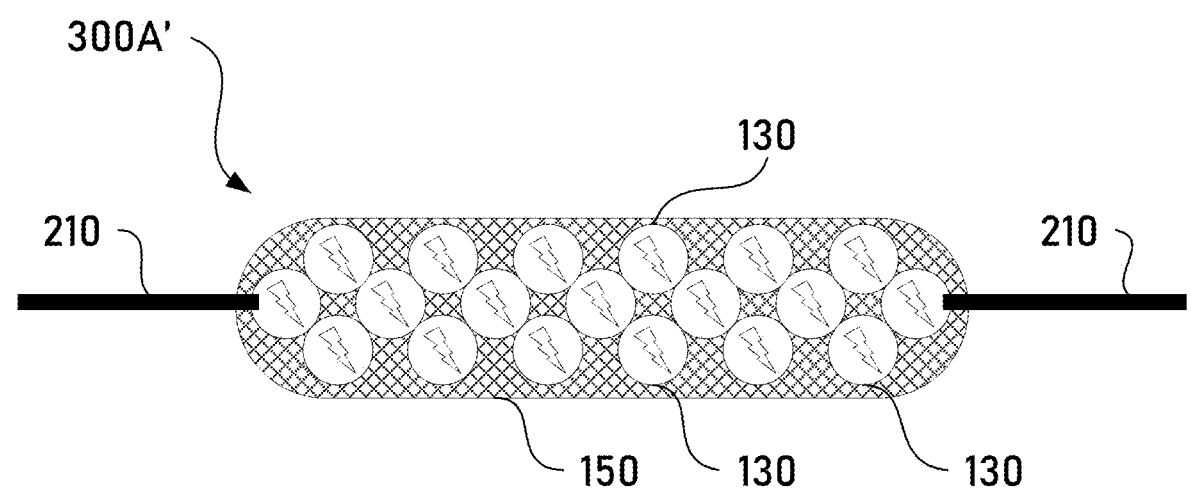

FIGS. 9A-9B illustrate a first embodiment of the activation indicator component 300A, according to embodiments of the present disclosure. The activation indicator component 300A is configured to transition from a nonconductive state to a conductive state, responsive to the application of an activation action.

Figure 10A:
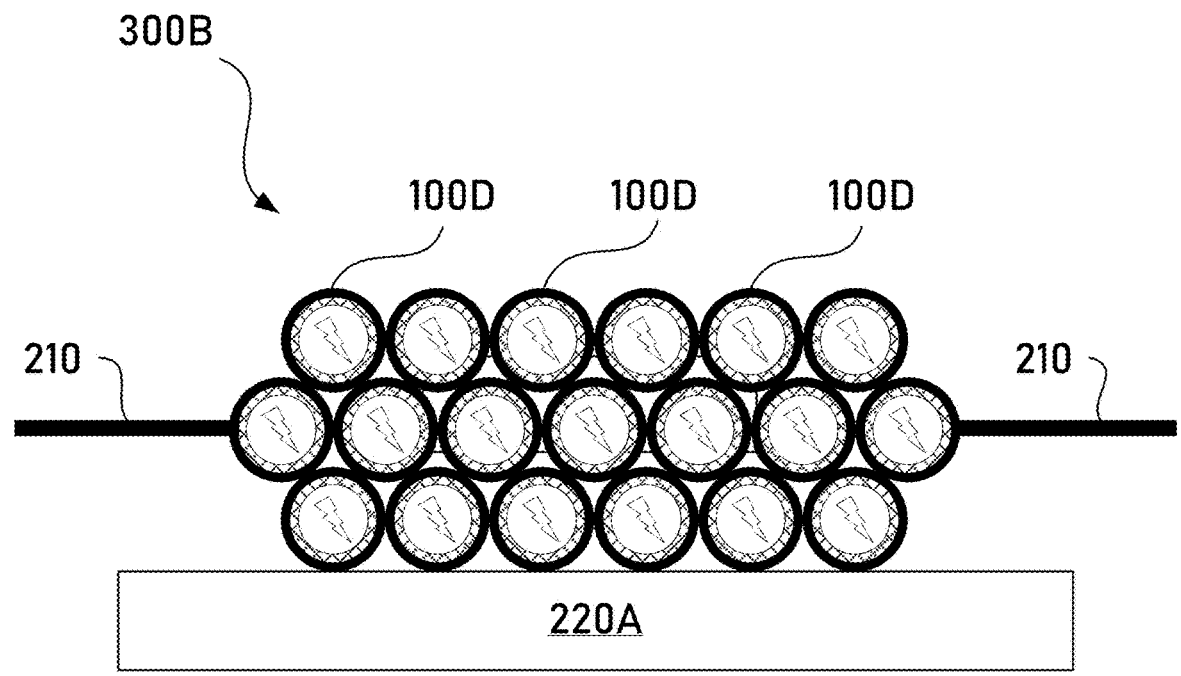
FIGS. 10A-10B illustrate various stages of a second embodiment of an activation indicator component employing the microcapsule of FIG. 8, according to embodiments of the present disclosure.

As illustrated in FIG. 10A, the first embodiment of the activation indicator component 300A, among other embodiments of the activation indicator component 300 may include a plurality of microcapsules 100D, each microcapsule 100D including a conductive particle 130 suspended in a fluid 150, microencapsulated in a shell 110. The activation indicator component 300A forms a portion of (e.g., physically couples two sections of) a wire/trace 210. The unactivated state of the activation indicator component 300A is a nonconductive state (e.g., component nonconductive state), and the activated state of the activation indicator component 300A is a conductive state (e.g., component conductive state). When the activation indicator component 300A is in the component nonconductive state, the activation indicator component 300A does not conduct electricity through the wire/trace 210. According to some embodiments, when in the component nonconductive state, the activation indicator component 300A blocks, impedes, resists or otherwise prevents the conduction of electricity and electrical signals through the wire/trace 210. When the activation indicator component 300A is in the component conductive state, the activation indicator component 300A forms an electrical connection across the wire/trace 210, and electricity flows through the activation indicator component 300A and through the wire/trace 210. Said differently, the activation indicator component 300A is an electrical switch that is operable to be opened or closed in response to an activation action. When the activation indicator component 300A is in the component conductive state, the switch is closed, and when the activation indicator component 300A is in the component nonconductive state, the switch is open.

FIG. 9A illustrates the first embodiment of the activation indicator component 300A in the unactivated state, prior to the application of the activation action. In the first stage, the shells 110 of the microcapsules 100A are intact, and the fluid 150 and conductive particles 130 are contained. In the unactivated state, the activation indicator component 300A is in the nonconductive state (e.g., the switch is open).

FIG. 9B illustrates the first embodiment of the activation indicator component 300A' in the activated state, after the application of the activation action, according to embodiments of the present disclosure. In the activated state, the shells 110 of the microcapsules 100D have been ruptured responsive to the application of the activation action. The fluid 150 and the conductive particles 130 are released from the microcapsules 100D, such that the conductive particles 130 are no longer blocked from migration. Once released, the conductive particles 130 form an electrical connection (e.g., first electrical connection, second electrical connection). In some examples, the conductive particles 130 may be drawn together, by magnetic, mechanical, chemical, and/or electrical forces, to form the electrical connection across the wire/trace 210, transitioning the activation indicator component 300A' to the conductive state. In this manner, the activation indicator component 300A' may be employed to indicate the application of the activation action.

Activation Indicator Component: Second Embodiment

Figure 10B:
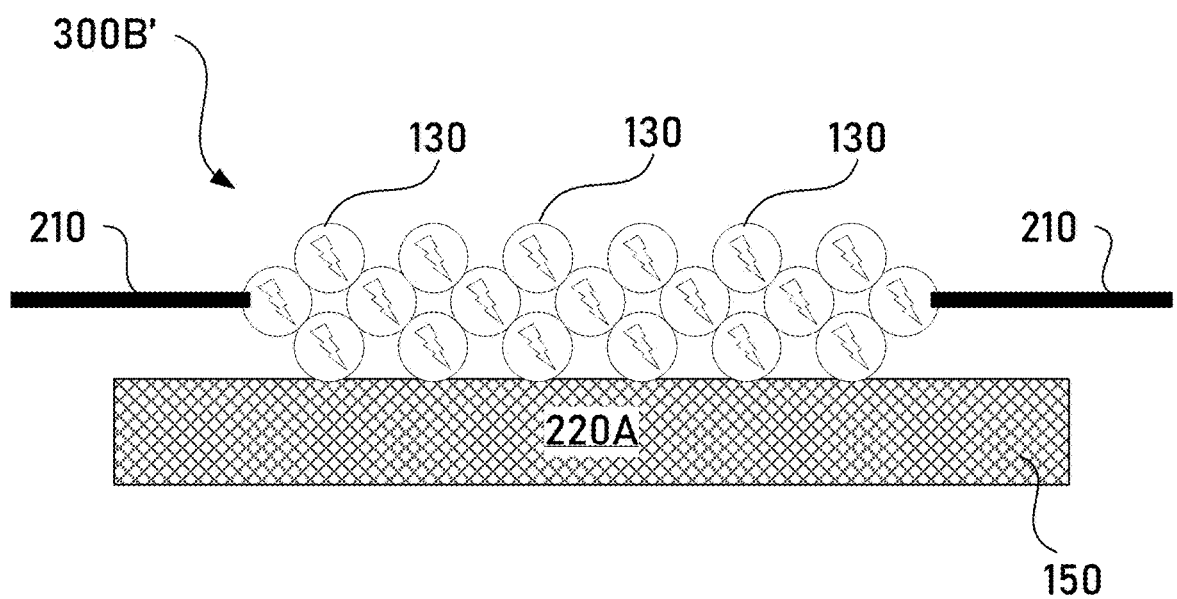

FIGS. 10A-10B illustrate a second embodiment of the activation indicator component 300B, according to embodiments of the present disclosure. The activation indicator component 300B is configured to transition from a nonconductive state to a conductive state, responsive to the application of an activation action.

As illustrated in FIGS. 10A-10B, the second embodiment of the activation indicator component 300B, among other embodiments of the activatable environmental exposure indicator 200 may include a plurality of microcapsules 100D, each microcapsule 100D including a conductive particle 130 contained suspended in the fluid 150, microencapsulated in a shell 110. The activation indicator component 300B further includes a first type of wick 220A. The activation indicator component 300B forms a portion of (e.g., physically couples two sections of) a wire/trace 210. The unactivated state of the activatable environmental exposure indicator 200D is a nonconductive state (e.g., indicator nonconductive state) and the activated state of the activation indicator component 300B is a conductive state (e.g., indicator conductive state). When the activation indicator component 300B is in the nonconductive state, the activation indicator component 300B does not conduct electricity through the wire/trace 210. According to some embodiments, when in the nonconductive state, the activation indicator component 300B blocks, impedes, resists, or otherwise prevents the conduction of electricity and electrical signals through the wire/trace 210. When the activation indicator component 300B is in the conductive state, the activatable environmental exposure indicator 200B forms an electrical connection across the wire/trace 210, and electricity flows through the activation indicator component 300B and through the wire/trace 210. Said differently, the activation indicator component 300B is an electrical switch that is operable to be opened or closed in response to an activation action. When the activation indicator component 300B is in the conductive state, the switch is closed, and when the activation indicator component 300B is in the nonconductive state, the switch is open. The wick 220A may disposed proximately, (e.g., adjacent) to both the wire/trace 210 and the microcapsules 100D. According to some embodiments, the wick 220A is permeable with respect to the fluid 150, but not permeable with respect to the conductive particles 130.

FIG. 10A illustrates the second embodiment of the activation indicator component 300B in the unactivated state, prior to the application of the activation action, according to embodiments of the present disclosure. In the unactivated state, the shells 110 of the microcapsules 100D are intact, and the fluid 150 and conductive particles 130 are contained. Prior to the application of the activation action, the activation indicator component 300B is in the nonconductive state (e.g., the switch is open).

FIG. 10B illustrates the first embodiment of the activation indicator component 300B' in the activated state, after the application of the activation action, according to embodiments of the present disclosure. As illustrated in FIG. 10B, the shells 110 of the microcapsules 100D have been ruptured responsive to the application of the activation action, and the fluid 150 and the conductive particles have been released from the shells 110, such that the conductive particles 130 are no longer blocked from migration. Once released, the conductive particles begin to form an electrical connection (e.g., first electrical connection, second electrical connection). In some examples, the conductive particles 130 may be drawn together, by magnetic, mechanical, chemical, and/or electrical forces, to begin to form the electrical connection across the wire/trace 210. The wick 220A draws the fluid 150 into the wick, leaving the conductive particles 130 on the exterior of the wick 220A, as the wick 220 is impermeable with respect to the conductive particles 130. In some embodiments, the wick 220A may improve the conductive quality of the electrical connection formed by the conductive particles 130. The fluid 150 may hinder or otherwise obstruct the formation of the electrical connection by the conductive particles 130. The wick 220A draws the fluid 150 away from the conductive particles 130 (e.g., into the wick) such that the conductive particles 130 are unhindered in the formation of the electrical connection. By drawing the fluid 150 into the wick 220A, the transition to the component conductive state is made irreversible.

Microcapsule: Fifth Embodiment

Figure 11:
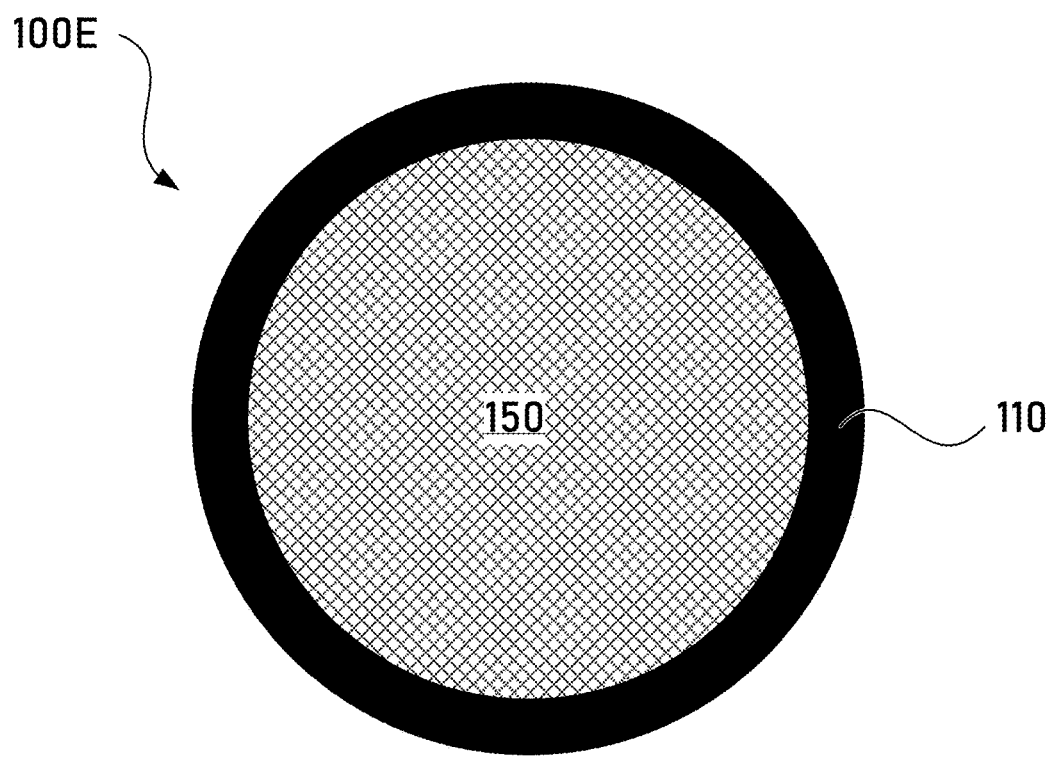
FIG. 11 illustrates a fifth embodiment of a microcapsule, and a conductive particle, according to embodiments of the present disclosure.

FIG. 11 illustrates a cross-sectional view of a microcapsule 100E, where the microcapsule 100E is a fifth embodiment of an activatable microcapsule 100, according to embodiments of the present disclosure. As shown in FIG. 11, the microcapsule can be devoid of conductive particles (e.g., conductive particles 130). The microcapsule 100E may be a component employed in various embodiments of the activation indicator component 300, including the fourth embodiment of the activation indicator component 300D, according to embodiments of the present disclosure. According to some embodiments, the microcapsule 100E (e.g. microsphere) contains the fluid 150. The fluid 150 can be electrically nonconductive. The fluid 150 is microencapsulated in a shell 110. The shell 110 of the microcapsule 100E may include any of the features and properties of the frangible shells discussed above in Section I.

The microcapsule 100D includes the fluid 150, according to embodiments of the present disclosure. The fluid 150 may be any such fluid of sufficiently low viscosity as to facilitate the movement of the conductive particles 130 therethrough.

According to some embodiments, the microcapsule 100E is separate from the conductive particle 130.

Activation Indicator Component: Third Embodiment

Figure 12A:
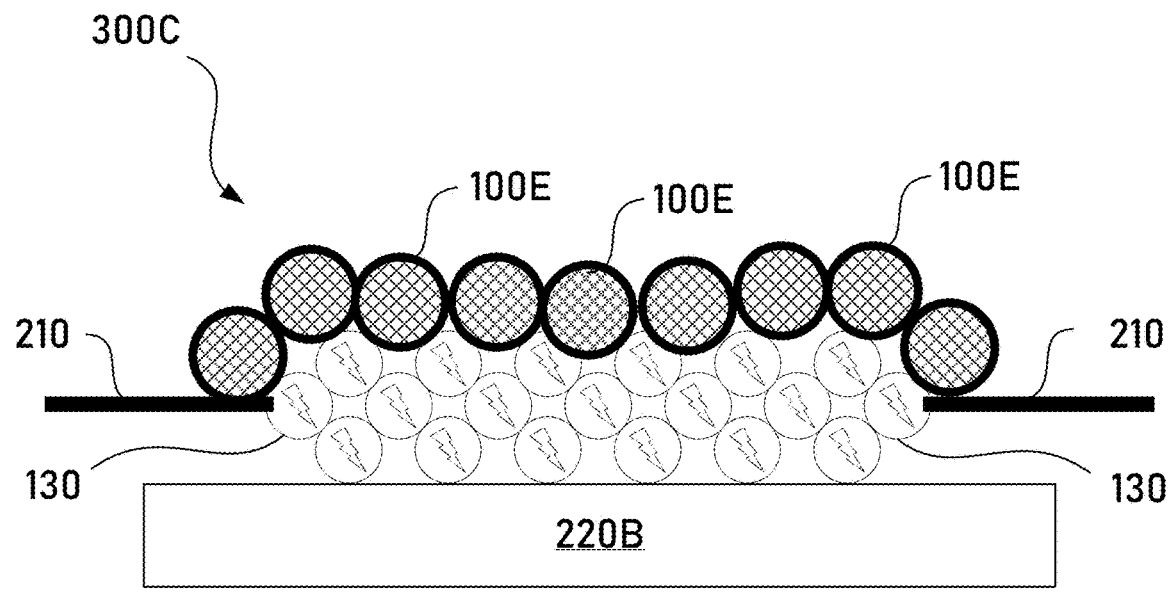
FIGS. 12A-12B illustrate various stages of a third embodiment of an activation indicator component employing the microcapsule and conductive particle, of FIG. 11, according to embodiments of the present disclosure.
Figure 12B:
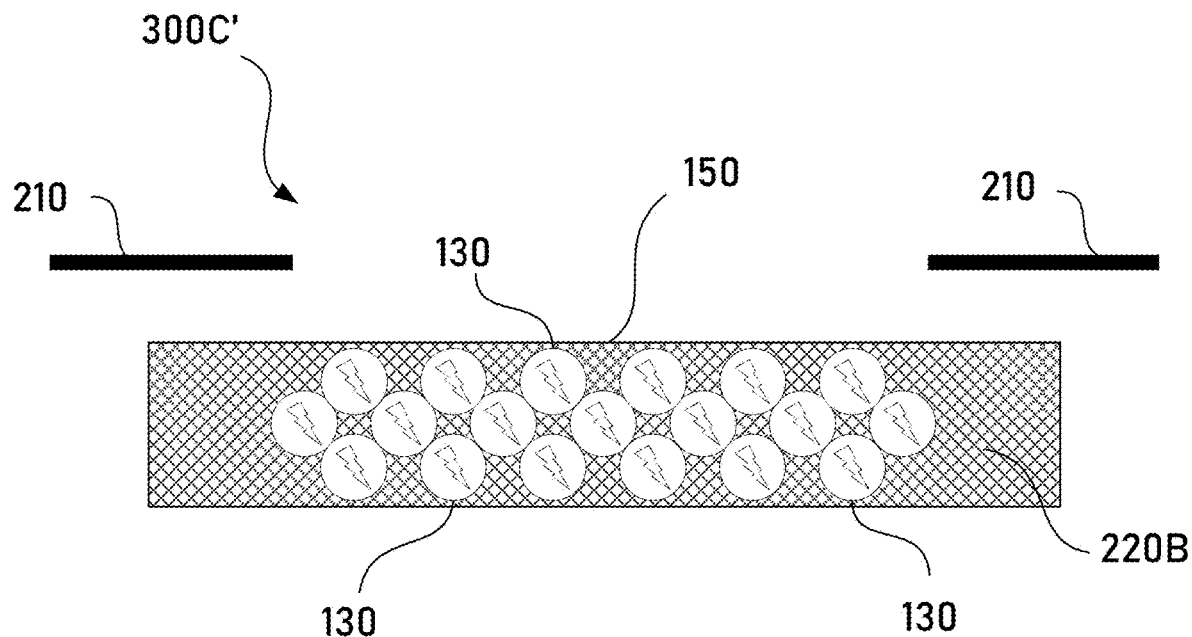

FIGS. 12A-12B illustrate various states of a third embodiment of the activation indicator component 300C, according to embodiments of the present disclosure. The activation indicator component 300C is configured to transition from a conductive state to a nonconductive state, responsive to the application of an activation action.

The third embodiment of the activation indicator component 300C among other embodiments of the activation indicator component 300 may include a plurality of microcapsules 100E, each microcapsule 100E including a fluid 150 microencapsulated in a shell 110. The activation indicator component 300C further includes a plurality of conductive particles 130, and a second type of wick 220B. The activation indicator component 300C forms a portion of (e.g., physically couples two sections of) a wire/trace 210. The unactivated state of the activation indicator component 300C is a conductive state (e.g., component conductive state), and the activated state of the activation indicator component 300C is a nonconductive state (e.g., component nonconductive state). When the activation indicator component 300A is in the component nonconductive state, the activation indicator component 300C does not conduct electricity through the wire/trace 210. According to some embodiments, when in the component nonconductive state, the activation indicator component 300C blocks, impedes, resists, or otherwise prevents the conduction of electricity and electrical signals through the wire/trace 210. When the activation indicator component 300C is in the component conductive state, the activatable environmental exposure indicator 200D forms an electrical connection across the wire/trace 210, and electricity flows through the activation indicator component 300C and through the wire/trace 210. Said differently, the activation indicator component 300C is an electrical switch that is operable to be opened in response to an activation action. When the activation indicator component 300C is in the component conductive state, the switch is closed, and when the activation indicator component 300A is in the component nonconductive state, the switch is open.

According to some embodiments, the second type of wick 220B is permeable with respect to both the fluid 150 and conductive particles 130.

FIG. 12A illustrates the third embodiment of the activation indicator component 300C in the unactivated state, prior to the application of the activation action, according to embodiments of the present disclosure. In the unactivated state, the activation indicator component 300C is in the component conductive state. The plurality of conductive particles 130 form an electrical connection through the activation indicator component 300C, such that the electrical switch is closed. The conductive particles 130 are disposed relative to the wire/trace 210 such that the electrical connection therethrough is supported. The plurality of microcapsules 100E are disposed proximately to the plurality of conductive particles 130. The wick 220B is disposed proximately to the plurality of conductive particles 130. According to some embodiments, the plurality of conductive particles 130 is sandwiched between the plurality of microcapsules 100E and the wick 220B. In the first stage, the shells 110 of the microcapsules 100E are intact, and the fluid 150 is isolated from the environment.

FIG. 12B illustrates the third embodiment of the activation indicator component 300B' in the activated state, after the application of the activation action, according to embodiments of the present disclosure. In the activated state, the microcapsules 100E have been ruptured responsive to the application of the activation action, and the fluid 150 is released from the shells 110 and is drawn into the wick 220B. The fluid 150 flows into the plurality conductive particles 130 as the fluid 150 is drawn into the wick 220B, and the fluid 150 begins to disrupt electrical conduction through the plurality of conductive particles 130. In some examples, the viscosity of the fluid 150 is sufficient to move the conductive particles 130 and contract the conductive particles 130 into the flow of fluid 150. The wick 220B, which is permeable with respect to both the fluid 150 and the conductive particles 130, draws the fluid 150 into the wick 220B, and also draws the conductive particles 130 into the wick 220B, as the conductive particles 130 are contracted into the flow of fluid 150. When the conductive particles are drawn into the wick 220B by the fluid 150, the electrical connection through the activation indicator component 300C is disengaged, and the activation indicator component 300C' is in the component nonconductive state.

Microcapsule: Sixth Embodiment

Figure 13:
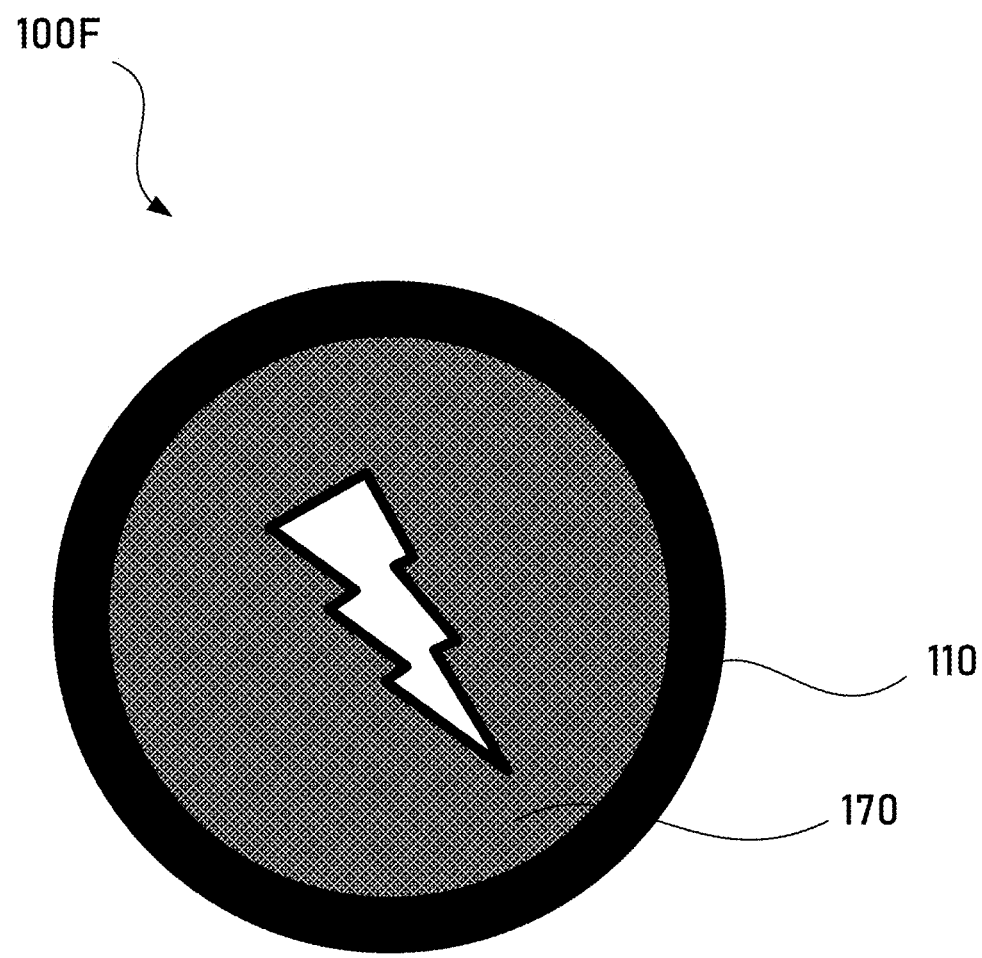
FIG. 13 illustrates a sixth embodiment of a microcapsule, according to embodiments of the present disclosure.

FIG. 13 illustrates a cross-sectional view of a microcapsule 100F, where the microcapsule 100F is a sixth embodiment of an activatable microcapsule 100, according to embodiments of the present disclosure. The microcapsule 100F may be a component employed in various embodiments of the activatable environmental exposure indicator 200, including the fourth embodiment of the activatable environmental exposure indicator 200D, according to embodiments of the present disclosure. The microcapsule 100F contains a conductive adhesive fluid 170 microencapsulated in a shell 110. The shell 110 of the microcapsule 100B may include any of the features and properties of the frangible shells discussed above in Section I.

The microcapsule 100F includes a conductive adhesive fluid 170, according to embodiments of the present disclosure. The conductive adhesive fluid 170 may be any such material having conductive properties in the liquid phase. In some examples, the conductive adhesive fluid 170 includes an adhesive fluid blended with conductive materials to form a liquefiable conductive substance. In some examples, the conductive adhesive fluid 170 may include any of the features and properties of the liquefiable materials described above in Section I. Furthermore, the conductive adhesive fluid 170 may exhibit adhesive properties. In some examples, the conductive adhesive fluid 170 may cure, e.g., permanently transitioning to a solid phase.

The shell 110 of the microcapsule 100F may be utilized in order to prevent wicking, or migration, of the conductive adhesive fluid 170 prior to the application of the activation action. In sone embodiments, the conductive adhesive fluid 170 is a liquefiable material configured to be in a liquid state throughout the range of expected operating temperatures of the microcapsule 100F.

Activation Indicator Component: Fourth Embodiment

Figure 14A:
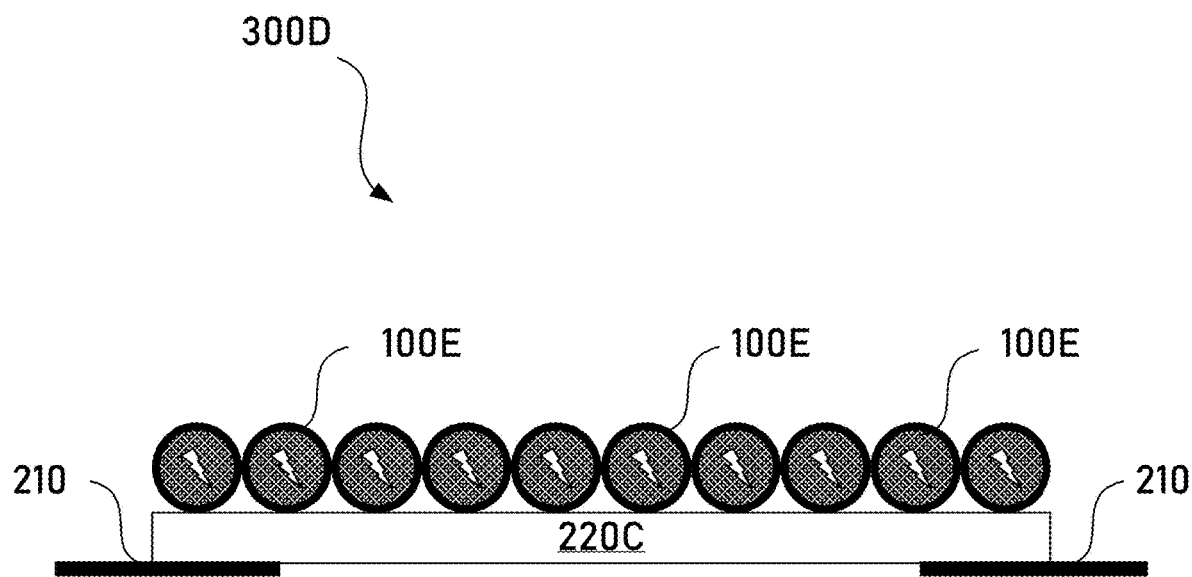
FIGS. 14A-14B illustrates various stages of a fourth embodiment of an activation indicator component employing the microcapsule of FIG. 13, according to embodiments of the present disclosure.
Figure 14B:
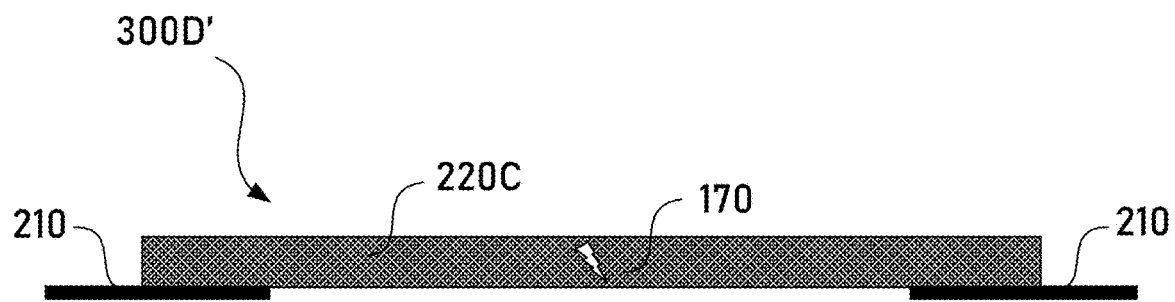

FIGS. 14A-14B illustrate various stages of a fourth embodiment of an activation indicator component 300D, according to embodiments of the present disclosure. The activation indicator component 300D is configured to transition from a nonconductive state to a conductive state, responsive to the application of an activation action.

The fourth embodiment of the activation indicator component 300D, among other embodiments of the activatable environmental exposure indicator 200, may include a plurality of microcapsules 100F, each microcapsule 100F including a conductive adhesive fluid 170 microencapsulated in a shell 110. The activation indicator component 300D further includes a third type of wick 220C. The activation indicator component 300D forms a portion of (e.g., physically couples two sections of) a wire/trace 210. The unexposed state of the activation indicator component 300D is a nonconductive state (e.g., component nonconductive state), and the exposed state of the activation indicator component 300D is a conductive state, (e.g., component conductive state). When the activation indicator component 300D is in the component nonconductive state, the activation indicator component 300D does not conduct electricity through the wire/trace 210. According to some embodiments, when in the component nonconductive state, the activation indicator component 300D blocks, impedes, resists, or otherwise prevents the conduction of electricity and electrical signals through the wire/trace 210. When the activation indicator component 300D is in the component conductive state, the activation indicator component 300D forms an electrical connection across the wire/trace 210, and electricity flows through the activation indicator component 300D and through the wire/trace 210. Said differently, the activation indicator component 300D is an electrical switch that is operable to be closed in response to an activation action. When the activation indicator component 300D is in the component conductive state, the switch is closed, and when the activation indicator component 300D is in the component nonconductive state, the switch is open.

According to some embodiments, the third type of wick 220C is permeable with respect to the conductive adhesive fluid 170. The wick 220C is disposed adjacent to the wire/trace 210, such that the wick 220C bridges the gap between two sections of the wire/trace 210. The microcapsules 100D are disposed adjacent to the wick 220C, opposite from the wire.

FIG. 14A illustrates the fourth embodiment of the activation indicator component 300D in the unexposed state, prior to the application of the activation action, according to embodiments of the present disclosure. In the first stage, the shells 110 of the microcapsules 100F are intact, and the conductive adhesive fluid 170 is contained. In the first stage, the activation indicator component 300D is in the component nonconductive state (e.g., the switch is open).

FIG. 14B illustrates the fourth embodiment of the activation indicator component 300D' in the exposed state, after the application of the activation action, according to embodiments of the present disclosure. In the second state, the microcapsules 100F have been ruptured responsive to the application of the activation action, and the conductive adhesive fluid 170 is drawn into the wick 220C, where the conductive adhesive fluid 170 begins to permeate the wick 220C. When the wick 220C is saturated with conductive adhesive fluid 170, the wick 220C becomes conductive, such that the wick 220C conducts electricity across the wire/trace 210 via the conductive adhesive fluid 170 contained in the wick 220C. When the wick 220C becomes conductive, the activation indicator component 300D' completes the transitions to the component conductive state.

In some embodiments, after a predetermined period of time, the conductive adhesive fluid 170 may cure, such that the wick 220C is secured to the wire/trace 210 by the conductive adhesive fluid 170, and the transition to the component conductive state is made substantially permanent.

Figure 15A:
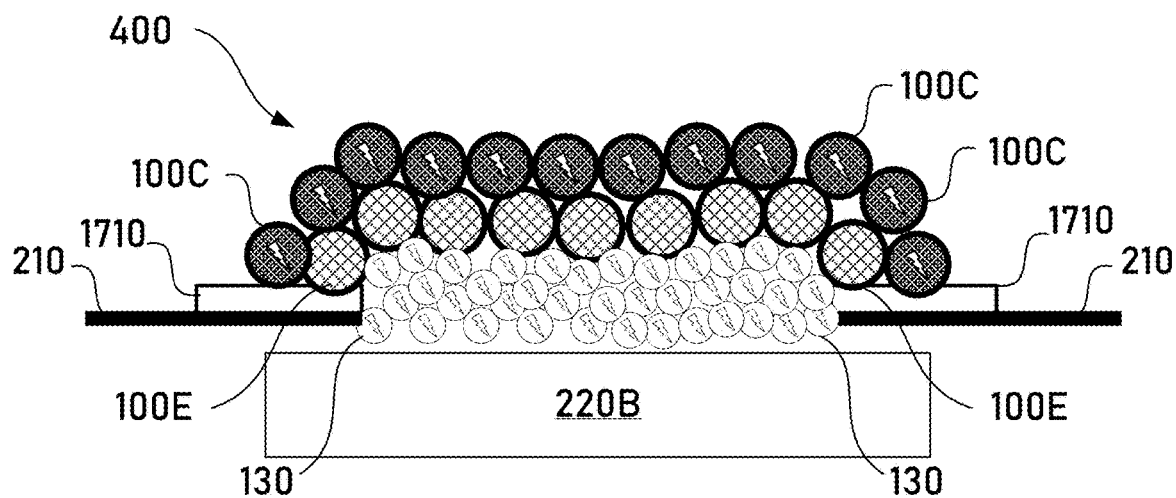
FIGS. 15A-15C illustrate various stages of an embodiments of a combined activation and exposure indicator employing the microcapsules of FIG. 6 and FIG. 11, according to embodiments of the present disclosure.
Figure 15B:
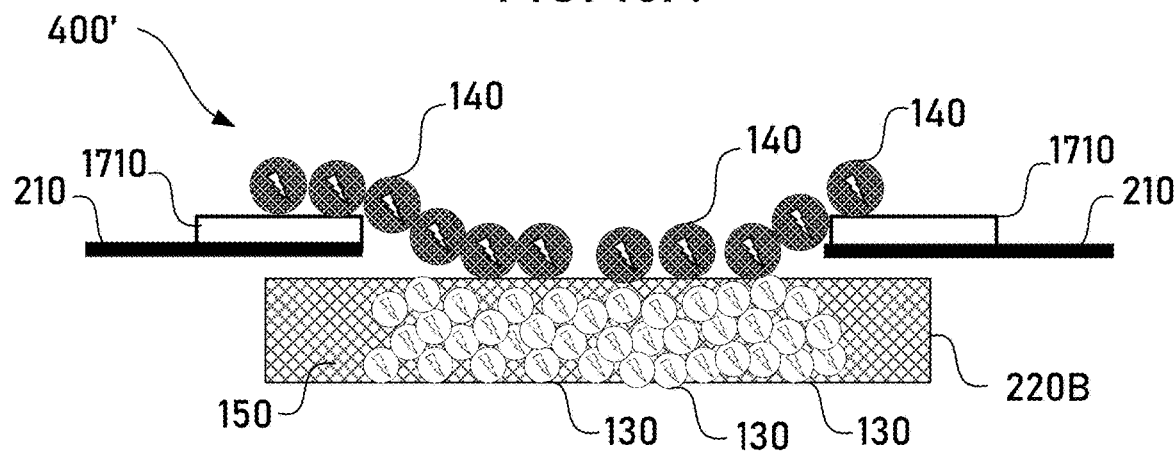
Figure 15C:
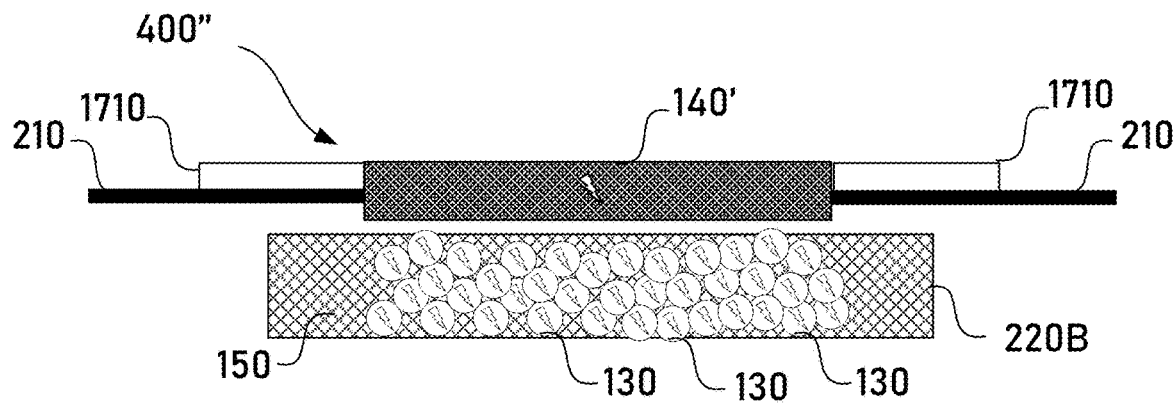

Combined Activation Indicator Component and Activatable Environmental Exposure Indicator FIGS. 15A-15C illustrate various stages of an activation and exposure indicator 400, e.g., a combined activation indicator component and activatable environmental exposure indicator, according to embodiments of the present disclosure. The activation and exposure indicator is configured to transition from a conductive state to a nonconductive state responsive to the application of the activation action, and transition from the nonconductive state to the conductive state responsive to an exposure to the predetermined environmental exposure occurring subsequently to the activation action.

The activation and exposure indicator 400 includes the second type of wick 220B, a plurality of conductive particles forming an electrical connection across a wire/trace 210, a plurality of microcapsules 100E (e.g., containing fluid 150) and a plurality of microcapsules 100C (e.g., containing conductive adhesive 140). The activation and exposure indicator 400 further includes an insulating layer 1710, which is configured to prevent premature contact of the microcapsule 100C with the wire/trace 210.

FIG. 15A illustrates the unactivated and unexposed state of the activation and exposure indicator 400. Prior to an application of an activation action, the activation and exposure indicator 400 is in the conductive state. The conductive particles are initially in such a configuration as to support an electrical connection across the wire/trace 210. The wick 220B is oriented such that the wick is adjacent to, and in some examples, abutting the plurality of conductive particles 130. The microcapsules 100F are disposed in a layer adjacent to the plurality of conductive particles 130, opposite to the wick 220B. The microcapsules 100C are disposed in a layer overlaying the microcapsules 100F. In some examples, the insulating layer 1710 may block contact between the microcapsules 100C and the wire/trace 210.

FIG. 15B illustrates the activated and unexposed state of the activation and exposure indicator 400', according to embodiments of the present disclosure. Responsive to the application of the activation action, the frangible shells 110 of both the microcapsules 100C and microcapsules 100F are disengaged, and the payloads thereof released. When the fluid 150 contained in the microcapsules 100F is released responsive to the application of the activation action, the fluid 150 flows through the conductive particles 130, and draws the conductive particles 130 into the wick 220B, disengaging the electrical connection, and transitioning the activation and exposure indicator 400' to the non-conductive state. When activated, the microcapsules 100C release the conductive adhesive 140 contained therein. Prior to exposure to the predetermined environmental exposure, the conductive adhesive 140 is in the solid phase, and is blocked from establishing an electrical connection via the insulating layer, which substantially prevents the solid phase conductive adhesive 140 from contacting the wire/trace 210.

FIG. 15C illustrates the activated and exposed state of the activation and exposure indicator 400'', according to embodiments of the present disclosure. Responsive to an exposure to the predetermined environmental exposure occurring subsequently to the application of the activation action, the conductive adhesive 140 liquefies, and forms an electrical connection across the wire/trace 210, transitioning the activation and exposure indicator 400 to the conductive state. The insulating layer 1710 is configured to permit the liquefied conductive adhesive 140' to contact the wire/trace 210. In some examples, the wick 220B and the fluid 150 are configured such that the wick 220B is entirely saturated by the fluid 150 following activation, such that upon exposure to the predetermined environmental exposure, the wick 220B does not draw the liquefied conductive adhesive 140' into the wick 220B and potentially impair the formation or re-formation of the electrical connection across the wire/trace 210. In some examples, magnetic, mechanical, chemical, and/or electrical forces can aid in drawings the conductive particles 130 into the wick. In some examples, the conductive adhesive 140 may be drawn between the terminal ends of the trace 210 by magnetic, mechanical, chemical, and/or electrical forces, to aid in forming the electrical connection across the wire/trace 210.

Section IV. Embodiments of Activatable RF Tags with Variable Read Range

Section IV discusses various embodiments of RF tags 1000 (e.g., activatable environmentally sensitive RF tags, environmentally sensitive RF tags, RFID tags, near-field communication (NFC) tags, Ultra-high frequency (UHF) tags) with variable read range, according to embodiments of the present disclosure. FIGS. 16-21 illustrate various embodiments of RF tags 1000A-F according to embodiments of the present disclosure. In a generic embodiment, an RF tag 1000 includes an integrated circuit 1010 which is electrically connected to (e.g., in a closed circuit with) an antenna 1020 (e.g., an inductive loop and pair of antennas 1020). The antennas 1020 may include several portions (e.g., a first antenna portion 1022, a second antenna portion 1024, a third an antenna portion 1026, a fourth antenna portion 1028). The antennas 1020 may be configured to send and receive radiofrequency (RF) signals to an RF reader, e.g., an RFID reader and/or an NFC reader (not shown). Various antenna portions, (e.g., a first antenna portion 1022, a second antenna portion 1024, a third an antenna portion 1026, a fourth antenna portion 1028) may be coupled to one another via activatable environmental exposure indicators 200, activation indicator components 300, and/or activation and exposure indicators 400. The activatable environmental exposure indicators 200, activation indicator components 300, and/or an activation and exposure indicators 400 may electrically connect and/or electrically disconnect (e.g., open and close a circuit containing) the various antenna portions with one another and with the integrated circuit 1010. The read range, or response range, of the RF tag corresponds to the total length of the antenna portions which are electrically connected to (e.g., in a closed circuit with) the integrated circuit 1010.

Generally speaking, an activation indicator component 300, an activatable environmental exposure indicator 200, or an activation and exposure indicator 400 may connect a first antenna portion 1022 to a second antenna portion 1024. The first antenna portion 1022 has an existing electrical connection with the integrated circuit 1010, and the electrical connection between the integrated circuit (and the first antenna portion) and the second antenna portion 1024 is dependent on whether the activation indicator component 300, activatable environmental the exposure indicator 200, or the activation and exposure indicator 400 is in the respective conductive state or respective nonconductive state. When the activation indicator component 300, the activatable environmental exposure indicator 200, or the activation and exposure indicator 400 is conductive, the second antenna portion 1024 is in a closed circuit with the integrated circuit 1010, and the total antenna length is the length of the first antenna portion 1022 plus the length of the second antenna portion 1024. When the activation indicator component 300, the activatable environmental exposure indicator 200, or the activation and exposure indicator 400 is nonconductive, the second antenna portion 1024 is in an open circuit with respect to the first antenna portion 1022 and the integrated circuit 1010, and the total antenna length is the length of the first antenna portion 1022. As discussed above, the read range of the RF tag 1000 increases with antenna length, thus the read range of the RF tag 1000 is greater when the activation indicator component 300, the activatable environmental exposure indicator 200, or the activation and exposure indicator 400 is conductive.

In this manner, the read range of RF tags 1000 may be changed according to predetermined environmental exposures to which the RF tags 1000 are exposed, after an application of an activation action, or according to the application of an activation action. The altered read range may then be used as a mode of indicating a predetermined environmental exposure occurring after the application of an activation action, or as a mode of indicating the application of the activation action. Generally speaking, each RF tag 1000 has a restricted antenna state, in which the only portion of the antenna 1020 which is electrically connected to (e.g., in a closed circuit with) the integrated circuit 1010 is the first antenna portion 1022, and the RF tag 1000 has a corresponding first read range, which may be considered a restricted read range. Furthermore, each RF tag 1000 has at least one extended antenna state, corresponding to when portions of the antenna 1020 other than the first antenna portion 1022 are electrically connected to (e.g., in a closed circuit with) the integrated circuit 1010. As will be apparent from the following discussion of specific examples of RF tags 1000, the RF tags 1000 may be configured to change from the restricted antenna state to the extended antenna state responsive to the application of an activation action, or to a predetermined environmental exposure occurring thereafter. The RF tags 1000 may be configured to change from the extended antenna state to the restricted antenna state responsive to the application of an activation action, or to a predetermined environmental exposure occurring thereafter. The RF tags 1000 may be configured to change between various extended antenna states responsive to the application of an activation action, or to a predetermined environmental exposure occurring thereafter.

In some examples, the RF tag 1000 further includes an electrical circuit 1015 which is electrically connected to (e.g., in a closed circuit with) the integrated circuit 1010. The integrated circuit 1010 is configured, responsive to the antenna 1020 receiving an interrogation signal in a predetermined radiofrequency band, to cause the antenna 1020 to emit a response signal. In some examples, the integrated circuit 1010 may query the electrical circuit 1015 as to a condition of the electrical circuit 1015, such that the condition of the electrical circuit 1015 changes the response emitted by the antenna 1020.

In some examples, the RF tag 1000 is a passive tag, such that the radiofrequency (RF) signals received by the antennas 1020 may be used to provide power to the RF tag 1000 and allow the RF tag 1000 to transmit an RF signal, via the antennas 1020, in response to the received RF signal. In other embodiments, e.g., an active RF tag, the integrated circuit 1010 may include an electrical connection to a battery, or other power source capable of powering the RF tag 1000 to transmit an RF signal without having first received an interrogative RF signal. The integrated circuit 1010 may contain a variety of circuitry components, which may include a memory in which data is stored, such that the RF tag 1000 is capable of transmitting the data contained in the memory to an RF reader. The integrated circuit 1010 may sense data indicative of an electrical property or value of the electric circuit 1015, such that the RF tag 1000 is capable of transmitting the sensed data to an RF reader, where the sensed data may or may not be stored in the memory.

The RF tags 1000 of the present disclosure are activatable and several are environmentally sensitive. As such, each embodiment of the RF tag 1000 includes at least a one activatable environmental exposure indicator 200, at least one activation indicator component 300, or an at least one activation and exposure indicator 400. Each RF tag 1000 is configured to have at least a first read range (e.g., distance from an interrogating device at which a response signal emitted by the RF tag responsive to an interrogation signal emitted by the interrogation device can be decoded by the interrogation device) and a second read range. In some examples, the RF tag 1000 has a first read range prior to activation of one or more activatable environmental exposure indicators 200 and activation indicator components 300. The RF tag 1000 may have a second read range after activation of an activation indicator component 300, or after a predetermined environmental exposure occurring subsequently to activation of an activatable environmental exposure indicator 200. According to some embodiments, a change in read range may be accompanied by a change in the response frequency of the response signal emitted by the RF tag 1000. Said differently, as more antenna portions are electrically connected to (e.g., in a closed circuit with) the integrated circuit 1010, the frequency band in which the response signal is transmitted may change accordingly.

As illustrated, the RF tags 1000 include two antennas 1020 and associated components mirrored on each side of the integrated circuit 1010, however each side is identical in structure and function and is therefore referred to as singular.

As shown in FIGS. 18-23, the RF tag 1000 can include a substrate 1005. The substrate 1005 can support the integrated circuit 1010, the electric circuit(s) 1015, the antennas 1020, the activatable environmental exposure indicator 200, the activation indicator component 300, and/or the activation and exposure indicator 400. The substrate 1005 may be, for example, paper such as a cellulose paper, a natural or synthetic polymer, or other materials. In some examples, the substrate 1005 may provide a surface upon which indicia can be printed. In some examples, the substrate 1005 may have a thickness in a range of about 10 mm to about 20 mm, from about 1 mm to about 10 mm or from about 10 mm to about 20 mm. As a non-limiting example, the substrate 1005 may be one of a Polyolefin, polyamide, polypropylene, polyester Polyimide, Polyart synthetic paper, nylon, or PPG Teslin paper. In an example, there may be a topcoat applied to the substrate 1005. Optionally, the substrate 1005 may further include a release liner and/or an adhesive backing to allow the substrate 1005 to be selectively attached to surfaces, e.g., as an adhesive media element.

Activatable Rf Tag with Variable Read Range: First Embodiment

Figure 16:
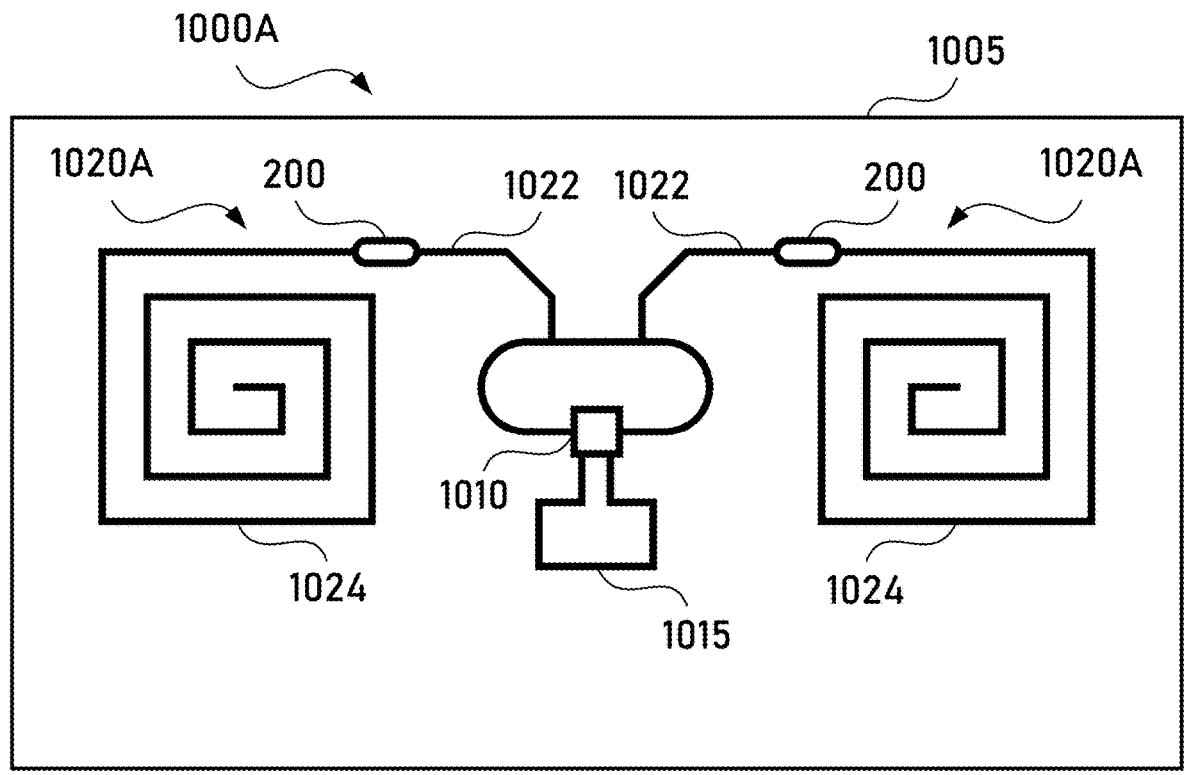
FIG. 16 illustrates a first embodiment of an activatable environmentally sensitive RF tag, according to embodiments of the present disclosure.

FIG. 16 illustrates a first embodiment of an activatable RF tag 1000A, according to embodiments of the present disclosure. The RF tag 1000A includes an antenna 1020A including a first antenna portion 1022 and a second antenna portion 1024. The first antenna portion 1022 is coupled to the second antenna portion 1024 by an activatable environmental exposure indicator 200.

When the activatable environmental exposure indicator 200 is in the indicator nonconductive state, the second antenna portion 1024 is not electrically connected to (e.g., in an open circuit relative to) the first antenna portion 1022 and the integrated circuit 1010. At such times, the operative antenna length of the RF tag 1000A is the length of the first antenna portion 1022, and the RF tag 1000A has a corresponding first read range.

When the activatable environmental exposure indicator 200 is in the indicator conductive state, the second antenna portion 1024 is electrically connected to (e.g., in a closed circuit with) the integrated circuit 1010 and to the first antenna portion 1022. At such times, the operative antenna length of the RF tag 1000A is the sum of the lengths of the first antenna portion 1022 and the second antenna portion 1024, and the RF tag 1000A has a corresponding second read range.

The activatable environmental exposure indicator 200 is configured to transition from the unactivated state to the activated state responsive to a predetermined environmental exposure occurring after the application of an activation action. The predetermined environmental exposure and activation action may be as described in Section I.

In some embodiments, the RF tag 1000A may be configured to increase in read range responsive to a predetermined environmental exposure. In such embodiments, the exposed state of the activatable environmental exposure indicator 200 is the indicator conductive state and the unexposed state of the activatable environmental exposure indicator 200 is the indicator nonconductive state (e.g., activatable environmental exposure indicators 200A, 200B, 200D). In such embodiments, the predetermined environmental exposure occurring after the application of the activation action causes the activatable environmental exposure indicator 200 to transition from the indicator nonconductive state to the indicator conductive state. Thus, as a result of the application of the activation action, the first antenna portion 1022 becomes electrically connected to the second antenna portion 1024, and the operative antenna length of the RF tag 1000A increases from the length of the first antenna portion 1022 to the sum of the lengths of the first antenna portion 1022 and the second antenna portion 1024. In this manner, the RF tag 1000A has a first read range when the activatable environmental exposure indicator 200 is in the unexposed state, and a second, greater read range when the activatable environmental exposure indicator 200 is in the exposed state.

In some embodiments, the RF tag 1000A may be configured to decrease in read range responsive to a predetermined environmental exposure. In such embodiments, the exposed state of the activatable environmental exposure indicator 200 is the indicator nonconductive state (e.g., activatable environmental exposure indicator 200C). In such embodiments, the predetermined environmental exposure occurring after the application of the activation action electrically disconnects (opens the circuit between) the first antenna portion 1022 and the second antenna portion 1024, such that the operative length of the antenna decreases from the sum of the lengths of the first antenna portion 1022 and the second antenna portion 1024 to the length of the first antenna portion 1022. In this manner, the RF tag 1000A has the second read range when the activatable environmental exposure indicator 200 is in the unexposed state, and the first read range when the activatable environmental exposure indicator 200 is in the exposed state.

In some embodiments, when the RF tag 1000A has the first read range, the integrated circuit 1010 and the first antenna portion 1022 may be configured such that the RF tag 1000A operates as an NFC tag, and when the RF tag 1000A has the second read range, the RF tag 1000A operates as a UHF tag.

Activatable Rf Tag with Variable Read Range: Second Embodiment

Figure 17:
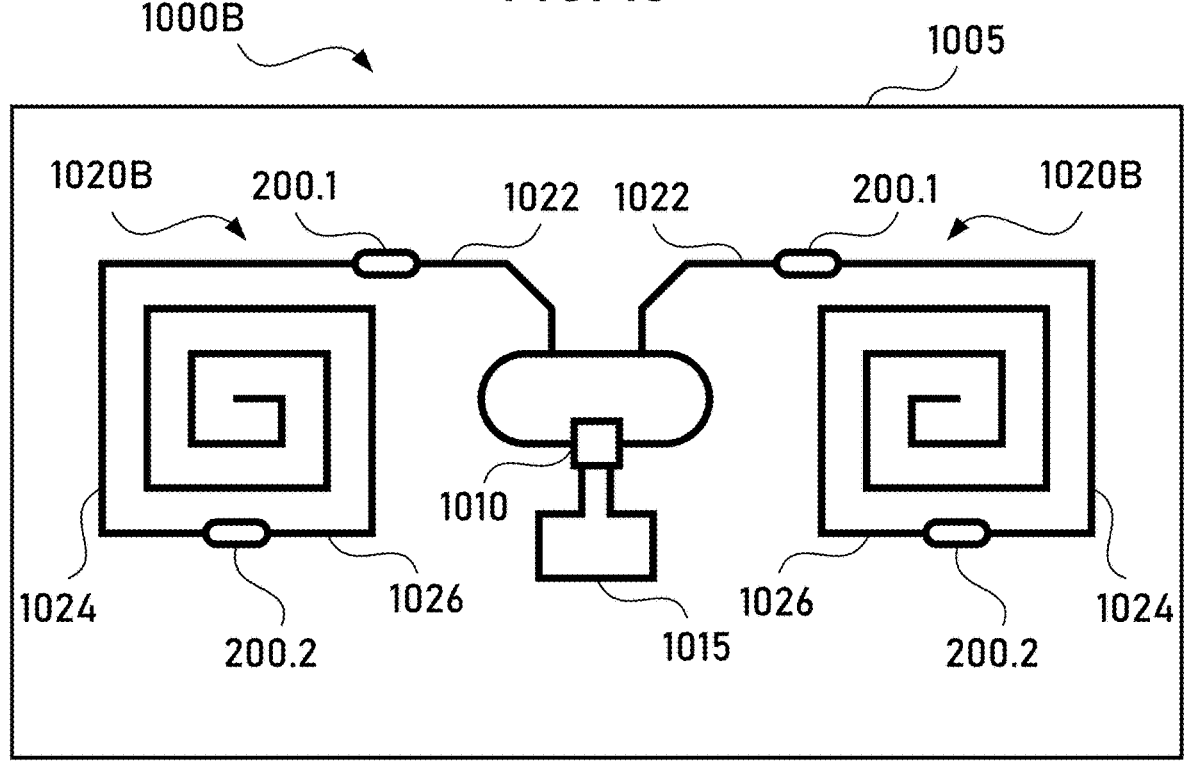
FIG. 17 illustrates a second embodiment of an activatable environmentally sensitive RF tag, according to embodiments of the present disclosure.

FIG. 17 illustrates a second embodiment of an activatable RF tag 1000B, according to embodiments of the present disclosure. The RF tag 1000B includes an antenna 1020B including a first antenna portion 1022, a second antenna portion 1024 and a third antenna portion 1026. The first antenna portion 1022 is coupled to the second antenna portion 1024 by a first activatable environmental exposure indicator 200.1, and the second antenna portion 1024 is coupled to the third antenna portion 1024 by a second activatable environmental exposure indicator 200.2.

When the first activatable environmental exposure indicator 200.1 is in the indicator nonconductive state, the second antenna portion 1024 is not electrically connected to (e.g., in an open circuit relative to) the first antenna portion 1022 and the integrated circuit 1010. At such times, the operative antenna length is the length of the first antenna portion 1022, and the RF tag 1000B has a corresponding first read range.

When the first activatable environmental exposure indicator 200.1 is in the indicator conductive state, and the second activatable environmental exposure indicator 200.2 is in the indicator nonconductive state, the second antenna portion 1024 is electrically connected to (e.g., in a closed circuit with) the integrated circuit 1010 and to the first antenna portion 1022, and the third antenna portion 1026 is not electrically connected to (e.g., in an open circuit with) the integrated circuit 1010 and to the first antenna portion 1022. At such times, the operative antenna length of the RF tag 1000B is the sum of the lengths of the first antenna portion 1022 and the second antenna portion 1024, and the RF tag 1000B has a corresponding second read range, greater than the first read range.

When the first activatable environmental exposure indicator 200.1 is in the indicator conductive state, and the second activatable environmental exposure indicator 200.2 is in the indicator conductive state, the third antenna portion 1026 is electrically connected to (e.g., in a closed circuit with) the integrated circuit 1010, the second antenna portion 1024 and the first antenna portion 1022. At such times, the operative antenna length of the RF tag 1000B is the sum of the lengths of the first antenna portion 1022, the second antenna portion 1024 and the third antenna portion 1026, and the RF tag 1000B has a third read range, greater than the second read range.

When the first activatable environmental exposure indicator 200.1 is in the indicator nonconductive state, the third antenna portion 1026 is not electrically connected to (in an open circuit relative to) the first antenna portion and the integrated circuit 1010, regardless of the state of the second activatable environmental exposure indicator 200.2.

The first activatable environmental exposure indicator 200.1 is configured to transition from the unactivated state to the activated state responsive to a first predetermined environmental exposure occurring after the application of an activation action. The first predetermined environmental exposure and activation action may be as described in Section I.

The second activatable environmental exposure indicator 200.2 is configured to transition from the unactivated state to the activated state responsive to a second predetermined environmental exposure occurring after the application of an activation action. The second predetermined environmental exposure and activation action may be as described in Section I.

According to some embodiments, the RF tag 1000B may be configured to indicate exposure to the first predetermined environmental exposure, and a successive exposure to the second predetermined environmental exposure.

In some such examples, the first activatable environmental exposure indicator 200.1 may be selected such that the exposed state of the activatable environmental exposure indicator 200.1 is the indicator conductive state, and the second activatable environmental exposure indicator 200.2 may be selected such that the exposed state of the second activatable environmental exposure indicator 200.2 is the indicator conductive state (e.g., activatable environmental exposure indicators 200A, 200B, 200D). Thus, following the application of the activation action, the first activatable environmental exposure indicator 200.1 becomes conductive responsive to the first predetermined environmental exposure, such that the second antenna portion 1024 is electrically connected to the IC, and the read range of the RF tag 1000B increases from the first read range to the second read range. The second activatable environmental exposure indicator 200.2 transitions to the indicator conductive state responsive to the second predetermined environmental exposure, increasing the read range of the RF tag form the second red range to the third read range. If the second predetermined environmental exposure occurs prior to the first predetermined environmental exposure, the first predetermined environmental exposure causes the read range of the RF tag 1000B to transition from the first read range to the third read range.

According to some embodiments, the RF tag 1000B may be configured to indicate exposure to the second predetermined environmental exposure, and a successive exposure to the first predetermined environmental exposure successive to the first predetermined environmental exposure.

In some such examples, the first activatable environmental exposure indicator 200.1 may be selected such that the exposed state of the activatable environmental exposure indicator 200.1 is the indicator nonconductive state, and the second activatable environmental exposure indicator 200.2 may be selected such that the exposed state of the second activatable environmental exposure indicator 200.2 is the indicator nonconductive state (e.g., activatable environmental exposure indicators 200C). Thus, following the application of the activation action the second activatable environmental exposure indicator 200.2 becomes nonconductive responsive to the second predetermined environmental exposure, such that the third antenna portion 1026 is electrically disconnected with the integrated circuit 1010, and the read range of the RF tag 1000B decreases from the third read range to the second read range. The first activatable environmental exposure indicator 200.1 transitions to the indicator nonconductive state responsive to the first predetermined environmental exposure, decreasing the read range of the RF tag from the second red range to the first read range. If the first predetermined environmental exposure occurs prior to the second predetermined environmental exposure, the second predetermined environmental exposure causes the read range of the RF tag 1000B to transition from the third read range to the first read range.

In some examples, the first predetermined environmental exposure and the second predetermined environmental exposure may be of the same type yet have different exposure thresholds. For example, the first predetermined environmental exposure may be an exposure to a temperature above a first predetermined high temperature threshold, and the second predetermined environmental exposure may be an exposure to a temperature above a second predetermined high temperature threshold, the second predetermined high temperature threshold being greater than the first predetermined high temperature threshold.

In some embodiments, when the RF tag 1000B has the first read range, the integrated circuit 1010 and the first antenna portion 1022 may be configured such that the RF tag 1000B operates as an NFC tag, and when the RF tag 1000B has the second read range, or the third read range, the RF tag 1000B operates as a UHF tag.

Various embodiments of the RF tag 1000B including other arrangements and types of activatable environmental exposure indicators 200, which are configured to change the read range or operative antenna length of the RF tag 1000B responsive to various predetermined environmental exposures occurring after an activation action are also contemplated, if not expressly stated.

This disclosure further contemplates embodiments including more activatable environmental exposure indicators 200 and corresponding antenna portions. For example, an RF tag 1000B may include three activatable environmental exposure indicators configured to indicate three distinct predetermined environmental exposures, and the RF tag may include four antenna portions, such that the RF tag 1000B has three distinct read ranges, corresponding to each predetermined environmental exposure. Various embodiments of the RF tag 1000B may include any number of activatable environmental exposure indicators 200 without departing from the scope of the disclosure.

Activatable Rf Tag with Variable Read Range: Third Embodiment

Figure 18:
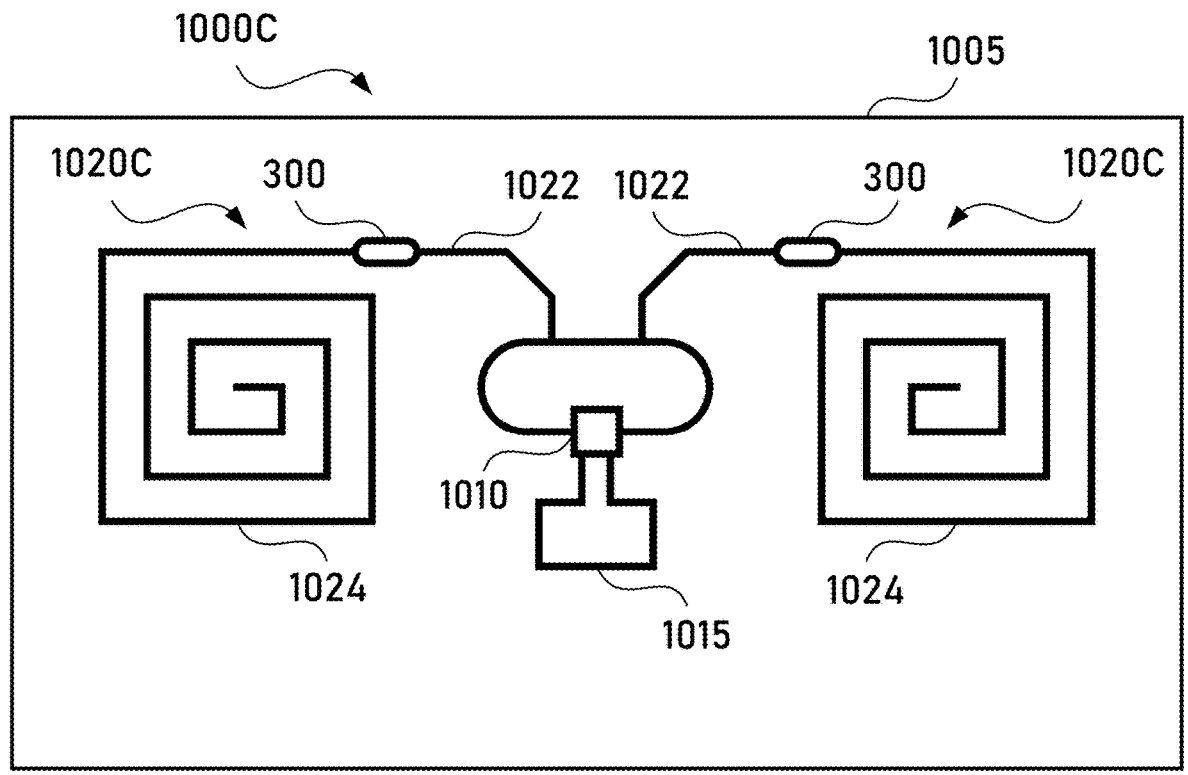
FIG. 18 illustrates a third embodiment of an activatable environmentally sensitive RF tag, according to embodiments of the present disclosure.

FIG. 18 illustrates a third embodiment of an activatable RF tag 1000C, according to embodiments of the present disclosure. The RF tag 1000C includes an antenna 1020C including a first antenna portion 1022 and a second antenna portion 1024. The first antenna portion 1022 is coupled to the second antenna portion 1024 by an activation indicator component 300.

When the activation indicator component 300 is in the component nonconductive state, the second antenna portion 1024 is not electrically connected to (e.g., in an open circuit relative to) the first antenna portion 1022 and the integrated circuit 1010. At such times, the operative antenna length of the RF tag 1000C is the length of the first antenna portion 1022, and the RF tag 1000C has a corresponding first read range.

When the activation indicator component 300 is in the component conductive state, the second antenna portion 1024 is electrically connected to (e.g., in a closed circuit with) the integrated circuit 1010 and to the first antenna portion 1022. At such times, the operative antenna length of the RF tag 1000C is the sum of the lengths of the first antenna portion 1022 and the second antenna portion 1024, and the RF tag 1000C has a corresponding second read range.

The activation indicator component is configured to transition from the unactivated state to the activated state responsive to the application of an activation action. The activation action may be as described in Section I.

In some embodiments, the RF tag 1000C may be configured to increase in read range responsive to the application of the activation action. In such embodiments, the activated state of the activation indicator component 300 is the component conductive state and the unactivated state of the activation indicator component 300 is the component nonconductive state (e.g., activation indicator components 300A, 300B, 300D). In such embodiments, the application of the activation action causes the activation indicator component to transition from the component nonconductive state to the component conductive state. Thus, as a result of the application of the activation action, the first antenna portion 1022 becomes electrically connected to the second antenna portion 1024, and the operative antenna length of the RF tag 1000C increases from the length of the first antenna portion 1022 to the sum of the lengths of the first antenna portion 1022 and the second antenna portion 1024. In this manner, the RF tag 1000C has a first read range when the activation indicator component 300 is in the unactivated state, and a second, greater read range when the activation indicator component 300 is in the activated state.

In some embodiments, the RF tag 1000C may be configured to decrease in read range responsive to a predetermined environmental exposure. In such embodiments, the activated state of the activation indicator component is the component nonconductive state, and the unactivated state of the activation indicator component 300 is the component conductive state (e.g., activation indicator component 300C). In such embodiments, the application of the activation action electrically disconnects (opens the circuit between) the first antenna portion 1022 and the second antenna portion 1024, such that the operative length of the antenna decreases from the sum of the lengths of the first antenna portion 1022 and the second antenna portion 1024 to the length of the first antenna portion 1022. In this manner, the RF tag 1000C has the second read range when the activation indicator component 300 is in the unactivated state, and the first read range when the activation indicator component 300 is in the activated state.

In some embodiments, when the RF tag 1000C has the first read range, the integrated circuit 1010 and the first antenna portion 1022 may be configured such that the RF tag 1000C operates as an NFC tag, and when the RF tag 1000C has the second read range, the RF tag 1000C operates as a UHF tag.

Activatable Rf Tag with Variable Read Range: Fourth Embodiment

Figure 19:
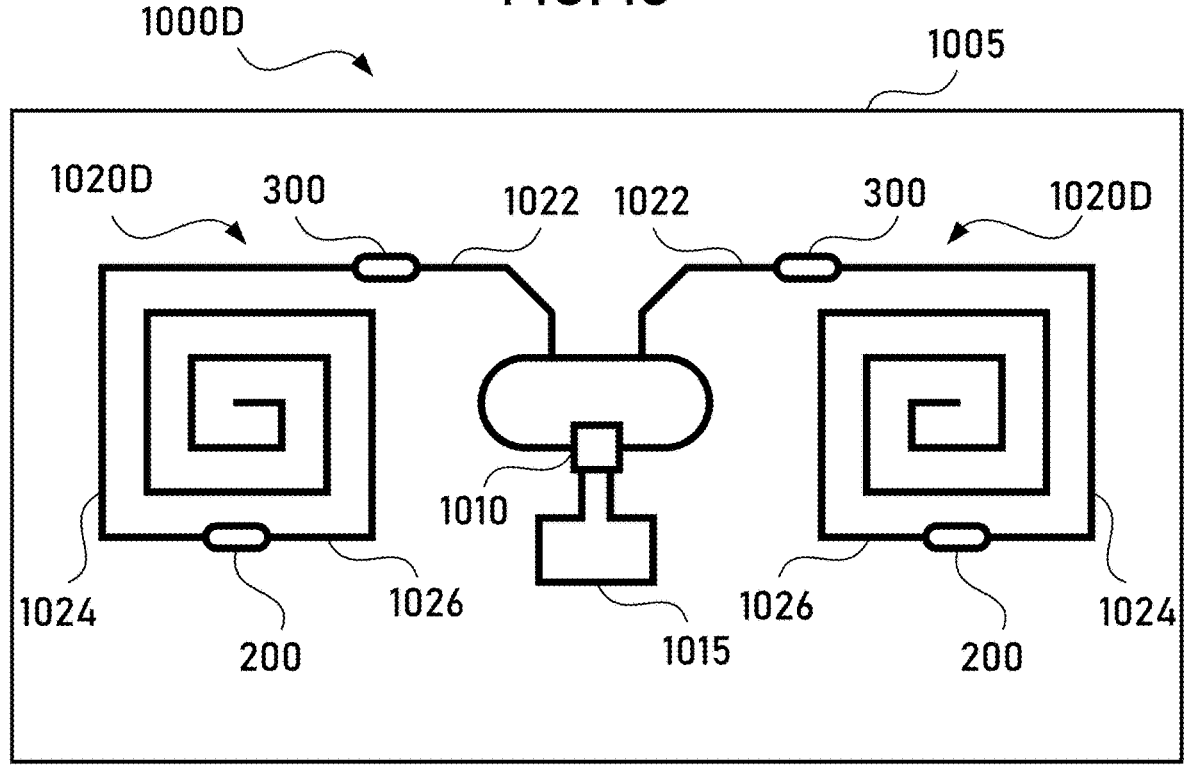
FIG. 19 illustrates a fourth embodiment of an activatable environmentally sensitive RF tag, according to embodiments of the present disclosure.

FIG. 19 illustrates a fourth embodiment of an activatable RF tag 1000D, according to embodiments of the present disclosure. The RF tag 1000D includes an antenna 1020D including a first antenna portion 1022, a second antenna portion 1024 and a third antenna portion 1026. The first antenna portion 1022 is coupled to the second antenna portion 1024 by an activation indicator component 300, and the second antenna portion 1024 is coupled to the third antenna portion 1024 by an activatable environmental exposure indicator 200.

When the activation indicator component 300 is in the component nonconductive state, the second antenna portion 1024 is not electrically connected to (e.g., in an open circuit relative to) the first antenna portion 1022 and the integrated circuit 1010. At such times, the operative antenna length is the length of the first antenna portion 1022, and the RF tag 1000D has a corresponding first read range.

When the activation indicator component 300 is in the component conductive state, and the activatable environmental exposure indicator 200 is in the indicator nonconductive state, the second antenna portion 1024 is electrically connected to (e.g., in a closed circuit with) the integrated circuit 1010 and to the first antenna portion 1022, and the third antenna portion 1026 is not electrically connected to (e.g., in an open circuit with) the integrated circuit 1010 and to the first antenna portion 1022. At such times, the operative antenna length of the RF tag 1000D is the sum of the lengths of the first antenna portion 1022 and the second antenna portion 1024, and the RF tag 1000D has a corresponding second read range, greater than the first read range.

When the activation indicator component 300 is in the component conductive state, and the activatable environmental exposure indicator 200 is in the indicator conductive state, the third antenna portion 1026 is electrically connected to (e.g., in a closed circuit with) the integrated circuit 1010, the second antenna portion 1024 and the first antenna portion 1022. At such times, the operative antenna length of the RF tag 1000D is the sum of the lengths of the first antenna portion 1022, the second antenna portion 1024 and the third antenna portion 1026, and the RF tag 1000D has a third read range, greater than the second read range.

When the activation indicator component 300 is in the component nonconductive state, the third antenna portion 1026 is not electrically connected to (in an open circuit relative to) the first antenna portion and the integrated circuit 1010, regardless of the state of the activatable environmental exposure indicator 200.

The activation indicator component 300 is configured to transition from the unactivated state to the activated state responsive to the application of an activation action. The activation action may be as described in Section I.

The activatable environmental exposure indicator 200 is configured to transition from the unactivated state to the activated state responsive to a predetermined environmental exposure occurring after the application of the activation action. The predetermined environmental exposure and activation action may be as described in Section I.

According to some embodiments, the RF tag 1000D may be configured to indicate activation, and a successive exposure to the predetermined environmental exposure by increasing the read range of the RF tag 1000D.

In some such examples, the activation indicator component 300 may be selected such that the activated state of the activation indicator component 300 is the component conductive state (e.g., activation indicator components 300A, 300B, 300D), and the activatable environmental exposure indicator 200 may be selected such that the exposed state of the activatable environmental exposure indicator 200 is the indicator conductive state (e.g., activatable environmental exposure indicators 200A, 200B, 200D). Thus, following the application of the activation action, the activation indicator component 300 transitions to the component conductive state responsive to the application of the activation action, such that the second antenna portion 1024 is electrically connected to the integrated circuit 1010, and the read range of the RF tag 1000D increases from the first read range to the second read range. The activatable environmental exposure indicator 200 transitions to the indicator conductive state responsive to the predetermined environmental exposure occurring after the application of the activation action, increasing the read range of the RF tag from the second red range to the third read range.

In some embodiments, when the RF tag 1000D has the first read range, the integrated circuit 1010 and the first antenna portion 1022 may be configured such that the RF tag 1000D operates as an NFC tag, and when the RF tag 1000D has the second read range, or the third read range, the RF tag 1000D operates as a UHF tag.

According to some embodiments, the RF tag 1000D may be configured to indicate activation, and a successive exposure to the predetermined environmental exposure by decreasing the read range of the RF tag 1000D. In such embodiments, the activation indicator component 300 connects the third antenna portion 1026 to the second antenna portion 2024, and the activatable environmental exposure indicator 200 couples the second antenna portion 1024 to the first antenna portion 1022. Additionally, the activation indicator component 300 is selected such that the activated state of the activation indicator component 300 is the component nonconductive state, and the activatable environmental exposure indicator 200 is selected such that the exposed state of the activatable environmental exposure indicator 200 is the indicator nonconductive state. In this manner, prior to the application of the activation action, the RF tag 1000D initially has the third read range. Upon activation, activation indicator component 300 transitions to the component nonconductive state, electrically disconnecting the third antenna portion 1026 from the integrated circuit 1010, such that the RF tag 1000D has the second read range. Responsive to the predetermined environmental exposure occurring after the application of the activation action, the activatable environmental exposure indicator 200 transitions to the indicator nonconductive state, electrically disconnecting the second antenna portion 1024 from the integrated circuit 1010, such that the RF tag 1000D has the first read range.

Various embodiments of the RF tag 1000D including other arrangements and types of activatable environmental exposure indicators 200 and activation indicator components 300, which are configured to change the read range or operative antenna length of the RF tag 1000D.

Activatable Rf Tag with Variable Read Range: Fifth Embodiment

Figure 20:
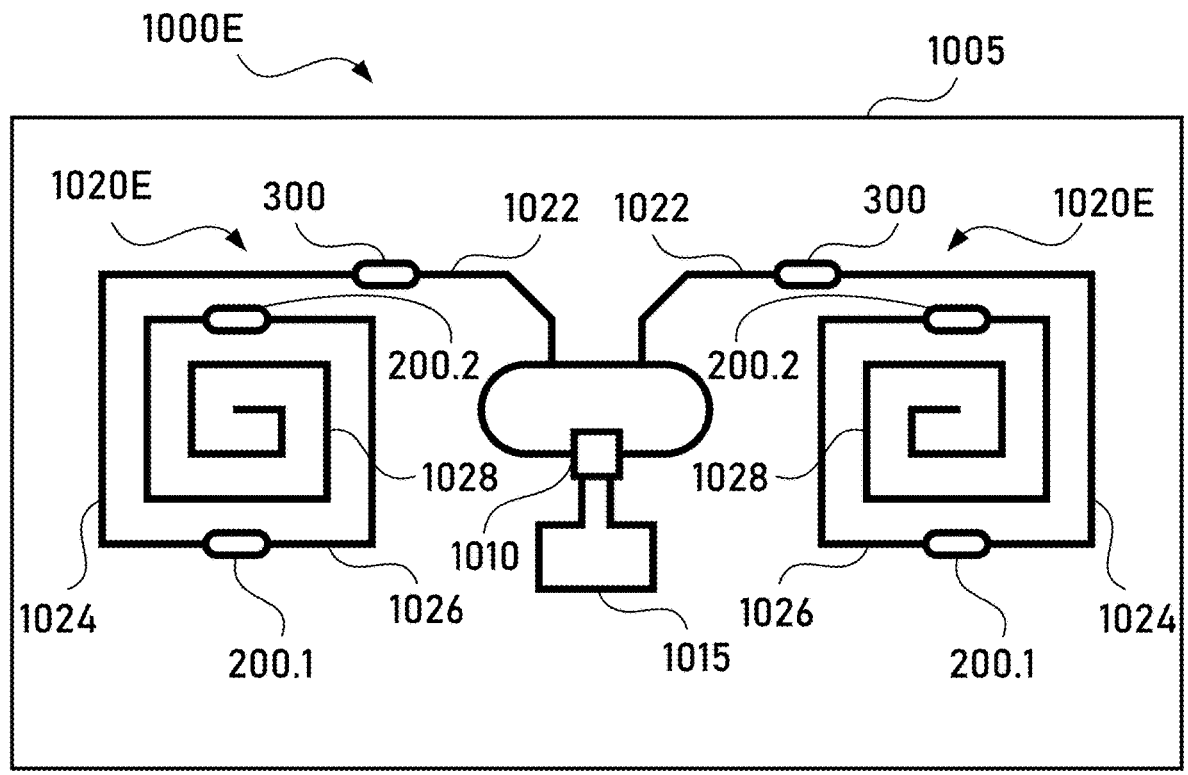
FIG. 20 illustrates a fifth embodiment of an activatable environmentally sensitive RF tag, according to embodiments of the present disclosure.

FIG. 20 illustrates a fifth embodiment of an activatable RF tag 1000E, according to embodiments of the present disclosure. The RF tag 1000E includes an antenna 1020E including a first antenna portion 1022, a second antenna portion 1024 and a third antenna portion 1026 and a fourth antenna portion 1028. The first antenna portion 1022 is coupled to the second antenna portion 1024 by an activation indicator component 300, the second antenna portion 1024 is coupled to the third antenna portion 1024 by a first activatable environmental exposure indicator 200.1, and the third antenna portion 1026 is connected to the fourth antenna portion 1028 by a second activatable environmental exposure indicator 200.2.

When the activation indicator component 300 is in the component nonconductive state, the second antenna portion 1024 is not electrically connected to (e.g., in an open circuit relative to) the first antenna portion 1022 and the integrated circuit 1010. At such times, the operative antenna length is the length of the first antenna portion 1022, and the RF tag 1000E has a corresponding first read range. Furthermore, when the activation indicator component 300 is in the component nonconductive state, the third antenna portion and the fourth antenna portion are also not electrically connected to the integrated circuit 1010.

When the activation indicator component 300 is in the component conductive state, and the activatable environmental exposure indicator 200 is in the indicator nonconductive state, the second antenna portion 1024 is electrically connected to (e.g., in a closed circuit with) the integrated circuit 1010 and to the first antenna portion 1022, and the third antenna portion 1026 and fourth antenna portion 1028 are not electrically connected to (e.g., in an open circuit with) the integrated circuit 1010 and to the first antenna portion 1022. At such times, the operative antenna length of the RF tag 1000E is the sum of the lengths of the first antenna portion 1022 and the second antenna portion 1024, and the RF tag 1000E has a corresponding second read range, greater than the first read range.

When the activation indicator component 300 is in the component conductive state, the first activatable environmental exposure indicator 200.1 is in the indicator conductive state, and the second activatable environmental exposure indicator 200.2 is in the indicator nonconductive state, the third antenna portion 1026 is electrically connected to (e.g., in a closed circuit with) the integrated circuit 1010, the second antenna portion 1024 and the first antenna portion 1022; the fourth antenna portion 1028 is not electrically connected to the integrated circuit 1010. At such times, the operative antenna length of the RF tag 1000E is the sum of the lengths of the first antenna portion 1022, the second antenna portion 1024 and the third antenna portion 1026, and the RF tag 1000E has a third read range, greater than the second read range.

When the activation indicator component 300 is in the component conductive state, the first activatable environmental exposure indicator 200.1 is in the indicator conductive state, and the second activatable environmental exposure indicator 200.2 is in the indicator conductive state, the fourth antenna portion 1028, the third antenna portion 1026, and the second antenna portion 1024 are electrically connected to the integrated circuit 1010 and the first antenna portion 1022. At such times, the operative antenna length of the RF tag 1000E is the sum of the lengths of the first antenna portion 1022, the second antenna portion 1024 the third antenna portion 1026, and the fourth antenna portion 1028, and the RF tag 1000E has a fourth read range, greater than the third read range.

The activation indicator component 300 is configured to transition from the unactivated state to the activated state responsive to the application of an activation action. The activation action may be as described in Section I.

The first activatable environmental exposure indicator 200.1 is configured to transition from the unactivated state to the activated state responsive to a first predetermined environmental exposure occurring after the application of an activation action. The first predetermined environmental exposure and activation action may be as described in Section I.

The second activatable environmental exposure indicator 200.2 is configured to transition from the unactivated state to the activated state responsive to a second predetermined environmental exposure occurring after the application of an activation action. The second predetermined environmental exposure and activation action may be as described in Section I.

According to some embodiments, the RF tag 1000E may be configured to indicate activation, a successive exposure to the first predetermined environmental exposure, and a successive exposure to the second predetermined environmental exposure, by incrementally increasing the read range of the RF tag 1000E.

In some such examples, the activation indicator component 300 may be selected such that the activated state of the activation indicator component 300 is the component conductive state (e.g., activation indicator components 300A, 300B, 300D), the first activatable environmental exposure indicator 200.1 and the second activatable environmental exposure indicator 200.2 may be selected such that the exposed state of the activatable environmental exposure indicators 200 is the indicator conductive state (e.g., activatable environmental exposure indicators 200A, 200B, 200D). Thus, following the application of the activation action, the activation indicator component 300 transitions to the component conductive state responsive to the application of the activation action, such that the second antenna portion 1024 is electrically connected to the integrated circuit 1010, and the read range of the RF tag 1000E increases from the first read range to the second read range. The first activatable environmental exposure indicator 200.1 transitions to the indicator conductive state responsive to the first predetermined environmental exposure occurring after the application of the activation action, increasing the read range of the RF tag from the second red range to the third read range. The second activatable environmental exposure indicator 200.2 transitions to the indicator conductive state responsive to the second predetermined environmental exposure occurring after the application of the activation action, increasing the read range of the RF tag 1000E from the third read range to the fourth read range.

In some examples, the first predetermined environmental exposure and the second predetermined environmental exposure may be of the same type yet have different exposure thresholds. For example, the first predetermined environmental exposure may be an exposure to a temperature above a first predetermined high temperature threshold, and the second predetermined environmental exposure may be an exposure to a temperature above a second predetermined high temperature threshold, the second predetermined high temperature threshold being greater than the first predetermined high temperature threshold.

In some embodiments, when the RF tag 1000E has the first read range, the integrated circuit 1010 and the first antenna portion 1022 may be configured such that the RF tag 1000E operates as an NFC tag, and when the RF tag 1000E has the second read range, the third read range, or the fourth read range, the RF tag 1000A operates as a UHF tag.

Various embodiments of the RF tag 1000E including other arrangements and types of activatable environmental exposure indicators 200 and activation indicator components 300, which are configured to change the read range or operative antenna length of the RF tag 1000E.

This disclosure further contemplates embodiments including more activatable environmental exposure indicators 200 and corresponding antenna portions. For example, an RF tag 1000E may include three activatable environmental exposure indicators configured to indicate three distinct predetermined environmental exposures, and the RF tag may include five antenna portions, such that the RF tag 1000E has four distinct read ranges, corresponding to each predetermined environmental exposure plus one for activation. Various embodiments of the RF tag 1000E may include any number of activatable environmental exposure indicators 200 without departing from the scope of the disclosure.

Activatable Rf Tag with Variable Read Range: Sixth Embodiment

Figure 21:
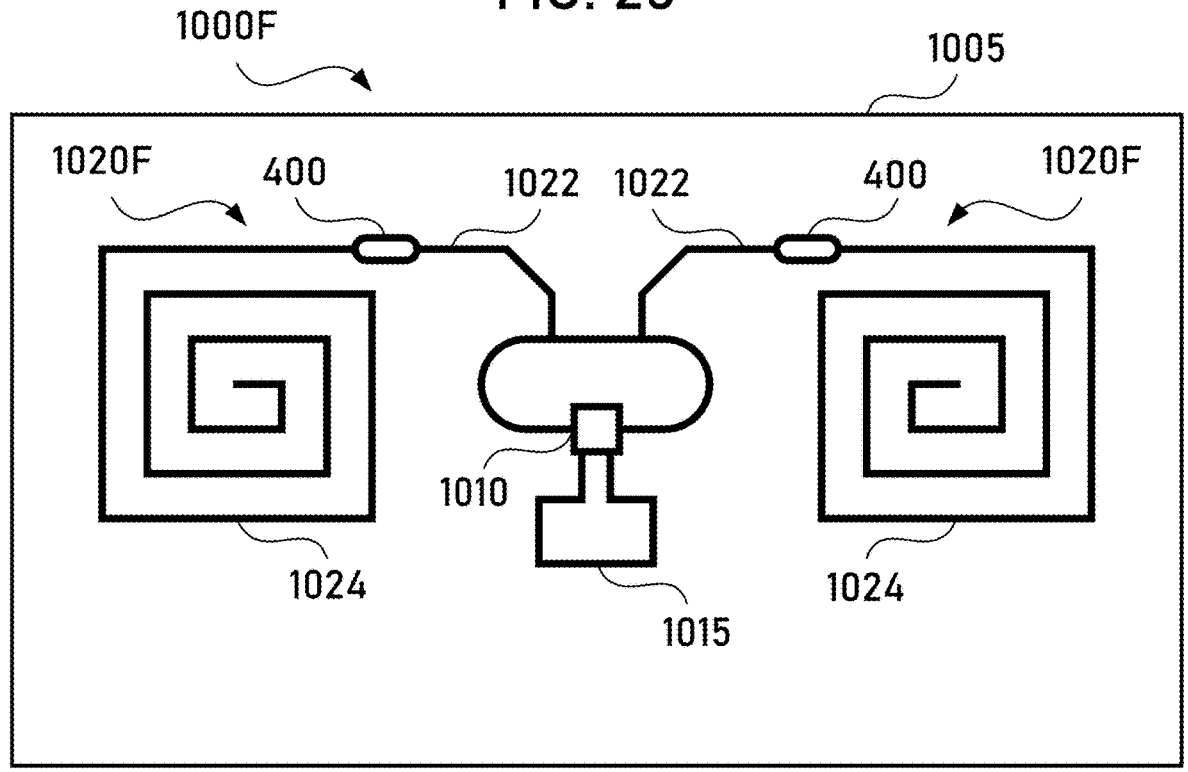
FIG. 21 illustrates a sixth embodiment of an activatable environmentally sensitive RF tag, according to embodiments of the present disclosure.

FIG. 21 illustrates a sixth embodiment of an activatable RF tag 1000F, according to embodiments of the present disclosure. The RF tag 1000F includes an antenna 1020F including a first antenna portion 1022 and a second antenna portion 1024. The first antenna portion 1022 is coupled to the second antenna portion 1024 by an activation and exposure indicator 400.

When the activation and exposure indicator 400 is in the nonconductive state, the second antenna portion 1024 is not electrically connected to (e.g., in an open circuit relative to) the first antenna portion 1022 and the integrated circuit 1010. At such times, the operative antenna length of the RF tag 1000F is the length of the first antenna portion 1022, and the RF tag 1000F has a corresponding first read range.

When the activation and exposure indicator 400 is in the conductive state, the second antenna portion 1024 is electrically connected to (e.g., in a closed circuit with) the integrated circuit 1010 and to the first antenna portion 1022. At such times, the operative antenna length of the RF tag 1000F is the sum of the lengths of the first antenna portion 1022 and the second antenna portion 1024, and the RF tag 1000F has a corresponding second read range.

The activation and exposure indicator 400 is configured to transition from the conductive state to the nonconductive state responsive an activation action. The activation and exposure indicator 400 is configured to transition from the nonconductive state to the conductive state responsive to a predetermined environmental exposure occurring after the application of the activation action. The predetermined environmental exposure and activation action may be as described in Section I.

In some embodiments, the RF tag 1000F may be configured to increase and decrease in read range responsive to the application of an activation action and a predetermined environmental exposure. The application of the activation action causes the activation and exposure indicator 400 to transition from the indicator conductive state to the indicator nonconductive state. Thus, as a result of the application of the activation action, the first antenna portion 1022 becomes electrically disconnected from the second antenna portion 1024, and the operative antenna length of the RF tag 1000F decreases from the sum of the lengths of the first antenna portion 1022 and the second antenna portion 1024 to the length of the first antenna portion 1022. In this manner, the RF tag 1000F has the second read range when the activation and exposure indicator 400 is in the unactivated state, and the first read range when the activation and exposure indicator 400 is in the activated and unexposed state. Responsive to the predetermined environmental exposure occurring after the application of the activation action, the activation and exposure indicator 400 transitions to the exposed state, thus reverting to the conductive state such that the first antenna portion 1022 becomes electrically connected to the second antenna portion 1024, and the operative antenna length of the RF tag 1000F increases from the length of the first antenna portion 1022 to the sum of the lengths of the first antenna portion 1022 and the second antenna portion 1024.

In some embodiments, when the RF tag 1000F has the first read range, the integrated circuit 1010 and the first antenna portion 1022 may be configured such that the RF tag 1000F operates as an NFC tag, and when the RF tag 1000F has the second read range, the RF tag 1000F operates as a UHF tag.

Section V. Example Applications of Activatable RF Tags with Variable Read Range

Section V discusses various non-limiting example applications of Activatable RF tags with variable read ranges (e.g., RF tags 1000).

Figure 22:
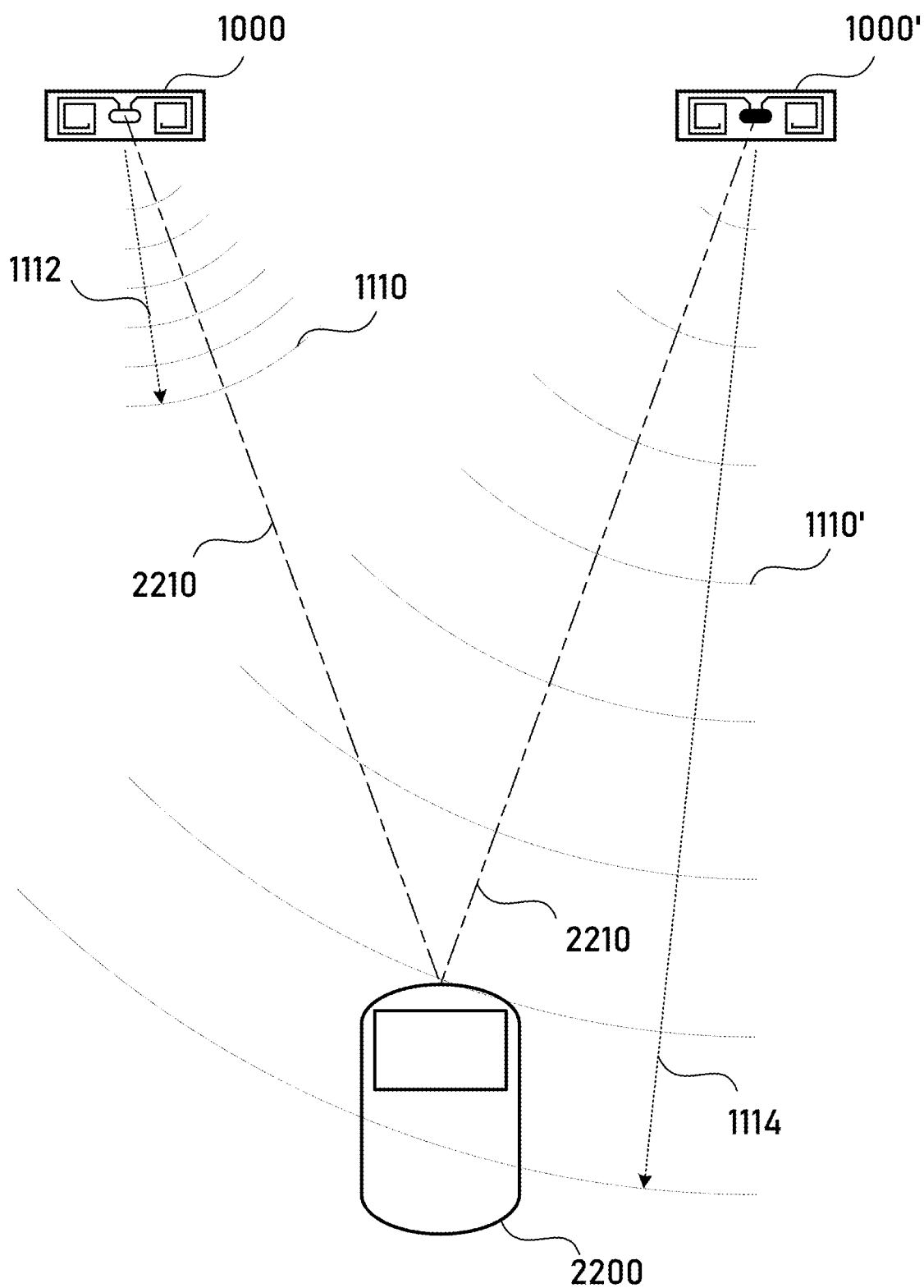
FIG. 22 illustrates an RFID reader and RF tags, according to embodiments of the present disclosure.

FIG. 22 illustrates an RFID reader 2200 and RF tags 1000, according to embodiments of the present disclosure. In the example embodiment of FIG. 22, the RF tags 1000 have a restricted antenna state, in which the RF tags 1000 emit a response signal 1110 having the first read range 1112 when interrogated by an interrogation signal 2210 from the RFID reader 2200, and an extended antenna state, in which the RF tags 1000' emit the response signal 1110' having an extended read range 1114 (e.g., one of the second, third, or fourth read ranges, according to various embodiments) when interrogated by an interrogation signal 2210 from the RFID reader 2200. The interrogation signal 2210 emitted from the RFID reader 2200 is emitted at a specified frequency, power range and duration.

The RF tag 1000 may be any of the embodiments of RF tags 1000 (e.g., RF tags 1000A, 1000B, 1000C, 1000D, 1000E, and 1000F) as described above in Section IV. When the RF tag 1000 is in the restricted antenna state, any activatable environmental exposure indicators 200, activation indicator components 300 or activation and exposure indicator 400 which may be included in the RF tags 1000 across various embodiments, are in the nonconductive state. In the extended antenna state, at least one of an activatable environmental exposure indicator 200, activation indicator component 300 or activation and exposure indicator 400 which couples a first antenna portion 1022 and a second antenna portion 1024 of the RF tag 1000 is in the conductive state, and the RF tag 1000 has a read range which is greater than the first read range, e.g., the second read range, the third read range, the fourth read range, and the like. Depending on the embodiment of the RF tag 1000 selected for use, the RF tag 1000 may be configured to transition from a first of the restricted antenna state and the extended antenna state to a second of the restricted antenna state and the extended antenna state responsive to the application of an activation action, or to a predetermined environmental exposure occurring after the application of an activation action.

When the RF tag 1000 is in the restricted antenna state receives the interrogation signal 2210, the RF tag 1000 engages in a predetermined response behavior corresponding to the restricted antenna state. As illustrated, the response behavior corresponding to the restricted antenna state is emitting a response signal 1110 having the first read range 1112. Note that in various embodiments, the predetermined restricted antenna response behavior may be a non-response, or the RF tag 1000 appears unresponsive, because the RFID reader 2200 is spaced away from the RF tag 1000 at a distance that is greater than the first read range 1112. In some examples, the antenna 1020 of the RF tag 1000 in the restricted antenna state may be unable to harvest sufficient amount of energy from the interrogation signal 2210 to power the integrated circuit of the RF tag 1000. If the RFID reader was closer to the RFID tag 1000, i.e., within the read range 1112 of the RF tag 1000 the RFID reader 2200 would receive the response from the RF tag 1000.

When the antenna 1020 of the RFID tag 1000' in the extended antenna state receives the interrogation signal 2210, the RF tag 1000' engages in a predetermined response behavior corresponding to the extended antenna state. As illustrated, the response behavior corresponding to the extended antenna state is emitting a response signal 1110' having the extended read range 1114. In the extended antenna state, the first antenna portion 1022 and the second antenna portion 1024 are in a closed circuit with the integrated circuit, and the operative antenna length is the entire length of at least the sum of the length of the first antenna portion 1022 and the second antenna portion 1024, resulting in an increase in read range, e.g. from the first read range 1112 to the extended read range 1114.

In some examples, the first read range 1112 of an RF tag 1000 in the restricted antenna state may have a radius of about 1 millimeter, 1 centimeter (cm), 10 cm, 1 meter (m), 5 m, 10 m, or about 25 m.

In some examples, the read range 1114 of an RF tag 1000' in the extended antenna state may have a radius of about 10 cm, 1 meter (m), 5 m, 10 m, 25 m, 50 m or about 1000 m.

Figure 23:
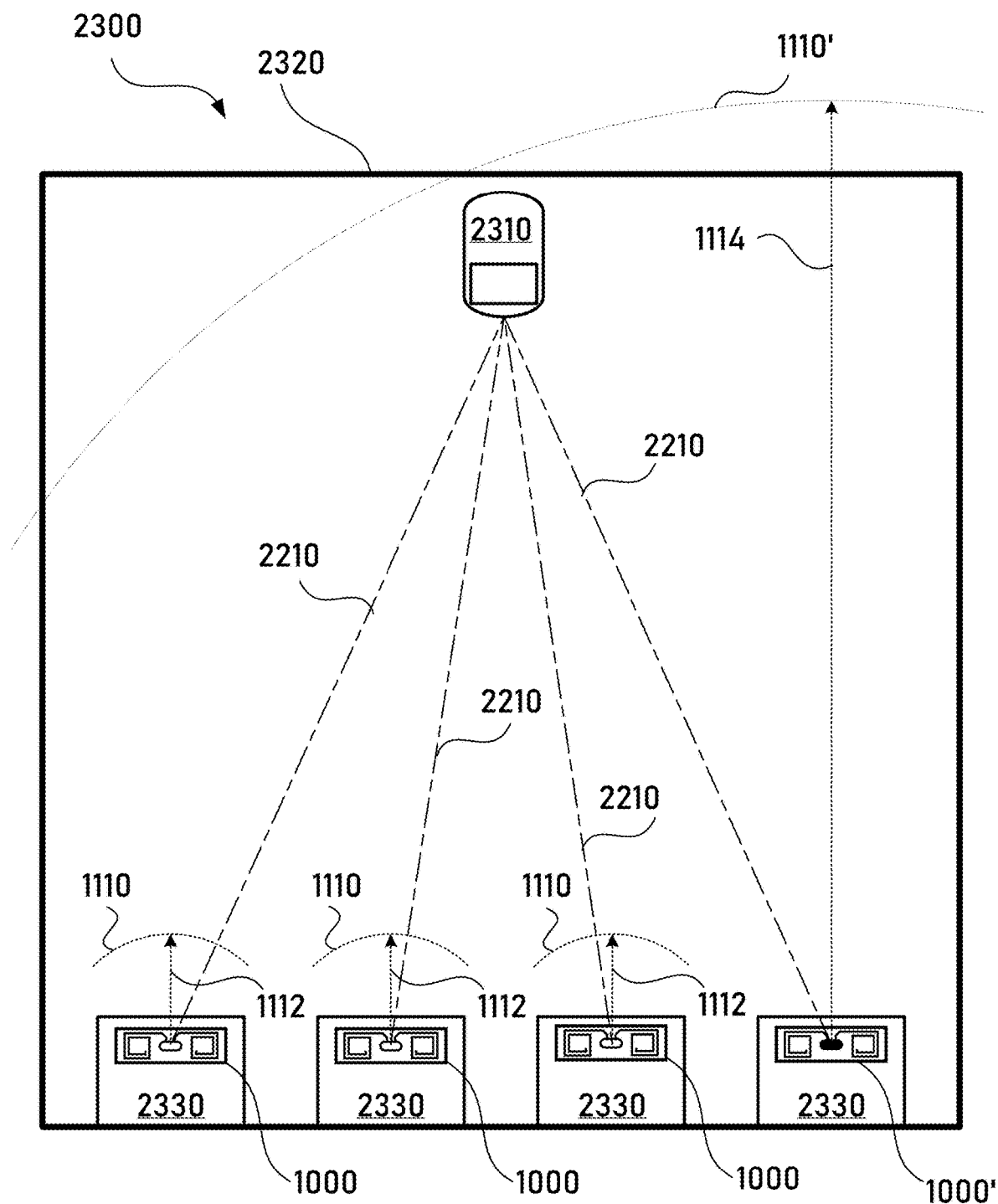
FIG. 23 illustrates an example system implementing a fixed RFID reader in a defined space, and its operation with a plurality of RF tags, according to embodiments of the present disclosure.

FIG. 23 illustrates an example system 2300 implementing a fixed RFID reader 2310 in a defined space 2320, and a plurality of RF tags 1000, according to embodiments of the present disclosure. In the example system 2300, each of the RF tags 1000 is associated with, or otherwise attached to, a respective host product 2330, where each of the host products 2330 has an environmental sensitivity corresponding to the predetermined environmental exposure that a respective activatable environmental exposure indicator 200 of each RF tag 1000 is configured to respond to. The defined space 2320 may be a warehouse, a room, a refrigerator, a transport container, a defined portion of a conveyor belt, or similar defined space where environmentally sensitive items may be disposed. Each of the RF tags 1000 emits a response signal 1110 having the first read range 1112 when the RF tags 1000 are in the restricted antenna state and emit a response signal 1110' having an extended read range 1114 when the RF tags 1000 are in the extended antenna state. The extended read range 1114 is greater than the first read range 1112 of the response signal 1110 of the RF tag 1000 in the restricted antenna state.

The RFID reader 2310 may be fixed in place and disposed at proximately to the host products 2330 and RF tags 1000, such that the RFID reader 2310 is beyond the read range 1112 of the response signal 1110 of the RF tag 1000 in the restricted antenna state, but within the extended read range 1114 of the response signal 1110' of the RF tag 1000' in the extended antenna state. Thus, when a given host product 2330 is exposed to the predetermined environmental exposure, so too is the RF tag 1000 associated with the given host product 2330 exposed to the predetermined environmental exposure, resulting in the RF tag 1000 transitioning from the restricted antenna state (e.g. where the response signal 1110 is not detected by the RFID reader 2310) to the extended antenna state (e.g., where the response signal 1110' can be detected by the RFID reader 2310), indicating that the given host product has been exposed to the predetermined environmental stimulus. Stated differently, the RFID reader 2310 may continuously or intermittently emit interrogation signals 2210, but only receive (e.g., or otherwise able to read or decode) responses from RF tags 1000 in the extended antenna state, and having an extended read range, as the read range 1112 of response signals 1110 of RF tags in the restricted antenna state are insufficient to reach or be read by the RFID reader 2310. Thus, the RFID reader 2310 is not inundated with response signals 1110 from several RF tags 1000 in the restricted antenna state, but only response signals 1110' from RF tags 1000' in the extended antenna state, indicating a potentially compromised host product 2330.

Figure 24:
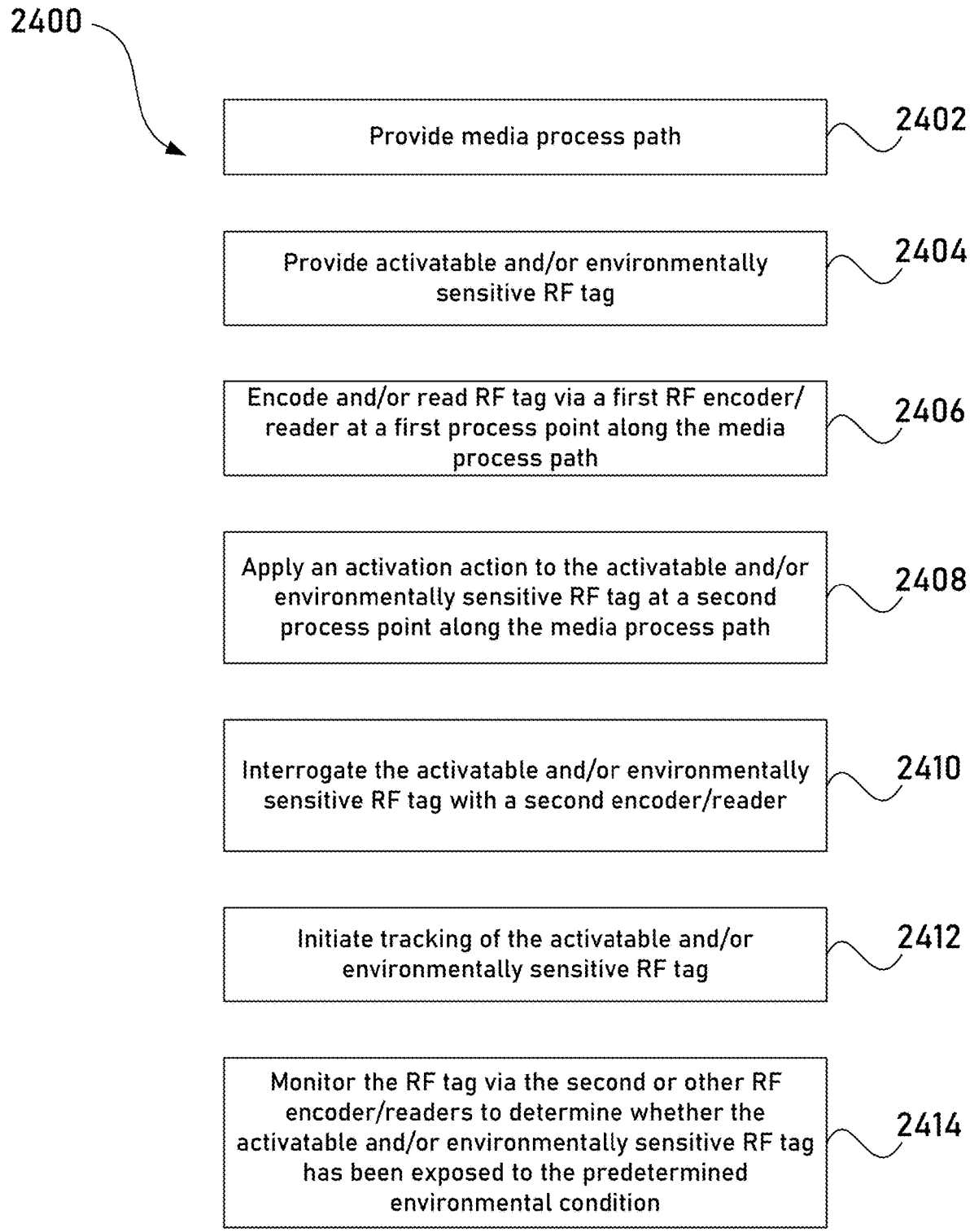
FIG. 24 is a flowchart that illustrates an example process for tracking and monitoring activatable and/or environmentally sensitive RF tags, according to embodiments of the present disclosure.

FIG. 24 illustrates a flowchart of an example method 2400 processing activatable and/or environmentally sensitive RF tags described herein. The activatable environmentally sensitive RF tags may be one of various embodiments of RF tags 1000. Each RF tag is configured to include an activation indicator component (e.g., activation indicator component 300), an activatable environmental exposure indicator (e.g., activatable environmental exposure indicator 200), and/or an activation and exposure indicator 400, e.g., as described herein.

Block 2402 of the method 2400, describes providing a media process path, according to embodiments of the present disclosure. In some examples, the media process path includes at least a first process point and second process point, the second process point being downstream on the media process path relative to the first process point along the media process path.

Block 2404 of the method describes providing an activatable and/or environmentally sensitive RF tag, according to embodiments of the present disclosure. The activatable environmentally and/or sensitive RF tag may be one of various embodiments of RF tags 1000. According to some embodiments, block 2404 of the method 2400 occurs at or before the first process point. In one example, RF tag has a first configuration in which the antenna is segmented into electrically isolated segments, where a first segment of the segmented antenna is electrically coupled to the integrated circuit of the RF tag so that the RF tag has a first read range corresponding to the first segment.

Block 2406 of the method 2400 describes encoding and/or reading the activatable and/or environmentally sensitive RF tag, according to embodiments of the present disclosure. The activatable and/or environmentally sensitive RF tag is encoded and/or read by a first RF encoder/reader operating in a predetermined radiofrequency band at a predetermined and/or adjustable power level. In some examples, the RF tag can be encoded with data from a system to be associated with the RF tag and/or can read data from the RF tag which can be used by the system to track the RF tag. According to some embodiments, block 2406 of the method 2400 occurs at the first process point.

Block 2408 describes applying an activation action to the activatable and/or environmentally sensitive RF tag, according to embodiments of the present disclosure. In some examples, the activation action is applied at the second process point of the media process path by an activation element. In some examples, the activation element is a thermal printhead. In some examples, the activation action may be applied by a pair of opposing surfaces, where such surfaces can be formed by of rollers, plates, or other structures. The activation action may be applied to the entire activatable environmentally sensitive RF tag but is at least applied to the activation indicator component, the activatable environmental exposure indicator, and/or the activation and exposure indicator 400. In some examples, the first and second process points can be included in a media processing device, such as a thermal printer that feeds substrates including the RF tags past the RF encoder/reader to encode the RF tags and/or read data from the RF tag to be used for tracking the RF tag and then past a thermal printhead that applies the activation action and also prints indicia on the substrates. In one example, upon activation, the RF tag can have second configured in which at least a first segment of the segmented antenna (that is electrically coupled to the integrated circuit) is electrically connected to a second segment to increase the length of the antenna and thereby increase the read range of the RF tag to a second read range.

In some examples, the activation action is thermal stress with a predetermined activation threshold selected from a group consisting of: a temperature exceeding 35 degrees Celsius (C), a temperature exceeding 40 degrees C., a temperature exceeding 45 degrees C., a temperature exceeding 50 degrees C., a temperature exceeding 55 degrees C., a temperature exceeding 60 degrees C., a temperature exceeding 65 degrees C., a temperature exceeding 70 degrees C., a temperature exceeding 75 degrees C., a temperature exceeding 80 degrees C., a temperature exceeding 85 degrees C., a temperature exceeding 90 degrees C., a temperature exceeding 95 degrees C., and a temperature exceeding 100 degrees C. In some examples, the activation action is a compression stress with a predetermined activation threshold selected from a group consisting of a stress exceeding 0.1 psi a stress exceeding 0.5 psi, a stress exceeding 1 psi, a stress exceeding 2 psi, a stress exceeding 5 psi, a stress exceeding 10 psi, and a stress exceeding 15 psi. In some examples the activation action is a shear stress with a predetermined activation threshold selected from a group consisting of a stress exceeding 0.1 psi a stress exceeding 0.5 psi, a stress exceeding 1 psi, a stress exceeding 2 psi, a stress exceeding 5 psi, a stress exceeding 10 psi, and a stress exceeding 15 psi.

According to some embodiments, the activation action transitions the activation indicator component from the unactivated state to the activated state and primes the activatable environmental exposure indicator to begin environmental sensing.

Block 2410 of the method 2400 describes interrogating the activatable and/or environmentally sensitive RF tag via a second RF encoder/reader, according to embodiments of the present disclosure. According to some embodiments, block 2410 of the method 2400 occurs at a third process point or at least after the second process point. In some examples, the second RF encoder/reader can be a handheld RF encoder/reader, a fixed RF encoder/reader, or other suitable RF encoder/reader. In some examples, the second RF encoder/reader is unable to interrogate (encode/read) the RF tag prior to the activation action because the second RF encoder/reader is positioned at distance greater than the first read range (e.g., the second RF encoder/reader can be mounted to a ceiling in the generally area of the thermal printer at a distance of greater than the first read range). As an example, the first RF encoder/reader can be disposed in a thermal printer within an inches or inches of the RF tag when the RF tag passes the first RF encoder/reader while the second RF encoder/reader can be several feet away from the RF tag as it is processed by the thermal printer. Detection of the RF tag by the second encoder reader can be used by the system to initiate tracking of the RF tag Block 2412 of the method 2400 describes tracking the activatable and/or environmentally sensitive RF tag, according to embodiments of the present disclosure. As an example, the second RF encoder/readers and/or other RF encoder/readers can periodically emit an interrogation signal and when anyone of the antennas of the second RF encoder/reader and/or other RF encoder/readers are with the second read range, the RF tag can respond to the interrogation signal.

Block 2414 of the method 2400 describes monitoring the RF tag, via the second or other RF encoder/readers, to determine whether the RF tag has been exposed to a predetermined environmental condition based on a response of the RF tag (or the absence of a response after having previously received a response). For example, in response to an interrogation signal from the second RF encoder/reader or other RF encoder/readers, the RF tag may continue to respond with indicating the RF tag has not been exposed to the predetermined environmental indicator or may respond indicating the RF tag was exposed to the predetermined environmental condition.

Figure 25:
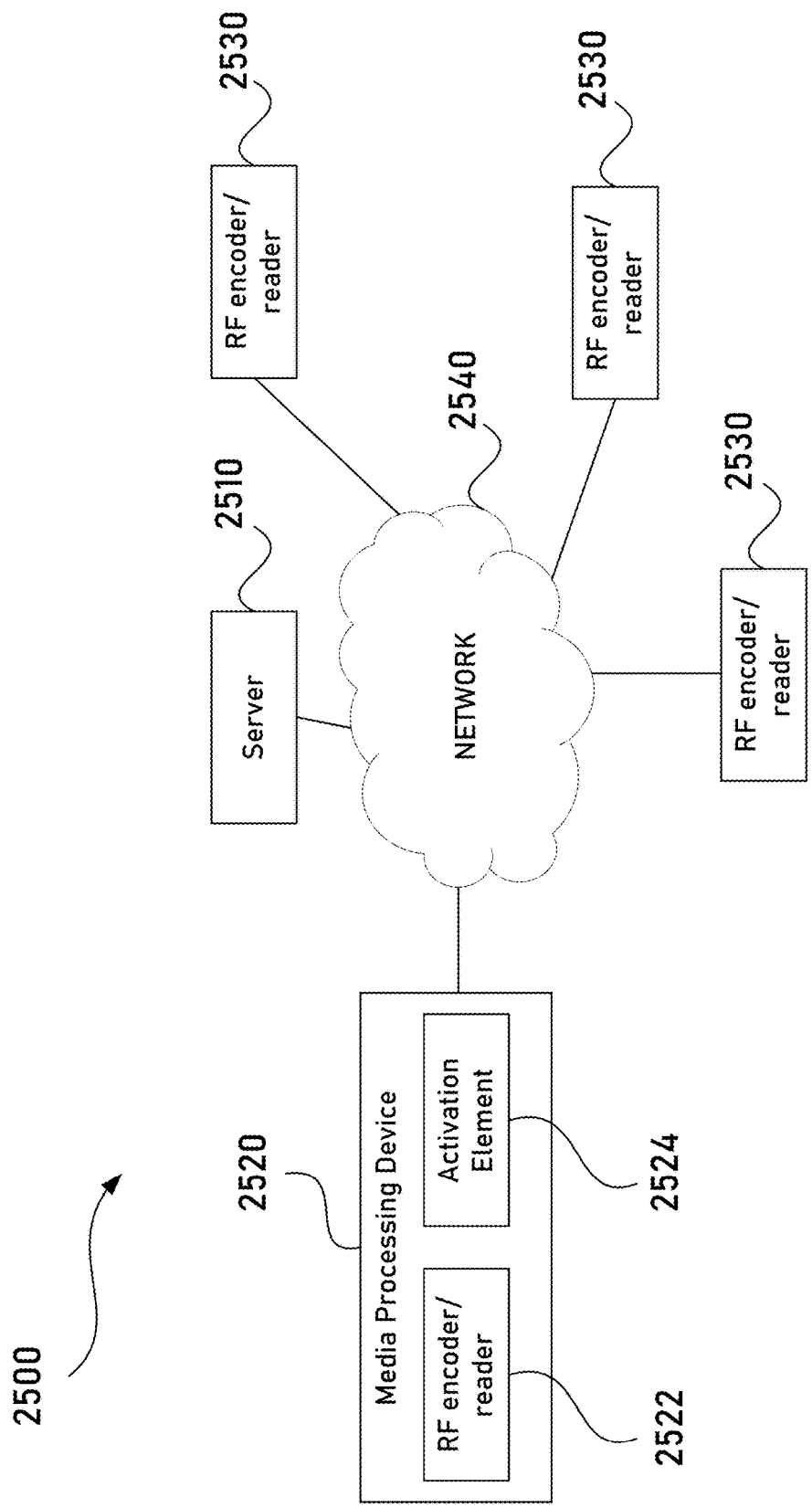
FIG. 25 is a block diagram of an example system for tracking and monitoring activatable and/or environmentally sensitive RF tags, according to embodiments of the present disclosure.

FIG. 25 is a block diagram representative of an example system 2500 capable of implementing, for example, performing the method 2400, according to embodiments of the present disclosure. The example system 2500 includes a computing device, e.g., a server 2510 in communication with a media processing device 2520, and RF encoder/readers 2530 via a network 2540. The server 2510 can execute a tag management application for tracking a location of RF tags and monitoring a status of RF tags being tracked. In one or more examples, the media processing device 2520 can be a printer and/or media applicator, or as components in an automated labeling environment. In one or more examples, the RF encoder readers 2530 can include handheld RF encoder/readers and/or fixed RF encoder/readers (e.g., mounted in a ceiling or wall of a facility or vehicle, along a conveyor belt, etc.).

As shown in FIG. 25, the media processing device 2520 can include an RF encoder/reader 2522 and an activation element 2524. The media processing device 2520 can process media including RF tags, e.g., embodiments of the RF tags 1000 described herein. In one example, the media processing device 2520 can received a supply of media, such as labels, wristbands, paper, and the like, and can fed the media along a media process path past the RF encoder/reader 2522 and the activation element 2524. The RF encoder/reader 2522 can encode the RF tag with data and/or can read data from the RF tag and the activation element 2524 can apply an activation action to the RF tag. In some examples, the media process device 2520 is a thermal printer and the activation element is a thermal printhead that can apply heat and/or pressure to the RF tag and can print indicia on the media. In some examples, the media processing device 2520 can received instructions and/or data from the server and/or can send instructions or data to the server. As one example, the media processing device 2520 can send data encoded to or read from an RF tag and the server 2510 can add the data to the tag management application for tracking and/or monitoring.

The RF encoder/readers 2530 can output interrogation signals and listen for responses from RF tags and can communicate with the server based on the responses or lack of responses. As one example, based on the data received from the media processing device 2510 about an RF tag processed by the media processing device, the server may expect that one of the RF encoder/readers in the generally vicinity of the medial process will receive a response from the processed RF tag. The tag management application executed by the server 2510 can determine a location and/or a status based on a received response or a lack of response from the processed RF tag, and if a response is received, the server may also or alternatively determine a status of the processed RF tag based on the data included in the response. The tag management application executed by the server 2510 can continue to track and monitor the processed RF tag based on data received from the RF encoder/readers 2530.

In one example operation of the system 2500, unactivated RF tags, e.g., embodiments of the RF tags 1000 described herein, are introduced to the media process path of the media processing device 2520 and RF encoder/reader 2522 may be oriented and configured within the media processing device such that when the RF encoder/reader 2522 emits an interrogation signal as an RF tag passes by the RF encoder/reader 2522, the RF tag receives and responds to the interrogation signal and the RF encoder/reader 2522 can encode the RF tag with data and/or read data from the RF tag. The RF tags passing by the RF encoder/reader are expected to be unactivated and have a first read range where the RF encoder/reader 2522 comes within the first read range of the RF tags as the RF tags pass by the RF encoder/reader 2522 and the RF encoder/readers 2530 are disposed away from the media processing device 2520 at a distance that is greater than the first read range. If any of the RF encoder/readers 2530 receive a response from an RF tag before the RF tag is activated by the activation element 2524 of the media processing device 2510 (or another activation element), the tag management application executed by the server may determine that the RF tag is compromised and may provide instructions to the media processing device 2520 to discard or void the RF tag to prevent further use of the RF tag. Assuming the RF tag is first activated by the activation element 2524 of the media processing device 2520, the activated RF tag can be configured to have a second read range that is greater than the first read range. In one example, at least one of the RF encoder/readers 2530 can be location in the vicinity of the media processing device 2520 so that the at least one of the RF encoder/readers 2530 is positioned to be within the second read range of the RF tag and can communicate with the RF tag. Upon the server receiving data from the at least one RF encoder 2530 indicating the at least one RF encoder/reader received a response from the RF tag, the tag management application executed by the server can initiate tracking and monitoring of the RF tag via one or more of the RF encoder/readers 2530. Based on the data included in the responses from the RF tag to the interrogation signals from one or more of the RF encoder/readers 2530, or the presence or absence of a response to the interrogation signals from one or more of the RF encoder/readers 2530, the tag management application executed by the server 2510 can determine whether the RF tag has been exposed to the predetermined environmental condition. In the event that the tag management application executed by the server determines that the RF tag 2530 was exposed to the predetermined environmental condition, the server can implement an exposure protocol, which can include marking the RF tag as exposed in the a repository, transmit an alert to one or more devices, determine a location of the RF tag and dispatch an operator or autonomous mobile robot to the location to identify the RF tag and remove the RF tag (and object to which the RF tag is attached) from the location, and/or perform other operations or functions.

In the foregoing specification, specific embodiments have been described. However, one of ordinary skill in the art appreciates that various modifications and changes can be made without departing from the scope of the technology as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive and should instead be understood as potentially combinable if such combinations are permissive in any manner. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed technology is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "approximately", "about" or any other version thereof, are understood to refer to numbers in a range of the referenced number, for example the range of −10% to +10% of the referenced number, preferably −5% to +5% of the referenced number, more preferably −1% to +1% of the referenced number, most preferably −0.1% to +0.1% of the referenced number. The term "coupled" as used herein is defined as connected, although not necessarily directly and not necessarily mechanically. A device or structure that is "configured" in a certain manner is configured in at least that manner but may also be configured in manners that are not listed.

The Abstract of the Disclosure is provided to allow the reader to quickly ascertain the nature of the technical disclosure. The abstract is submitted with the understanding that the abstract will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A radio frequency (RF) tag, comprising:
an integrated circuit;
an antenna, having a first antenna portion and a second antenna portion;
wherein the first antenna portion is electrically connected in a closed circuit with the integrated circuit, and
an activatable environmental exposure indicator having a conductive state and a nonconductive state,
wherein the second antenna portion is in the closed circuit with the integrated circuit when the activatable environmental exposure indicator is in the conductive state and second antenna portion is in an open circuit when the activatable environmental exposure indicator is in the nonconductive state,
wherein the activatable environmental exposure indicator includes a plurality of microcapsules, each microcapsule having a nonconductive frangible shell containing a payload including a conductive material and a liquefiable material,
wherein the liquefiable material is configured to liquefy responsive to a predetermined environmental exposure,
wherein each nonconductive frangible shell of the plurality of microcapsules is configured to continue to contain a respective payload when the liquefiable material is liquefied, and
wherein each nonconductive frangible shell of the plurality of microcapsules is configured to rupture in response to an application of an activation action exceeding a predetermined activation threshold, releasing the respective payload,
wherein, after the nonconductive frangible shells of the plurality of microcapsules are ruptured responsive to the activation action, and responsive to the liquefiable material being liquified, the activatable environmental exposure indicator transitions to the conductive state, thus establishing the closed circuit between the second antenna portion and the integrated circuit.

2. The RF tag of claim 1, wherein the integrated circuit is configured to cause the antenna to emit a response signal responsive to an interrogation signal from a radio frequency identification (RFID) reader having a specified frequency range and a specified power range which is received by the antenna, the response signal having a) a first read range for the RFID reader when the activatable environmental exposure indicator is in the nonconductive state and b) a second read range for the RFID reader when the activatable environmental exposure indicator is in the conductive state, the second read range being greater than the first read range.

3. The RF tag of claim 2, wherein responsive to the RFID reader interrogating the RF tag when the RFID reader is spaced away from the RF tag by a distance that is greater than the first read range and less than the second read range, the RF tag appears unresponsive to the RFID reader when the activatable environmental exposure indicator is in the nonconductive state and appears responsive to the RFID reader when the activatable environmental exposure indicator is in the conductive state.

4. The RF tag of claim 3, wherein responsive to the RFID reader interrogating the RF tag when the RFID reader is spaced away from the RF tag by a distance less than the first read range, the RF tag appears responsive when the activatable environmental exposure indicator is in the nonconductive state and when the activatable environmental exposure indicator is in the conductive state.

5. The RF tag of claim 2, wherein the RF tag is a passive RF tag, and the antenna is configured to harvest power from the interrogation signal, such that the interrogation signal powers the integrated circuit to emit the response signal via the antenna.

6. The RF tag of claim 1, wherein the integrated circuit is configured, responsive to the RF tag being interrogated by an interrogation signal in a predetermined radiofrequency range which is received by the antenna, to cause the antenna to emit a first distinct radiofrequency response when the second antenna portion is in the closed circuit, and a second distinct radiofrequency response when the second antenna portion is in the open circuit.

7. The RF tag of claim 6 wherein the first distinct radiofrequency response and second distinct radiofrequency response are emitted on distinct radiofrequency bands.

8. The RF tag of claim 6, wherein the integrated circuit comprises a memory storing a data, and at least one of the first distinct radiofrequency response and the second distinct radiofrequency response transmit the data.

9. The RF tag of claim 1, wherein an operating antenna length of the RF tag is a sum of a length of each antenna portion in the closed circuit with the integrated circuit, such that when the activatable environmental exposure indicator is in the nonconductive state, the operating antenna length is a length of the first antenna portion, and when the activatable environmental exposure indicator is in the conductive state, the operating antenna length is a sum of the length of the first antenna portion and a length of the second antenna portion.

10. The RF tag of claim 1, further comprising a battery, wherein the integrated circuit is electrically connected to the battery and powered by the battery.

11. The RF tag of claim 1, wherein the activation action is thermal stress exceeding a predetermined activation threshold, the predetermined activation threshold exceeding 65 degrees C.

12. The RF tag of claim 1, wherein the activation action is a compression stress exceeding a predetermined compression threshold, the predetermined compression threshold exceeding 5 psi.

13. The RF tag of claim 1, wherein the activation action is a shear stress above a predetermined shear threshold, the predetermined shear threshold exceeding 5 psi.

14. The RF tag of claim 1, wherein the predetermined environmental exposure is selected from a group consisting of: a temperature excursion above a predetermined temperature, a temperature excursion above a predetermined temperature threshold for at least a predetermined amount of time, a temperature excursion below a predetermined temperature, a temperature excursion below a predetermined temperature for at least a predetermined amount of time, cumulative exposure to temperature over a time period above a predetermined threshold for at least a predetermined amount of time, an exposure to a particular chemical, an oxygen exposure, an ammonia exposure, an exposure to a particular chemical above a threshold concentration, an exposure to a particular chemical above the threshold concentration for at least a predetermined amount of time, an exposure to at least a predetermined amount of radiation of a particular type, an predetermined electromagnetic exposure, a humidity exposure, an exposure to a humidity level above a predetermined threshold, and an exposure to a humidity level above a predetermined threshold for at least a predetermined amount of time.

15. The RF tag of claim 1, wherein the conductive material is selected from a group consisting of: particles containing copper, particles containing silver, particles containing graphite, particles containing graphene, particles containing graphene oxide, particles containing other functionalized graphenes, particles containing conductive metals, particles containing conductive non-metal materials, and combinations thereof.

16. The RF tag of claim 1, wherein the nonconductive frangible shells comprise a material selected from a group consisting of: a protein, a gel, a polyurea formaldehyde, polymelamine formaldehyde, a wax material, an emulsion, other polymeric materials, and combinations thereof.

17. The RF tag of claim 1, wherein the liquefiable material comprises a material selected from a group consisting of: a side-chain crystallizable polymer, an alkane, a wax, an alkane wax, esters, and combinations thereof.

18. The RF tag of claim 1, wherein when the liquefiable material is not liquefied, the conductive material is embedded in a solid matrix formed by the liquefiable material, and the conductive material is thus blocked from forming an electrical connection, and when the liquefiable material is liquefied, the conductive material is released from the solid matrix and is not blocked from forming an electrical connection.

19. The RF tag of claim 1, wherein the payload comprises one material which is electrically nonconductive when not liquefied, and is electrically conductive when liquefied, such that an electrical connection is formed through the liquefiable material when liquefied.

20. The RF tag of claim 1, wherein the activation action is applied by a thermal printhead.

21. A radio frequency (RF) tag, comprising:
an integrated circuit;
an antenna, having a plurality of antenna portions;
wherein a first antenna portion of the plurality of antenna portions is electrically connected in a closed circuit with the integrated circuit, and
a first activatable environmental exposure indicator and a second activatable environmental exposure indicator, each having a conductive state and a nonconductive state,
wherein, when the first activatable environmental exposure indicator is in the conductive state, a second antenna portion of the plurality of antenna portions is in the closed circuit with the first antenna portion and the integrated circuit and, when the first activatable environmental exposure indicator is in the nonconductive state, the second antenna portion is in an open circuit,
wherein, when the first activatable environmental exposure indicator is in the conductive state and the second activatable environmental exposure indicator is in the conductive state, a third antenna portion of the plurality of antenna portions is in the closed circuit with the first antenna portion, the second antenna portion and the integrated circuit and, when at least one of the first activatable environmental exposure indicator and the second activatable environmental exposure indicator are in the nonconductive state, the third antenna portion is in an open circuit,
wherein the first activatable environmental exposure indicator includes a first plurality of microcapsules, each microcapsule of the first plurality of microcapsules including a frangible shell containing a first payload, the first payload comprising a first conductive material and a first liquefiable material,
wherein the first liquefiable material is configured to liquefy responsive to a first predetermined environmental exposure,
wherein the frangible shells of the first plurality of microcapsules are configured to contain the first payload when the first liquefiable material is liquefied,
wherein the second activatable environmental exposure indicator includes a second plurality of microcapsules, each microcapsule of the second plurality of microcapsules including a frangible shell containing a second payload, the second payload comprising a second conductive material and a second liquefiable material, where in the second liquefiable material is configured to liquefy responsive to a second predetermined environmental exposure,
wherein the frangible shells of the second plurality of microcapsules are configured to contain the second payload when the second liquefiable material is liquefied,
wherein the frangible shells of the first plurality of microcapsules and the frangible shells of the second plurality of microcapsules are configured to rupture in response to an application of an activation action exceeding a predetermined activation threshold, releasing the first payload and the second payload respectively, and
wherein after the frangible shells of the first plurality of microcapsules are ruptured, responsive to the activation action, and responsive to the first liquefiable material being liquefied, the first activatable environmental exposure indicator transitions to the conductive state, thus establishing a closed circuit between the integrated circuit and the second antenna portion,
wherein after the frangible shells in the second plurality of microcapsules are ruptured responsive to the activation action, and responsive to the second liquefiable material being liquefied, the second activatable environmental exposure indicator transitions to the conductive state, thus establishing a closed circuit between the second antenna portion and the third antenna portion.

22. The RF tag of claim 21, wherein the first predetermined environmental exposure is an environmental exposure of a first type exceeding a first exposure threshold and the second predetermined environmental exposure is another environmental exposure of the first type exceeding a second exposure threshold, the second exposure threshold being greater than the first exposure threshold.

23. The RF tag of claim 21, wherein the first predetermined environmental exposure is an environmental exposure of a first type, and the second predetermined environmental exposure is an environmental exposure of a second type, distinct from the first type.

24. The RF tag of claim 21, wherein the integrated circuit is configured to cause the antenna to emit a response signal responsive to an interrogation signal from a radio frequency identification (RFID) reader having a specified frequency range and a specified power range which is received by the antenna, the response signal having a) a first read range by the RFID reader when the first activatable environmental exposure indicator is in the nonconductive state, b) a second read range by the RFID reader when the first activatable environmental exposure indicator is in the conductive state, the second read range being greater than the first read range, and c) a third read range by the RFID reader when the first activatable environmental exposure indicator is in the conductive state and the second activatable environmental exposure indicator is in the conductive state, the third read range being greater than the second read range.

25. A radio frequency (RF) tag, comprising:
an integrated circuit,
an antenna, having a first antenna portion, a second antenna portion and a third antenna portion,
wherein the first antenna portion is electrically connected in a closed circuit with the integrated circuit;
an activation indicator component, having a component conductive state and a component nonconductive state; and
an activatable environmental exposure indicator, having an indicator conductive state and an indicator nonconductive state,
wherein the second antenna portion is in the closed circuit with the integrated circuit and the first antenna portion when the activation indicator component is in the component conductive state, and in an open circuit when the activation indicator component is in the component nonconductive state,
wherein when the activatable environmental exposure indicator is in the indicator conductive state and the activation indicator component is in the component conductive state, the third antenna portion is in a closed circuit with the integrated circuit, and when at least one of the activatable environmental exposure indicator is in the indicator nonconductive state and the activation indicator component is in the component nonconductive state, the third antenna portion is in an open circuit,
wherein the activation indicator component includes a first plurality of microcapsules, each having a nonconductive frangible shell containing a conductive material,
wherein the activatable environmental exposure indicator includes a second plurality of microcapsules, each microcapsule of the second plurality of microcapsules having a nonconductive frangible shell containing a liquefiable material,
wherein the liquefiable material is configured to liquefy responsive to a predetermined environmental exposure,
wherein the frangible shells of the first plurality of microcapsules and the frangible shells of the second plurality of microcapsules are configured to rupture in response to an application of an activation action exceeding a predetermined activation threshold, releasing the conductive material and the liquefiable material respectively, and
wherein when the conductive material is released from the frangible shells of the first plurality of microcapsules, the conductive material forms a first electrical connection across the activation indicator component, transitioning the activation indicator component to the component conductive state,
wherein when the liquefiable material liquefies responsive to the predetermined environmental exposure after the liquefiable material is released from the frangible shells of the second plurality of microcapsules, the liquefiable material forms a second electrical connection across the activatable environmental exposure indicator, transitioning the activatable environmental exposure indicator to the indicator conductive state.

26. A radio frequency (RF) tag, comprising:
an integrated circuit;
an antenna, having an operational antenna length, electrically connected to the integrated circuit; and
an activatable environmental exposure indicator included in the antenna, having a first state and a second state,
wherein the activatable environmental exposure indicator is configured to transition from the first state to the second state responsive to a predetermined environmental exposure occurring after an application of an activation action,
wherein the activatable environmental exposure indicator does not transition from the first state to the second state prior to the application of the activation action, even when exposed to the predetermined environmental exposure, and wherein the operational antenna length is configured to change based on whether the activatable environmental exposure indicator is in the first state or the second state, wherein the integrated circuit is configured to cause the antenna to emit a response signal responsive to an interrogation signal from a radio frequency identification (RFID) reader having a specified frequency range and a specified power range which is received by the antenna, the response signal having a) a first read range for the RFID reader when the activatable environmental exposure indicator is in the first state and b) a second read range for the RFID reader when the activatable environmental exposure indicator is in the second state.

27. The RF tag of claim 26, wherein the first state is a nonconductive state, and the second state is a conductive state.

28. The RF tag of claim 27, wherein the activatable environmental exposure indicator is connectively disposed between a first antenna portion of the antenna and a second antenna portion of the antenna, such that when the activatable environmental exposure indicator transitions from the first state to the second state, the activatable environmental exposure indicator establishes a closed circuit between the first antenna portion and the second antenna portion, thus increasing the operational antenna length.

* * * * *